US006630831B2

(12) United States Patent
Amini

(10) Patent No.: US 6,630,831 B2
(45) Date of Patent: *Oct. 7, 2003

(54) MEASUREMENTS OF ELECTRICAL PROPERTIES THROUGH NON MAGNETICALLY PERMEABLE METALS USING DIRECTED MAGNETIC BEAMS AND MAGNETIC LENSES

(75) Inventor: Bijan K. Amini, Houston, TX (US)

(73) Assignee: Em-Tech Sensors LLC

( * ) Notice: Subject to any disclaimer, the term of this patent is extended or adjusted under 35 U.S.C. 154(b) by 0 days.

This patent is subject to a terminal disclaimer.

(21) Appl. No.: 09/946,692

(22) Filed: Sep. 4, 2001

(65) Prior Publication Data

US 2002/0105333 A1 Aug. 8, 2002

Related U.S. Application Data

(60) Provisional application No. 60/229,983, filed on Sep. 2, 2000, and provisional application No. 60/229,982, filed on Sep. 2, 2000.

(51) Int. Cl.⁷ ................................................ G01V 3/18
(52) U.S. Cl. ....................................... 324/339; 343/787
(58) Field of Search ................................ 324/339, 341; 343/787

(56) References Cited

U.S. PATENT DOCUMENTS

| | | | |
|---|---|---|---|
| 3,277,363 A | 10/1966 | Schuster | |
| 3,574,458 A | 4/1971 | Hollis | |
| 3,617,779 A | 11/1971 | Rosenberg | |
| 3,851,236 A | 11/1974 | Dennhardt | |
| 3,995,835 A | 12/1976 | Clichy | |
| 4,679,936 A | 7/1987 | Gerharz | |
| 5,038,107 A | 8/1991 | Gianzero | |
| 5,132,623 A | 7/1992 | De | |
| 5,150,446 A | 9/1992 | Penner | |
| 5,260,661 A | 11/1993 | Vail | |
| 5,283,520 A | 2/1994 | Martin | |
| 5,426,367 A | 6/1995 | Martin | |
| 5,610,517 A | 3/1997 | Ma | |
| 5,633,182 A | 5/1997 | Miyawaki | |
| 5,654,639 A | 8/1997 | Locatelli | |
| 5,698,977 A | 12/1997 | Simpson | |
| 5,751,144 A | 5/1998 | Weischedel | |
| 5,942,894 A | 8/1999 | Wincheski | |
| 5,969,254 A | 10/1999 | Yamaguchi | |
| 6,008,657 A | 12/1999 | Suyama | |
| 6,025,721 A | 2/2000 | Vail | |
| 6,084,403 A | 7/2000 | Sinclair | |
| 6,097,532 A | 8/2000 | Harris | |
| 6,100,696 A | 8/2000 | Sinclair | |
| 6,157,195 A | 12/2000 | Vail | |
| 6,351,245 B1 * | 2/2002 | Amini | .................. 343/787 |

* cited by examiner

Primary Examiner—Edward Lefkowitz
Assistant Examiner—Toan Le
(74) Attorney, Agent, or Firm—David McEwing

(57) ABSTRACT

The invention subject of this specification utilizes the technique of inductive magnetic coupling of Electromagnetic waves to EM barrier materials in combination with transmission of Electromagnetic waves through non-permeable material to facilitate the measurement of resistivity of geologic formation beyond the well casing.

17 Claims, 46 Drawing Sheets

MEASUREMENTS OF ELECTRICAL PROPERTIES THROUGH NON MAGNETICIALLY PERMEABLE METALS USING DIRECTED MAGNETIC BEAMS AND MAGNETIC LENSES

CROSS REFERENCE TO RELATED APPLICATIONS

This application claims the benefit of U.S. Provisional Application No. 60/229,983, entitled "A Logging Tool For Measurement of Resistivity Through Casing Using Metallic Transparencies and Magnetic Lensing," filed Sep. 2, 2000; and U.S. Provisional Application No. 60/229,982, entitled "Measurement of Electrical Properties Through Saturated Permeable Metals Using Directed Magnetic Beams and Magnetic Lenses" filed Sep. 2, 2000.

BACK GROUND TO INVENTION

1. Field of Use

Any medium containing electrically conductive material can be monitored for changes in the electrical resistivity of the electrically conductive material. An important and well-known example is the measurement of the electrical resistivity of underground geologic formations. Such formations often contain salt water, which is a relatively high electrically conductive material and/or hydrocarbons which are less electrically conductive and therefore more electrically resistive. The resistivity of geologic formations containing these materials is measurable, thereby providing information relative to the concentrations of oil, water and gas at various locations within a geologic formation.

It has been demonstrated that it is possible to measure the resistivity of an underground geologic formation through a ferromagnetic well casing penetrating the formation, as well as through other materials that are electrically conductive and magnetically permeable. These materials are referred herein as "EM barriers" or "barrier materials." The technology is based upon inductive magnetic coupling; therefore the measuring apparatus does not need to be in physical contact to the barrier material comprising the well casing or production tubing. It has also been shown that magnetic flux may be transmitted through metals that have a permeability of one weber/amp. These metals can be considered non-permeable, i.e., there is little or no absorption of magnetic flux. However, due to the rapid spreading of the magnetic flux, the flux intensity drops off with respect to distance as the inverse cube of the distance.

The invention subject of this specification utilizes the technique of inductive magnetic coupling of Electromagnetic waves to EM barrier materials in combination with transmission of Electromagnetic waves through non-permeable material to facilitate the measurement of resistivity of geologic formation beyond the well casing.

Hydrocarbon production wells typically utilize an outer casing made of a ferromagnetic material. Common outside diameters of the casing may be of a range of 7 to 10 inches or larger. The interior diameter is of varying dimensions. The thickness of the casing also varies but may typically be ½ inch or more in thickness. Placed inside the permanent casing is a smaller production tubing. The outer diameter of the production tubing may be in a range of 1 to 4 inches. Hydrocarbon, such as crude oil mixed with salt water or solid particles such as sand, flows through the production tubing at a high velocity. This environment is harsh and corrosive, sometimes requiring the replacement of the production tubing. It will be appreciated that well casing is required to maintain an open channel for the flow of production and minimize interruption due to a "cave in" or crumbling of the bore hole wall.

Note that throughout this specification, the terms "casing," "well bore casing" and "well casing" will be deemed to include hydrocarbon production tubing or other ancillary structures such as casing or tubing connectors, collars or couplings.

The sensor tool of this invention may create a "Metallic Transparency"™ region local to its oscillating magnetic flux transmitter (transmitter) or its flux receiver (receiver) by means of a strong magnetic flux field saturating an EM barrier near the transmitter and receiver. It may also utilize near practical saturation and "Magnetic Lens"™ focus to direct the oscillating flux of the transmitter in a controlled manner.

The present invention relates generally to measuring resistivity of media such as liquids, gases or other objects within a geologic formation surrounding a well casing. Specifically, the present invention relates to through casing resistivity measurement in downhole hydrocarbon production environments. The present invention provides a sensor apparatus and method for measuring the resistivity of a formation proximate to a well. The current invention, in one embodiment, is an apparatus for measuring the resistivity of the surrounding formation. The apparatus records electrical responses corresponding to magnetic fluxes that relate to the resistivity of the geologic formation at various depths or locations within the formation penetrated by the cased well. The apparatus can thereby detect the location and amplitude of said resistivity in single or multiple directions, and at distances that will help operators of wells adjust their production management and their reservoir management activities. The apparatus can also be used to detect changes in the resistivity over time by comparison of recorded fluxes at various time intervals.

The invention includes a sensor tool that can travel through the relatively narrow diameter of well casing (or production tubing), means to raise and lower the tool to a specified location of the casing string proximate to a non magnetically permeable section, means to supply power and receive data, as well as recording and display devices.

The invention subject of this specification allows the transmission of Electromagnetic waves through well casing, thereby permitting information of the lithology to be obtained from sensors within the well. Recent developments have shown that magnetic flux may be transmitted though ferromagnetic or paramagnetic materials, such as carbon steel. Ferromagnetic metals or paramagnetic metals, being electrically conductive and magnetically permeable have previously been barriers to the transmission of Electromagnetic energy.

2. Summary of Related Art

In the development and production of oil and gas reservoirs, there is a very significant need to increase the amount and accuracy of information regarding the composition and changes in the composition of the resource-bearing zones of the formation. Resistivity measurement has long been used to characterize properties of the immediately surrounding substrates prior to the inception of production. However, it has typically only been possible to take such measurements prior to setting casing or while the formation itself is otherwise "exposed" to a logging tool, i.e., an "open hole" without an interceding material that acts as a barrier between the logging tool and the formation substrate. Existing methods of measuring the resistivity of the media within a geologic formation have therefore required that the measurements be taken with logging tools deployed prior to commencement of actual production. After casing is placed in the well and production is underway, it is generally not possible to measure the resistivity of the surrounding geologic formation without interruption of the well production and penetration or removal of the well casing.

As is known to those skilled in the industry, the electrical resistivity of a geologic formation varies as a result of (among other reasons) the changing proportion of hydrocarbon to water contained within the formation. Having the ability to measure at selected locations and directions over time would provide for the unique ability to monitor, for example, the change in the percentage of water versus either oil, gas, or other electrically conductive materials approaching the well, far in advance of such change in fluids actually entering the well. The benefits of such measurements include the ability to see changes in the composition of the formation, i.e., hydrocarbon and water by measuring changes in the resistivity of the formation through the barrier material comprising the well casing.

Numerous attempts have been made to provide an apparatus or method for measuring the electrical resistivity of the surrounding geologic formation through a well casing. See for example U.S. Pat. No. 5,654,639 entitled "Induction Measuring Devices in the Presence of Metal Wall," but requiring an electric current to be passed into the metal pipe wall. The contact device is then disengaged from the wall when the apparatus is moved. Also U.S. Pat. No. 5,426,367, entitled "Logging of Cased Well by Induction Logging to Plot an Induction Log of the Well" and stating the device "needs the most intimate contact with the pipe in order to eliminate 'air gaps' and still maintain mechanical integrity." Column 8, Lines 40–43. U.S. Pat. No. 6,157,195, entitled "Formation Resistivity Measurements from within a Cased Well Used to Quantitatively Determine the amount of Oil and Gas Present," also requires the transmission of an ac current through the well casing to a remote electrode. This is consistent with earlier patents such as U.S. Pat. No. 6,025,721, entitled "Determining Resistivity of a Formation Adjacent to a Borehole Having casing by Generating Constant Current Flow in Portion of Casing and Using at Least Two Voltage Measurement Electrodes," U.S. Pat. No. 5,260,661, entitled "Calibrating and Compensating Influence of Casing Thickness Variations on Measurements of Low Frequency AC Magnetic Fields within Cased Boreholes to Determine Properties of Geological Formations," U.S. Pat. No. 5,065,100, entitled "Measurement of In-phase and Out-of Phase Components of Low Frequency AC Magnetic Fields within Cased Boreholes to Measure Geophysical Properties of Geological Formations," and U.S. Pat. No. 5,038,107, entitled " Method and Apparatus for Making Induction Measurements Through Casing."

Many of these methods have relied upon the transmission of an electrical current through the casing and into the surrounding formation. All of the methods have required electrical contact be maintained between the apparatus and the casing.

SUMMARY OF THE INVENTION

There has always been a need to provide the capability for continuous or periodic measurements of formation resistivity for a hydrocarbon production well installation. Specifically, there has been a need to "see through" the well casing to the geologic formation located around the production well. There also has long been a need to provide resistivity measurements without interruption of the hydrocarbon production well. There is a great need to collect the above mentioned data using the innovative and revolutionary method comprising the ability to simultaneously (i) generate a magnetic flux, by conventional means, within the confines of a hydrocarbon production well, (ii) create Metallic Transparency region within or through the well casing of a hydrocarbon production well, (iii) engage or transmit through the transparency with oscillating magnetic flux, and (iv) receive and measure through the well casing magnetic flux that may be generated in the media in the geologic formation outside of the well casing. It is already known to those skilled in the art that such measurements can provide information about the resistivity of media within the formation, and hence the composition or change in the media within the geologic formation proximate to the well.

It has been shown that magnetic flux may be transmitted through metals that have a permeability of one weber/amp. These metals can be considered non-permeable, i.e., there is little or no absorption of magnetic flux. However, due to the rapid spreading of the magnetic flux, the flux intensity drops off with respect to distance as the inverse cube of the distance. This can be expressed as $1/D^3$ where "D" represents the distance between the device and the target object. This means that, in the absence of the Magnetic Lens™ effect, there is a significant geometric limitation of traditional devices attempting to transmit and receive electromagnetic signals through non-permeable metals. In addition, the absence of the Magnetic Lens™ effect or the "Directed Magnetic Beam" effect means that the transmitter/receiver (Tx/Rx) separation determines the distance through the metal that will be detected. Assuming the casing material is non-permeable like stainless steel existing as a collar on well casing, a section of well casing or as a flange on a pipeline or any other similar application, the combined $1/D^3$ phenomena and the transmitter/receiver separation distance are major limitations to the detection range, i.e., distance, of the device. This transmitter and receiver ("Tx/Rx") flux field is shown in FIG. 33.

Low frequency electromagnetic waves (2 KHz to 10 KHz) readily pass through non-permeable metals such as stainless steel, and aluminum. The relationship of frequency that may be used to penetrate a particular metal of some thickness is governed by the "skin depth" penetration equation. There is a loss in signal intensity because the electrical conductivity of the metal causes a dissipation of electromagnetic energy. However, it is possible to transmit a magnetic wave of sufficient power and sufficiently low frequency to penetrate any non-permeable metal. It is thus possible to design sensors to be placed in sections of well casing or pipelines at which the permeability of the metal is near unity, i.e., 1 weber/amp. These sections could be well casing collars or spool piece inserts between two pipeline flanges.

The invention subject of this specification provides a method and apparatus for measuring the electrical resistivity of the geologic formation proximate to a hydrocarbon production well installation. A measuring device ("sensor") is configured to allow it to be placed proximate to i.e., within a portion of well casing. Well casing (including hydrocarbon production tubing) is commonly manufactured of materials that are electrically conductive and magnetically permeable. These materials are referred herein as "EM barriers" or "barrier materials." The present invention may create at least one Metallic Transparency region within an EM barrier material. A Metallic Transparency region permits oscillating magnetic flux to be transmitted through the EM barrier.

The sensor tool of the invention therefore includes the capability of generating magnetic flux to magnetically engage and saturate an EM barrier material (utilizing a "magnetic saturation generator"), transmitting oscillating magnetic flux into or through the transparency and a portion of the well casing comprised of non-permeable material, measuring any oscillating magnetic flux generated by the eddy currents induced within an electrically conductive material existing within the geologic formation, e.g., water or hydrocarbons. It will be readily understood that the transmission of oscillating magnetic flux into an electrically conductive material will induce an electric current, i.e., eddy current, by well known scientific principles. The present invention also provides the ability to perform these activities continuously thereby sustaining the eddy currents.

By altering the concentration of the saturation flux, the frequency of the transmitter flux, placement of the transmitters and receivers, or by the orientation of the transmitter in relation to the saturation coil, it is possible to vary the depth of penetration into the geologic formation, thus building a detailed characterization profile of the formation at various distances from the casing. The Metallic Transparency region may also be used to directionally control the flux transmitted through the casing and into the surrounding geologic formation. This may be accomplished by the Magnetic Lens™ focus. Furthermore, the horizontal movement of a logging tool will provide profile data used to triangulate depth field information to various zones of significance.

There is a plurality of subsystems that may be incorporated into the invention. These include the following:

Magnetically Non-Permeable Casing System
Full Saturation Magnetic Flux Circuit
Near Practical Saturation Magnetic Flux Circuit
Transmitter/Receiver System
Nulling System-geometric, electronic, permeability
Automatic Lensing System
Conductivity/Resistivity Measurement System
Wall Thickness Measurement System Each of these subsystems may be incorporated into embodiments of the sensor tool. Each will be discussed as part of the subject invention.

BRIEF DESCRIPTION OF DRAWINGS

The accompanying drawings, which are incorporated in and constitute a part of the specification, illustrate preferred embodiments of the invention. These drawing, together with the general description of the invention given above and the detailed description of the preferred embodiments given below, serve to explain the principles of the invention for resistivity measurement of geologic formations from within an installed ferromagnetic casing or similar material.

Figure 1:
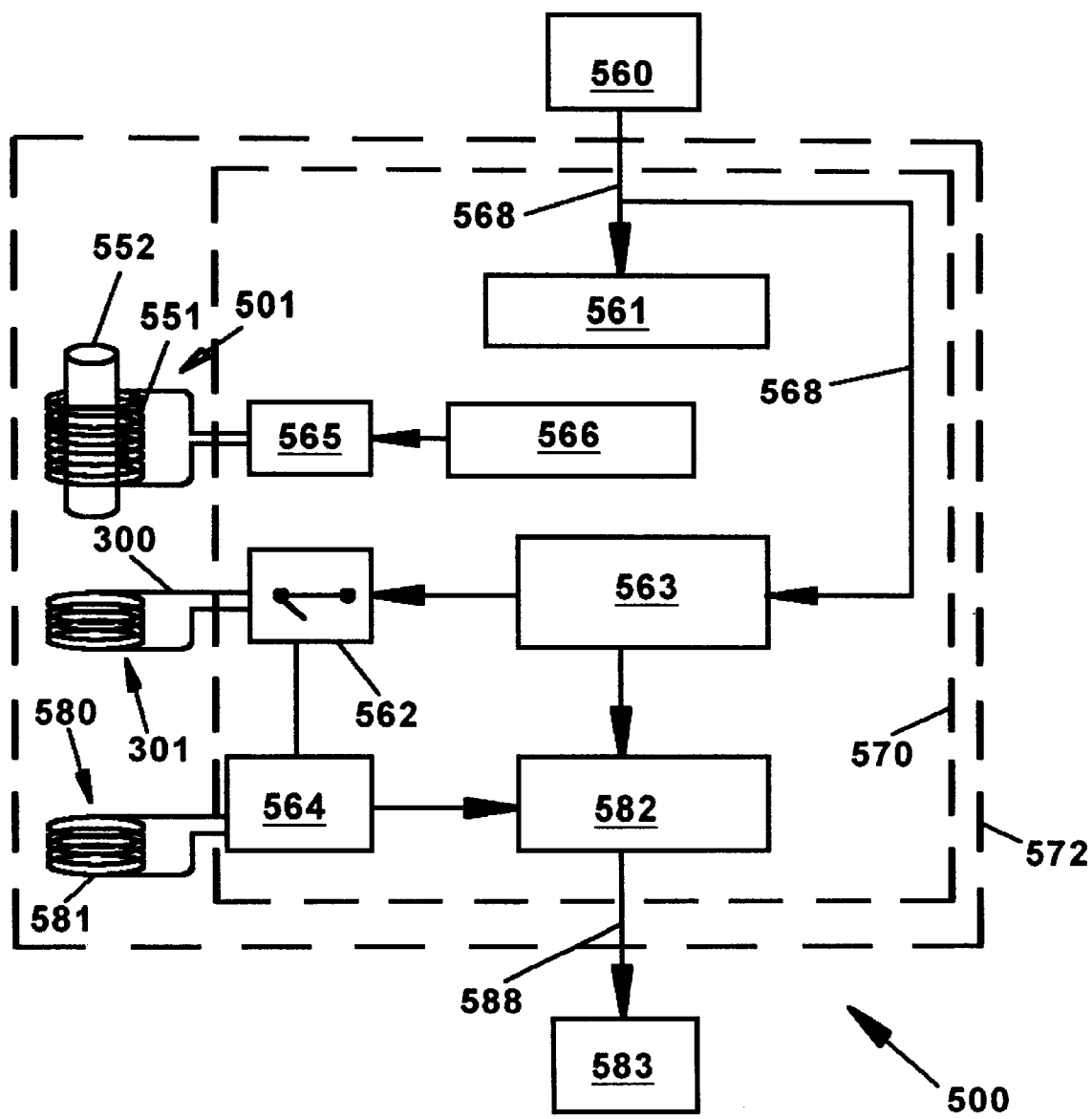
FIG. 1 illustrates a schematic outline of some of the components utilized in the invention for creating "Metallic Transparency" regions and transmitting and receiving magnetic flux.

The above general description and the following detailed description are merely illustrative of the subject invention, and additional modes, advantages, and particulars of this invention will be readily suggested to those skilled in the art without departing from the spirit and scope of the invention.

DETAILED DESCRIPTION OF THE INVENTION

The invention subject of this specification provides a method and apparatus for measuring the electrical resistivity of the geologic formation proximate to a cased well such as a cased hydrocarbon production well. Well casing (the term used herein to include hydrocarbon production tubing or ancillary structures such as casing or tubing collars, connectors or couplings) commonly is manufactured of materials that are electrically conductive and magnetically permeable, i.e., "EM barriers" or "barrier materials." Such materials include ferromagnetic and paramagnetic materials.

The present invention utilizes non magnetically permeable materials such as stainless steel. Such materials are not barriers to the transmission of Electromagnetic waves, but provide comparable material strengths suitable for use as well casing material. It has been shown that oscillating magnetic flux may be transmitted through metals that have a permeability of unity (one weber/amp).

Low frequency electromagnetic waves (2 KHz to 10 KHz) readily pass through non-permeable metals such as stainless steel, and aluminum. The relationship of frequency that may be used to penetrate a particular metal of some thickness is governed by the "skin depth" penetration equation. There is a loss in signal strength because the electrical conductivity of the metal causes a dissipation of electromagnetic energy. However, it is possible to transmit a magnetic wave of sufficient power and sufficiently low frequency to penetrate any non-permeable metal. It is thus possible to design sensors to be placed in sections of well casing or pipelines where the permeability of the casing metal is near unity, i.e., 1 weber/amp. These sections could be a well casing collars or spool piece inserts between two pipeline flanges.

Metals of a permeability of near unity can be considered non-permeable, i.e., there is little or no absorption of magnetic flux. However, due to the rapid dispersion of the magnetic flux, the flux intensity drops off with respect to distance as the inverse cube of the distance. It will be appreciated that the lines of magnetic flux are mutually repulsive. This dispersion or decrease in intensity can be expressed as $1/D^3$ where "D" represents the distance between the device and the target object. This means that, in the absence of the Magnetic Lens™ effect, there is a significant geometric limitation of traditional devices attempting to transmit and receive electromagnetic signals through non-permeable metals. In addition, the absence of the Magnetic Lens™ effect or the "Directed Magnetic Beam" effect means that the transmitter/receiver ("Tx/Rx") separation distance determines the distance through the metal that will be detected. Assuming the casing material is non-permeable like stainless steel existing as a collar on well casing, a section of casing or as a flange on a pipeline or any other similar application, the combined $1/D^3$ phenomena and the transmitter/receiver separation distance are major limitations to the detection range, i.e., distance, of the device.

The present invention overcomes this limitation by focusing or lensing oscillating magnetic flux. This lensing permits the magnetic flux to remain concentrated for distances greater than would otherwise be achieved by traditional transmission methods, thereby increasing the distance from which measurement of electrical resistivity of the surrounding geologic formation can be obtained. This can be achieved by creation of transparencies or windows ("Metallic Transparencies"™ regions) within barrier materials comprising components of the sensor placed in specific configuration to the non-permeable, structural segments of the well casing. These non-permeable portions of the casing can also be components of the sensor tool. Alternatively, it will be appreciated that the sensor components may be placed within or otherwise in a specified orientation or configuration to the non-permeable segment of a well casing. The well casing may be a specially designed casing segment installed in conjunction with standard well casing segments, thereby forming a part of the axial or horizontal length of the casing string lining the length of the bore hole. Obviously the number and placement of such segments containing the sensor tool of this invention may be varied in a specified manner. In one embodiment, these segments can be installed or removed in conjunction with the normal maintenance and replacement of well casing segments.

In simple terms, the invention works in the following steps: (1) One or more magnetic flux transmitter components ("transmitters"), each utilizing one or more coils ("transmitter coil"), are located proximate to a non magnetically permeable portion of the casing. The transmitter creates one or more fields of magnetic flux oscillating at least one frequency suitable to pass through the magnetically transparent segment of the well casing and entering the surrounding geological formation. (2) Electrically conductive media, e.g., water or hydrocarbon, contained within the surrounding formation interact with this oscillating magnetic flux. Through basic electromotive forces, a separate oscillating magnetic flux is induced in the electrically conductive media contained within the formation. (3) The field of this induced magnetic flux extends back to the well casing. As in step No. 1 above, a separate coil ("receiver coil"), similar to that used by the transmitter to create oscillating magnetic flux, can be placed near the same or similar magnetically transparent segment of the casing so that the induced magnetic flux of the geologic formation can be received and measured by this receiver coil located inside the casing. (4) The receiver component, of which the receiver coil is part, converts the induced flux ("receiver flux") into electrical fluxes ("receiver current") that are filtered and processed in order to determine the electrical resistivity of media located in the geologic formation proximate to the well casing. The determination of resistivity is done via calibration to known resistivities and comparison of signals to the known signal responses of these calibration resistivities. The receiver flux is electronically processed to concentrate and magnify the induced oscillating magnetic flux, thereby forming the receiver flux ("receiver current"). The transmitter flux is nulled to minimize direct transmission of flux from the transmitter to the receiver. The transmitter flux is compared to the received flux and, using the changes in amplitude and phase, the electrical resistivity of the media in the surrounding geologic formation is determined and displayed. These fluxes may then be sent to the output display for further processing, display, and recording. The output display, power supply and other ancillary equipment may be located at the well head or surface. Since saturtion of an EM barrier is not required, it is not necessary to create a saturation flux or utilize a saturation core. This conserves electrical power.

The focusing of the oscillating magnetic flux emitted from the sensor can be achieved by (1) a saturation component (magnetic saturation generator) containing a "saturation coil", preferably wrapped around a highly permeable core ("saturation core"). When the saturation coil is energized, it acts as an electromagnet. The saturation coil creates one or more fields of magnetic flux ("saturation flux") adjacent or near a EM barrier material. (This barrier material may be the saturation core.) The saturation flux engages with the barrier material and creates a near practical magnetic saturation of the material. Near practical saturation results in the magnetic permeability of the well casing being substantially lowered. (When fully saturated, the barrier material cannot absorb further magnetic flux, thereby allowing additional flux to pass through the material.) When near practical saturated, the well casing acquires greater capacity to engage or couple with magnetic flux, especially magnetic flux oscillating at relatively high frequencies. In such a state, that portion of the barrier material has become "transparent" to magnetic flux. This near practical saturated section is known as a "transparency" or a "Metallic Transparency" region. (2) One or more magnetic flux transmitter components ("transmitters"), each utilizing one or more coils ("transmitter coil") located proximate to a Metallic Transparency region, then create one or more fields of additional magnetic flux oscillating at frequencies preferably equal to or greater than the saturation flux. This oscillating magnetic flux ("transmitter flux") is engaged with the near practical saturated component (having greatly reduced magnetic permeability) allowing the transmitter flux (or other oscillating magnetic flux induced by eddy currents within the near practical saturated barrier material component) to pass through the Metallic Transparency region of the well casing and enter the surrounding geological formation. (3) Electrically conductive media, e.g., water or hydrocarbon, contained within the surrounding formation interact with this oscillating magnetic flux. Through known basic electromotive forces, a separate oscillating magnetic flux is induced in the electrically conductive media contained within the formation. (4) The field of this induced magnetic flux extends back to the well casing. As in step No. 1 above, a separate coil ("receiver coil"), similar to that used by the transmitter to create oscillating magnetic flux can be placed near the same or similar magnetically transparent segment of the casing so that the induced magnetic flux of the geologic formation can be received and measured by this receiver coil located inside the casing. (5) The receiver component, of which the receiver coil is part, converts the induced flux ("receiver flux") into electrical signals ("receiver current") that are filtered and processed in order to determine the electrical resistivity of media located in the geologic formation proximate to the well casing. The determination of resistivity is done via calibration to known resistivities and comparison of signals to the known signal responses of these calibration resistivities. The receiver flux is electronically processed to concentrate and magnify the induced oscillating magnetic flux, thereby forming the receiver flux ("receiver current"). The transmitter flux is nulled to minimize direct transmission of flux from the transmitter to the receiver. The transmitter flux is compared to the received flux and, using the changes in amplitude and phase, the electrical resistivity of the media in the surrounding geologic formation is determined and displayed. These fluxes may then be sent to the output display for further processing, display, and recording. The output display, power supply and other ancillary equipment may be located at the well head or surface. Accordingly, the method and apparatus of the invention includes the capability of generating magnetic flux ("saturation flux") to engage and magnetically saturate a portion of electrically conductive and magnetically permeable material ("barrier material"). It will be appreciated that in some embodiments of the invention, the near practical saturated barrier material, may be a portion of the well casing comprised of carbon steel or similar material. As will be appreciated by persons skilled in the technology, the near practical saturated well casing, will possess a greater ability to engage and couple with oscillating magnetic flux, thereby allowing the near practical saturated portion of the casing to serve as an antenna for the reception of induced magnetic flux from the geologic formation. An embodiment of the invention may also be used in conjunction with full saturation of a portion of the magnetically permeable and electrically conductive well casing for the transmission or reception of Electromagnetic waves.

The invention also includes the capability to generate and transmit one or more separate oscillating magnetic flux ("transmitter flux") into or through a magnetically transparent region created or constructed in the well casing. The invention also includes the capability to receive and measure any magnetic flux ("receiver flux") induced in the geologic formation proximate to the well casing and penetrating through a magnetically transparent segment of the well casing.

As will be discussed in greater detail below, the preferred embodiment of the invention will include the ability to generate and send a plurality of transmitter flux of differing frequencies, either simultaneously or sequentially. The preferred embodiment will also include the ability to detect and measure receiver flux from a plurality of directions. A preferred embodiment will also have the capability to transmit oscillating flux from a plurality of segments of the well casing in order that one or more frequencies of oscillating magnetic flux may be induced in and focused or directed through well casing utilizing the Magnetic Lensing™ focus.

The preferred embodiment of the invention will also incorporate one or more means to null direct coupling of magnetic flux between the transmitter and receiver, i.e., the direct transmission of the transmitter flux to the receiver coil. In addition, a preferred embodiment of the invention will include means to accurately measure changes in casing properties, e.g., conductivity, permeability and thickness.

It will be appreciated that there is a plurality of components or subsystems in the invention.

These include the following:

Magnetically Non Permeable Casing System
Full Saturation Magnetic Flux Circuit
Near Practical Saturation Magnetic Flux Circuit
Transmitter/Receiver System
Nulling System-geometric, electronic, permeability
Automatic Lensing System
Conductivity/Resistivity Measurement System
Wall Thickness Measurement System All or some of these subsystems may be incorporated into the preferred embodiment of the sensor tool subject of this invention. Each will be discussed in greater detail below.

1. Magnetically Non Permeable Casing System

The magnetically non-permeable casing system permits the transmission and reception of magnetic flux through the well casing. The system may consist of stainless steel collars through which an omni directional signal could be transmitted and received. These collars may be used in conjunction with the joining or coupling of two standard segments of casing.

Another embodiment of the system may be use of stainless steel or other non magnetically permeable material casing segments in which the transmitter or receiver components are installed. Separate segments may be used in conjunction with transmitters or recievers, with standard casing segments installed between the separate magnetically transparent segments. Alternatively, separate collars or other components ancillary to standard coupling mechanisms may be constructed of such magnetically transparent material. These components could be incorporated into the coupling of standard carbon steel casing. Separate components could contain transmitters or receivers, permitting the receiver(s) to be separated from the transmitter(s) by one or more sections of ferromagnetic well casing. Also these transmitters and receivers could be used in pairs in particular directions. Therefore, the operation of these pairs can provide additional directionality.

Of course the magnetic transparent system may also be used in conjunction with components comprising EM barrier materials. Also, a plurality of systems may be used at various locations along the well casing string, thereby facilitating the measurement of electrical resistivity at multiple locations within the well bore.

2. Full Saturation Magnetic Flux Circuit

The design of the saturating magnetic flux system (hereinafter "saturation circuit," or "magnetic saturation generator") allows the reduction of the permeability of an adjacent portion of casing constructed of an EM barrier to near 1 henry/meter. It will be appreciated by those skilled in the technology that the barrier material comprising the well casing, e.g., carbon steel, may have relative permeability in excess of 10,000 at a typical magnetic flux density. A fully saturated portion of the casing is, however, transparent to the transmission of additional magnetic flux. In this state of full saturation, the fully saturated or transparent portion of the casing can not absorb further magnetic flux. Therefore, a second and oscillating magnetic flux from the transmitter of the invention will penetrate through the transparency of the casing and into the surrounding geologic formation. It is therefore possible to measure the electrical resistivity of the geological formation proximate to the transparency created in the casing. As with the magnetically non permeable material, the depth of penetration of the oscillating magnetic flux into the media within the near field of the saturated casing is proportional to the separation distance between the transmitter and receiver of the invention. This is very useful for near casing measurements. A series of receivers placed at varying distances from a single transmitter could establish various depths of measurement directionally into the surrounding geological formation proportional to these separations. It will be noted, however, the as the separation distance "D" between the transmitter and receiver(s) is increased, the density of the flux decreases at a rate of $1/D^3$ and that when the well casing is fully saturated, i.e., its relative permeability approaching "unity" or 1, the Magnetic Lensing focus can not be utilized.

3. Near Practical Saturation Magnetic Flux Circuit

When in a state of near practical saturation, the effected portion of the EM barrier can be used for the Magnetic Lens™ focus. Simply stated, when near practical saturated, the relative permeability of the barrier material is substantially reduced, thereby allowing greater penetration by the oscillating transmitter flux, particularly at higher frequencies. However, the relative permeability of the EM barrier remains greater than unity. (Relative permeability is a value expressed without units of measure.) The near practical saturated EM barrier continues to absorb a significant portion of the transmitter flux. Since the barrier material is also electrically conductive, eddy currents are generated within the barrier material. Oscillating magnetic flux induced by the eddy currents is emitted from the near practical saturated barrier material into the geologic formation. The reduced permeability can be utilized to control and concentrate this induced magnetic flux emitted from the near practical saturated barrier material. The near practical saturated EM barrier therefore acts as a lens to concentrate and direct oscillating magnetic flux transmitted into the surrounding geologic formation. This allows measurement of the electrical resistivity of media within the formation and more distant from the well casing than can be achieved by controlling the separation distance between the transmitter and receiver.

If a partially transparent volume region is created, a separate oscillating EM wave is transmitted into this partially transparent volume region, preferably of a higher frequency than the first EM energy source. Eddy currents are generated in the partially transparent material. An oscillating magnetic flux is induced by these eddy currents. At least some portion of the magnetic flux from this induced magnetic field is transmitted out from the partial barrier material. However, the lines of flux are bent or altered as they are emitted out from the surface of the near practical saturated material into the surrounding environment. This bending of magnetic flux can be controlled, allowing the lines of magnetic flux to be focused on an object existing on the opposite side of the barrier material from the magnetic saturation generator transmitter. This focusing partially counteracts the normal rapid geometric spreading of magnetic flux. Concentrating the magnetic flux allows distant sensing using much less power. When utilized in this manner, the magnetic saturation generator includes the Magnetic Lens™ focus capability.

4. Transmitter/Receiver System

There may be a multiplicity of transmitter/receiver configurations and orientations.

(a) Transmitter—There may be more than one transmitter arranged directionally around the casing. In addition, the flux of multiple transmitters may be bucked with respect to each other to propagate the transmitter flux further out into the geologic formation. Also this bucking or interaction among magnetic flux oscillating at the same frequency may be used to direct transmitter flux in a controlled manner. A plurality of transmitters may be configured to achieve a desired transmitter flux geometry.

(b) Receiver—There may be a plurality of receivers used in an evenly or unevenly spaced array. The winding of receiver coils may be bucked or used to enhance the flux or establish directionality of received flux.

5. Nulling System

The receiver system must be nulled with respect to the transmitter system. This nulling prevents the receiver system from being overwhelmed by the flux emitted from the transmitter system. It also minimizes the interference of extraneous electrical fluxes, i.e., electrical noise. It has been found that a combination of three nulling techniques provides the best results. These three systems are (a) geometric, (b) electronic, and (c) transmitter flux absorption by permeability.

(a) Geometric nulling—A wide combination of geometric nulling systems may be used. The respective design and location of each transmitter and receiver may vary in consideration of the placement and design of the other transmitters or receivers and in consideration of the location and geometry of the Metallic Transparency region. Therefore, by not wrapping either the transmitter or receiver coils, or both, around the magnetic saturation generator of the casing allows a number of advantages. These are:

1. Mechanical nulling by receiver or transmitter placement or rotation with respect to each other, or with respect to the casing.

2. Directionality by being nearest the casing side of the saturation core, or by rotation of the axis of the transmitter or the receiver.

3. Minimizing possible saturation of the magnetic saturation generator core that would cause uncontrolled dispersion of saturation flux. The dispersed saturation flux may achieve only partial saturation of a selected portion of the well casing. This may be a desired result. This is exactly opposite the concern cited in U.S. Pat. No. 5,038,107 which does not want to use an ac current on the magnetic saturation generator core that may take the walls or core out of saturation.

4. Since the transmitter coil can have an air core, laminated core or smaller inductor core than the magnetic saturation generator core, much higher frequencies can be used for the transmitter flux. This is due to the inductive impedance resulting from the presence of a large metallic saturation core. This large saturation core drives up the total impedance. It will be appreciated that this can be another advantage of selected use of non magnetically permeable metal (that does not require saturation).

5. Multiple transmitters, each at different frequencies, may broadcast simultaneously to perform spectroscopy over a large frequency range.

6. Transmitters comprised of differing coil geometries will have different flux geometries. Therefore varying the design of the transmitter, e.g., varying the coil length may also be used to control the portion of the surrounding formation that will be investigated.

7. For applications utilizing full saturation, the transmitters and receivers should be placed in sufficient proximity to the Metallic Transparency region to prevent a large amount of either transmitter flux or receiver flux being absorbed a the non-saturated high permeability material.

b 8. Multiple transmitters can be used to "buck" each other, thereby causing the geometry of the transmitter flux to be altered. This may achieve a greater penetration into the surrounding formation without utilization of magnetic lensing.

9. Multiple receivers can be either nulled with respect to each other and/or built into an array for improving flux receiving resolution. These techniques may incorporate reversing the direction of at least one of the transmitter coils or altering the length of at least one of the transmitter coils in relation to the other(s).

(b) Electronic nulling—In this nulling type, it is possible to either null by creating a receiver flux 180° out of phase and exactly in reverse amplitude to the transmitter flux. Another method is measuring the receiver flux attributable to direct coupling of the transmitter flux and subtracting this value from all other measured values of receiver flux.

(c) Permeability nulling—In this nulling method, a variety of ways may be used to absorb the transmitter flux before it reaches the receiver. This may be accomplished by separating the transmitter and receiver by enough high permeability material to absorb the transmitter flux before it reaches the receiver coil. Another absorption method is to isolate the transmitter from the receiver by highly permeable materials such as EM barriers or by placing the receiver coil a large enough distance from the transmitter such that the transmitter flux is absorbed prior to reaching the receiver coil.

6. Automatic Lensing System

One variation of the invention utilizes an oscillating transmitting current penetrating into a casing consisting of a near practical saturated barrier material. This oscillating current induces eddy currents within the barrier material. The eddy currents induced within the near practical saturated EM barrier induce a separate oscillating magnetic flux. The field of this oscillating magnetic flux radiates out of the near practical saturated material and into the surrounding geologic formation. This oscillating magnetic flux will generate separate eddy currents within the effected region of the electrically conductive media of the geologic formation.

In this manner, the casing serves as an antenna for the transmission of oscillating magnetic flux. In addition, the Magnetic Antenna™ capability of the casing can be utilized to focus or direct the second and separate oscillating magnetic flux in a controlled manner. This feature is termed "Lensing" and the component termed a Magnetic Lens™ focus. Alternatively, the core of the magnetic saturation generator utilized in conjunction with the transmitter may become an antenna for the transmitter flux.

There is a relationship between the amount of power utilized by the magnetic saturation generator required to achieve near practical saturation and the power utilized by the transmitter. This relationship can be used to optimize the Magnetic Lens™ focus effect and the strength of the receiver flux. When the transmitter and receiver are separated in a bistatic configuration, it has been found that optimized flux strength is achieved by increasing the saturation flux proximate to the receiver by as much as a factor of four over the power utilized to create the partial transparency proximate to the transmitter. This enhances the transparency of the casing proximate to the receiver. This relationship between the magnetic flux for the receiver and transmitter can be derived by known methods. This relationship varies as the casing metal thickness varies and as the permeability and conductivity also vary.

7. Conductivity, Permeability Measurement System To perform accurate measurements of the media outside the casing, the measurements of electrical conductivity and magnetic permeability of the barrier material are required.

(a) The conductivity is measured at every new reading in the casing by analyzing the frequency spectral response over a sufficient range to measure the effects of conductivity on the various frequencies.

(b) The permeability of the casing exhibits a functional relationship to the strength of the saturating coils. Therefore, at each location the power of saturation flux is varied. The frequency of the flux is maintained constant. The change in casing permeability responsive to changes in the saturation flux density is monitored.

Reference will now be made in detail to the present preferred embodiments of the invention as described in the accompanying drawings.

FIG. 1 illustrates schematically one embodiment of the components of the sensor tool 500 subject of the invention. The components of the tool that are utilized within the well casing are contained within the tool housing 572. This tool includes (a) a magnetic saturation generator 501 for creating a region of full or near practical saturation in an EM barrier (e.g. well casing or tool component) and comprising a saturation coil 551, (b) a magnetic flux transmitter component 300, comprising the transmitter coil 301, a switch 562, and a low noise amplifier (LNA) 564, (c) a receiver component 580 for the receipt and measurement of magnetic flux penetrating through the well casing and comprising a receiver coil 581, (d) a frequency generator 563, (e) a pulsar 566, (f) one or more capacitors 561 and (g) a nulling device 582. The magnetic saturation generator, includes the saturation coil 551, saturation core or magnetic culminator (not shown). The magnetic saturation generator 501, saturation coil 551, the transmitter 300, transmitter coil 301 and any associated core (not shown), the receiver 580, including the receiver coil 581; and the associated components described above and depicted within the tool housing 572, can be lowered into, maneuvered into a selected position within the well casing string. The output display 583, operator controls (not shown) and power source 560 are typically located at the well head or surface and linked to the logging tool housing 572 by means of standard cables and connectors 568 and 588. The operator's console or display 583 may also record and display historical trends of resistivity.

Figure 1A:
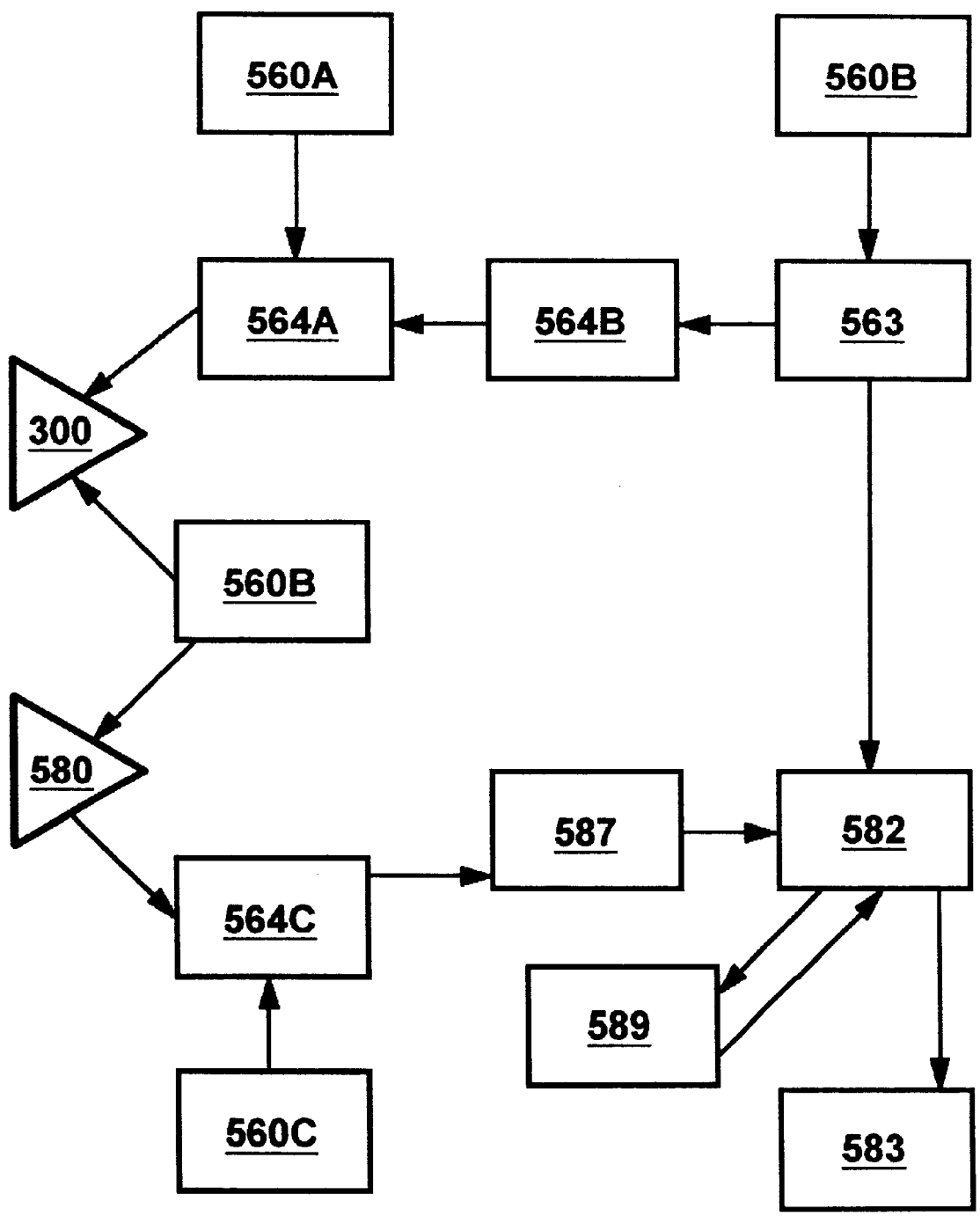
FIG. 1A illustrates an alternate schematic outline of some of the components utilized in the invention.

FIG. 1A illustrates an alternate embodiment utilizing a high voltage 560A and low voltage 560B power source. The low voltage power source may be utilized for the transmitter flux and for the digital flux processor 582. The high voltage power source may be used with an amplifier 564 for desired amplification of the transmitter flux. A dc power supply is preferably used for generating the saturation flux. It may also be found to be advantageous to utilize an analog to digital flux signal converter 589. It is envisioned that such a converter, as well as other sub-components, may be contained within the electronic component 570 discussed above.

The saturation coil 551 is a principle element of the magnetic saturation generator 501. It may be utilized in conjunction with one or more transmitter components, receiver components, or combinations of both. The saturation coil generates a magnetic flux that engages (or couples) with and saturates (or near practical saturates) a portion of an EM barrier. The transmitter coil 301 is the principle element of the transmitter component ("transmitter") 300. The transmitter creates the oscillating magnetic flux ("transmitter flux") that engages with and is transmitted through the well casing (not shown).

It may be appreciated by persons skilled in the technology after reading this specification that the composition of the well casing (or tool component) may be modified in a selected manner to adjust the permeability in relation to the oscillating flux transmitter, thereby achieving directional focus of the flux emitted from or through the casing.

When the well casing is saturated with magnetic flux from the magnetic saturation generator, one or more additional transmitter flux from the transmitter 300 may pass through the well casing into the surrounding geologic formation. Preferably, the saturation coil generates a low frequency or constant magnetic flux. The oscillating magnetic flux of the transmitter will preferably be at a higher frequency than the frequency of the saturation flux. In the preferred embodiment of the invention, the transmitter has the capability to generate a plurality of separate magnetic flux, each having distinct frequencies.

The receiver 580 may be combined with a separate saturation coil, thereby allowing the receiver to be placed away from the transmitter. This has a number of advantages, including facilitating nulling between the transmitter and receiver. An embodiment of the logging tool of the present invention in which the transmitter and receiver are located proximate to separate magnetic saturation generators is termed a "bistatic arrangement" or "bistatic configuration."

The saturation coil 551 and saturation core 552, the transmitter coil 301 and the receiver coil 580, are often depicted separately from the other components described above and depicted within the "electronics component" 570. For clarity, many of the drawings contained within this specification do not depict the electronics component. Further, the drawings may show an illustration of a coil only, but may be variously labeled as a magnetic saturation generator, transmitter or receiver. It is understood that the other components or sub-components are deemed to be included as necessary. In addition, the components of the invention, including but not limited to the saturation coil, transmitter coil and receiver coil are not placed in physical contact with the casing.

Figure 2:
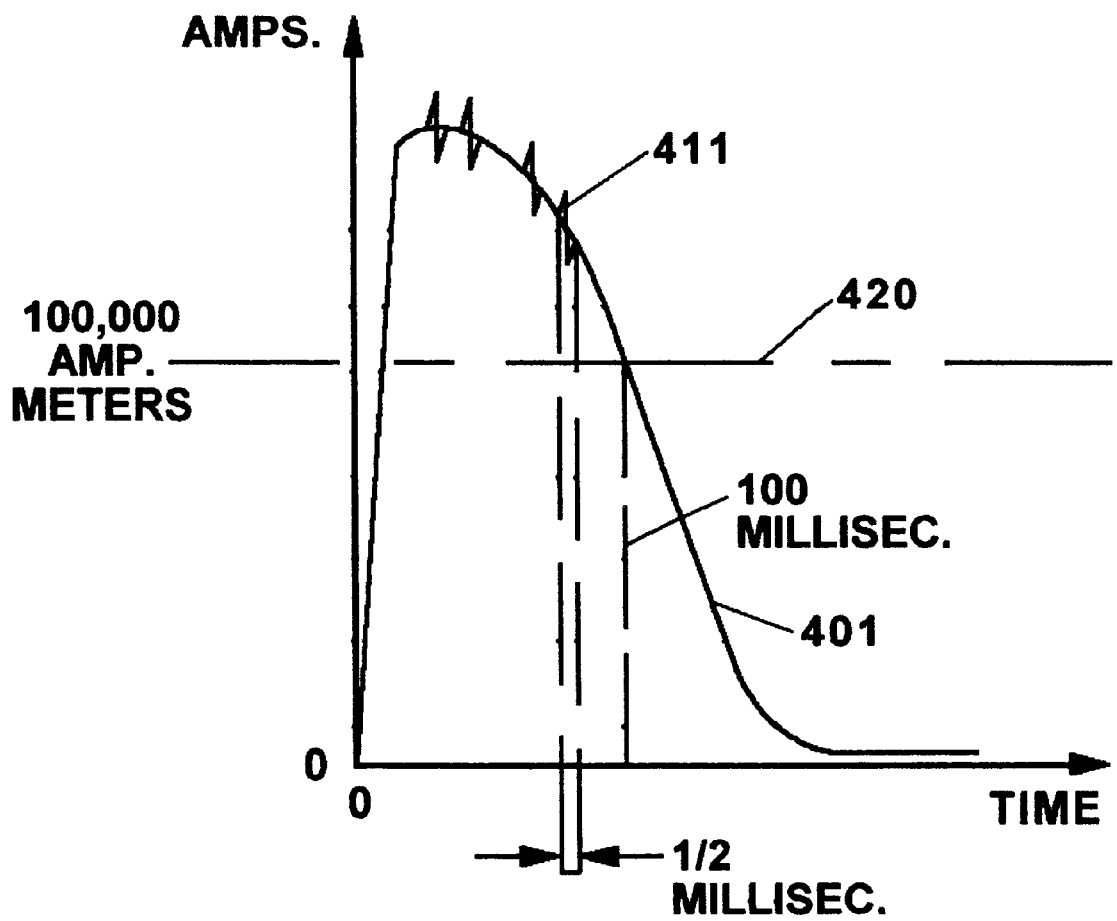
FIG. 2 illustrates an embodiment of the invention whereby an oscillating magnetic flux saturates a well casing and a second, higher frequency oscillating flux is transmitted through the well casing during the time of saturation.

FIG. 2 illustrates a graph of current versus time with respect to the present invention. FIG. 2 illustrates three significant features in practicing the present invention: the level or quantity of saturation flux required to achieve saturation through the casing 420, the higher frequency transmitting flux 411 and, as compared with the transmitter flux, the lower frequency of the actual saturation flux 401. The higher frequency transmitter flux 411 is imposed on the lower frequency saturation flux 401. FIG. 2 illustrates the higher frequency oscillating transmitter flux as spikes 411 disposed along a lower frequency oscillating saturation flux 401. In one embodiment of the present invention, the transmitter flux 411 may be transmitted only during the duration of each cycle of the oscillating saturation flux 401 that is above the level 420 required for saturation. Among other advantages, the latter embodiment minimizes energy consumption. In the latter embodiment, it is possible to have multiple transmissions of transmitter flux 411 during each phase that the saturation flux 401 is above the saturation level 420.

The saturation flux 401 may not achieve the flux density necessary to saturate the targeted area of the EM barrier material. However, when near practical saturated, the barrier material will allow a significantly greater portion of the distinctively higher frequency transmitter flux 411 to couple, i.e., penetrate, into the material to generate eddy currents within an area of near practical saturation or, alternatively, be of sufficient magnitude to saturate a portion of the material when combined with the saturation flux and therefore allowing the transmitter flux to directly penetrate through the material. In another embodiment, the saturation flux may be generated from at least one permanent magnet, a low frequency ac current or a direct current dc electromagnetic device.

Illustrated schematically as an apparatus in FIG. 1 and conceptually in FIG. 2, the saturation coil 551 generates the saturation flux, which in turn creates the Metallic Transparency region in the barrier material. The saturation coil is comprised of conductive material preferably wrapped around a highly permeable core (saturation core or flux circuit core) and powered either by dc current or a current oscillating at a low frequency. The transmitter flux 411 may be generated by the transmitter 300, comprised of the coil 301 of conductive material, powered by alternating current, preferably at a controlled frequency, wrapped upon or near the saturation coil 551. Preferably, the transmitter flux is at a higher frequency than the saturation flux. It is preferred that the frequency of the transmitter flux be at least a multiple of 10 greater than the frequency of the saturation (also termed saturation flux). As discussed above, the higher frequency of the transmitter flux relative to the saturation flux allows, for example, 10 wavelengths of the transmitter flux to be emitted, and thereby penetrate into the surrounding geologic formation, for inducing an oscillating flux in any electrically conductive media within the formation that may be detected and measured by the receiver before the Metallic Transparency region is closed by the saturation flux falling below the level 420 required to achieve saturation.

In FIG. 2, the high frequency transmitter flux 411 is illustrated being pulsed at less than 0.5 millisecond rates. If the lower frequency saturation flux 401, generated by the saturation coil 551, is pulsed or activated "on" for 10 milliseconds 430, there is sufficient time for twenty wavelengths of transmitter flux (e.g., with a wavelength period of only 0.5 millisecond) to be emitted through the saturated casing and into the surrounding geologic formation. As explained in the preceding paragraph, these 20 wavelengths of oscillating flux 411 emitted during the "on" pulse of the saturation flux 401 may induce oscillating eddy currents that may be detected and measured by the receiver located within the casing and comprising part of the tool subject of this invention.

For most applications, a power source of 300 watts or less is sufficient to create the transmitter flux and saturation flux. For thicker material, strong pulses and fluxes may be generated by utilizing charge storing capacitors 561. The capacitors 561 are slowly charged then quickly discharged through a switch contact and then through the low impedance large coil 551. At the same time, the higher frequency small flux coil 300 is pulsed.

With reference to the preceding abbreviated outline of the invention and FIG. 1, the invention comprises the following steps and utilizes the referenced components and sub-components: (1) The saturation coil 551, when energized, acts as an electromagnet. The saturation coil creates one or more fields of magnetic flux adjacent or near the well casing (not shown). The saturation coil creates a partial or full magnetic saturation within at least a portion of the well casing immediately proximate to the saturation coil 551. Saturation results in the magnetic relative permeability of the well casing being substantially lowered. When fully saturated, that portion of the well casing cannot absorb further magnetic flux, thereby allowing additional flux to pass through that portion of the well casing. In such a state, that portion of the well casing has become Metallically Transparent to magnetic flux. In order to create a full Metallic Transparency region, the full saturation must extend through the thickness of the casing. (2) The transmitter 300 then creates one or more fields of additional magnetic flux having frequencies preferably equal to or greater than the saturation flux. The second field of magnetic flux is engaged with the section of full or partial saturation (having greatly reduced magnetic relative permeability) allowing the transmitter flux to pass through the transparency of the well casing and enter the surrounding geologic formation. (3) Media in the surrounding formation that contains electrically conductive properties interact with the oscillating magnetic flux created by the transmitter 300. Through basic electromotive forces, a separate oscillating magnetic flux is induced in the electrically conductive media. (4) The induced magnetic flux travels back to the well casing. As in step No. 1 above, the same or similar saturation coils 551 create a transparency near the receiver 580 so that the induced magnetic flux can be detected and measured through the casing. (5) The receiver converts the induced flux into electronic signals that are filtered and processed in order to determine the resistivity of media located outside the casing. The received flux signal is processed using various electronic components (which may be located within the electronic component 570) to concentrate and magnify the reacted oscillating magnetic flux signal. The invention may contain means 582 to electronically null the transmitter flux to minimize direct transmission of flux from the transmitter 300 to the receiver 580 and to minimize the interference of electronic noise. The transmitted flux is compared to the received flux signals and, using the changes in amplitude and phase, the resistivity is determined and displayed. The determination of resistivity is done via calibration to known resistivities and comparison of signals to the known signal responses of these calibration resistivities. These flux signals are then sent to the output display 583 for further processing, display, and recording.

Figure 3:
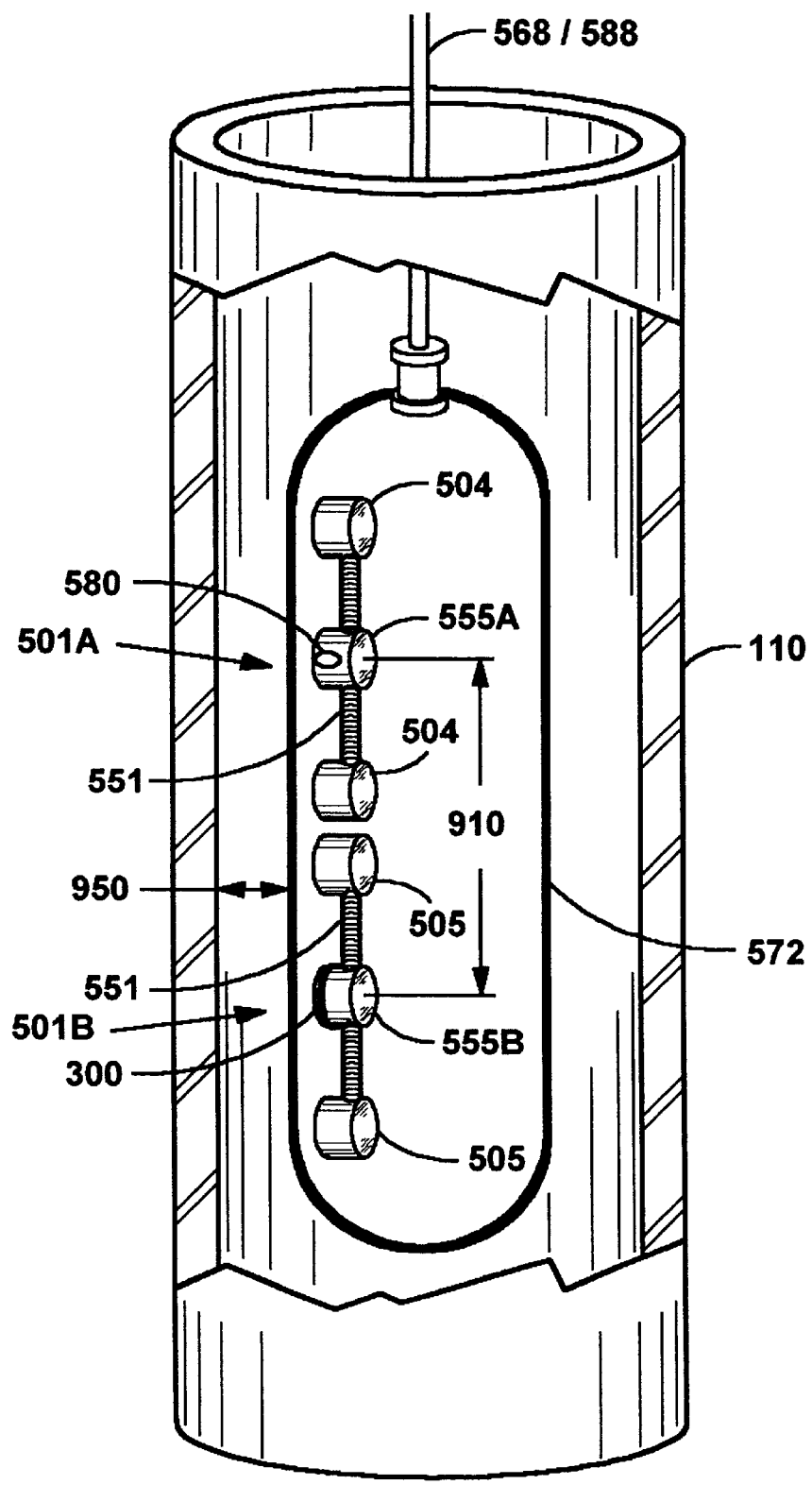
FIG. 3 illustrates an embodiment of the invention contained within a housing and having the transmitter and receiver in a bistatic configuration.

FIG. 3 illustrates the logging tool 500 containing components of the invention installed within a housing 572 configured to fit within and be lowered into a well casing 110. The outside diameter of the sensor apparatus of the present invention ("tool") allows the tool 500 to be lowered and raised along the axial path of the well casing 110. It should be noted that a tool might be configured also for utilization within the production tubing installed inside a well casing. The standard communication 588 and power cables 568 that are used currently for production systems provide the linkage from the logging tool components located within the housing to the surface controls. The tool needs no more power or special communications than is already available by means of existing tool systems.

Figure 8:
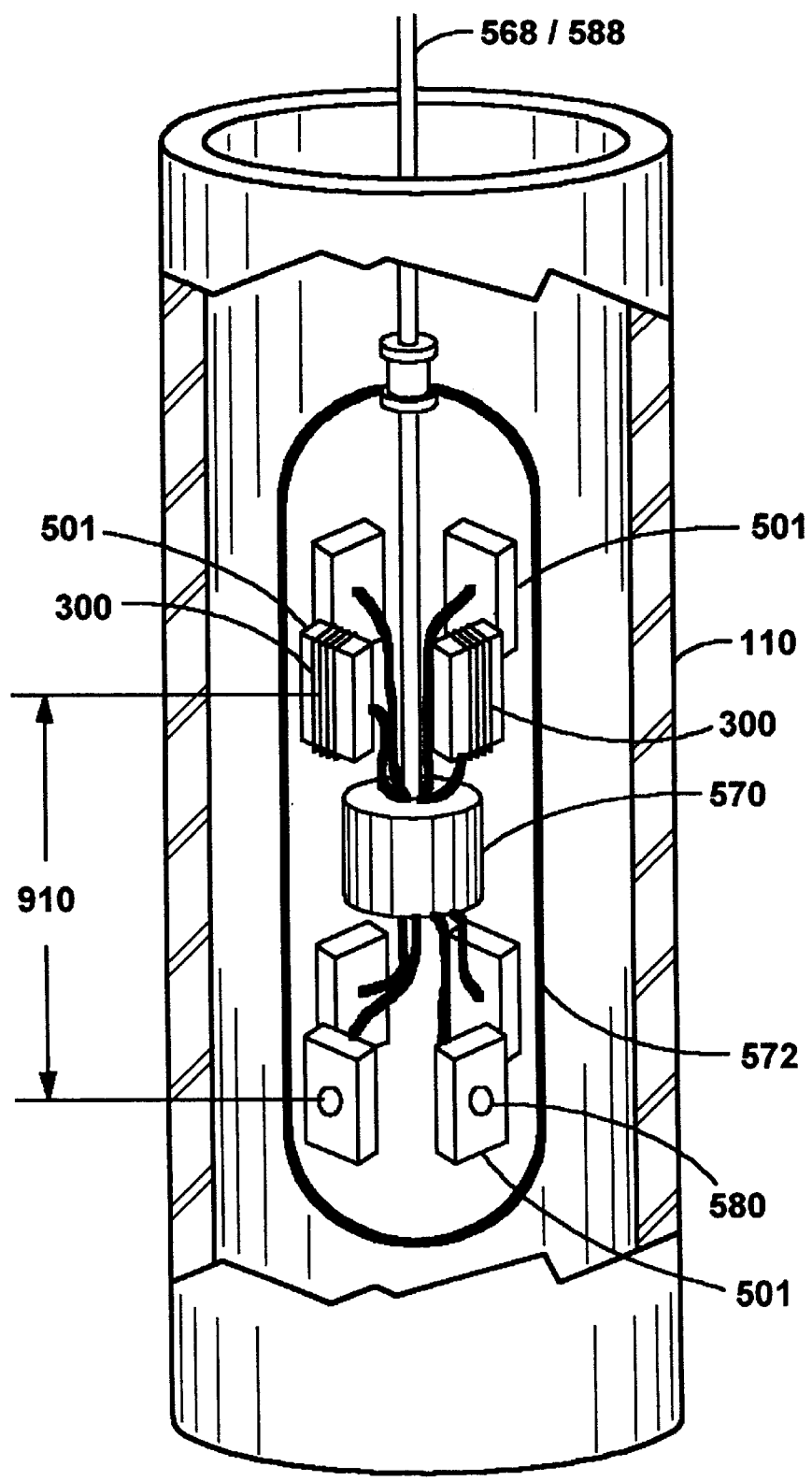
FIG. 8 illustrates another embodiment of the invention comprising a multiple array of transmitters and receivers.

In other embodiments, batteries (not shown) may provide the power for operation of the tool within the housing 572. In yet other embodiments, the tool can be configured with a plurality of components. For example, multiple receivers could be utilized with one or more transmitters. In still other embodiments, the tool components may be configured in series or parallel. Other embodiments may utilize a plurality of components to achieve transparencies, magnetic flux transmission and reception in multiple directions within the same vertical depth. The tool may also be configured with a plurality of housing components interconnected and containing multiple configurations of components, i.e., transmitters, receivers or electronic components. This may facilitate measurements being made in multiple directions or to make multiple measurements for increased accuracy, including measurements with multiple frequency or different lensing or transparency configurations. FIG. 8 illustrates an example of this configuration of multiple transmitters, etc.

In the preferred embodiment of the invention, the housing 572 consists of a non-permeable material such as stainless steel. It may also be manufactured of material that is also not electrically conductive, such as a ceramic or glass fiber reinforced material, e.g., a fiberglass structure. Again, it should be noted that FIGS. 3 and 8 illustrates a bistatic configuration of the invention, thereby having the receiver 580 and transmitter 300 each incorporated within a separate flux generator 501A and 501B.

Figure 3A:
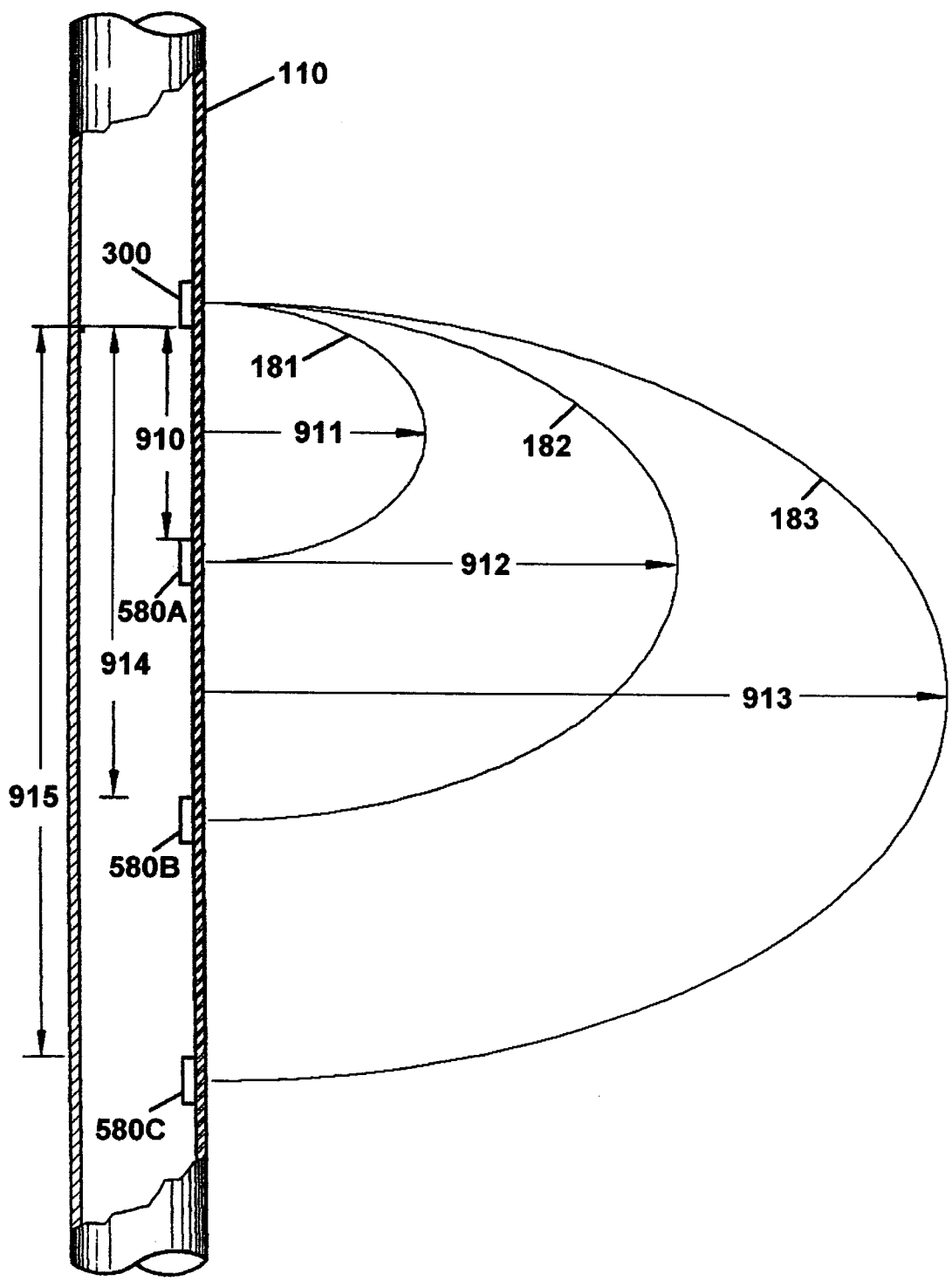
FIG. 3A illustrates the multiple depths of penetration achieved in the near field utilizing multiple receivers.

FIG. 3 shows a separation distance "D" 910 between the transmitter 300 and receiver 580, each incorporated as part of a culminator 555B and 555A respectively. FIG. 3A illustrates another embodiment of this configuration, but with multiple receivers 580A, 580B and 580C built into an array for improving flux resolution or detection of fluxes from electrically conductive media within the formation and at varying distances from the casing. The transmitter 300 and receiver 580A, 580B and 580C may each be incorporated into or used in proximity to separate magnetic saturation generators (not shown). A single transmitter flux can be used to detect electrically conductive media at varying distances by locating separate receivers at varying distances from the transmitter.

Within the near field, the distance of preferred flux reception will be a function of the distance "D" of the receiver from the transmitter, e.g., 910 or 914 or 915. Lines 181,182 and 183 represent 3 flux lines of the same transmitter flux. The receiver 580A, located distance 910 from the transmitter, will receive fluxes from electrically conductive media located along the arc of flux line 181. The most distant flux will be detected from an object at a distance 911 from the casing. Receiver 580C, located distance 915 from the transmitter 300, will receive fluxes from electrically conductive media located along line 183. The most distant flux will be at a distance 913 from the well casing. The geometry of the configuration results in the most distant flux for any transmitter/receiver combination will be at a point between the transmitter and receiver. The greatest distance capacity will not exist directly in front of the transmitter. It will be appreciated that the power required to generate a flux detectable by 580C will be significantly greater than the power to create a flux detectable by 580A.

Figure 4A:
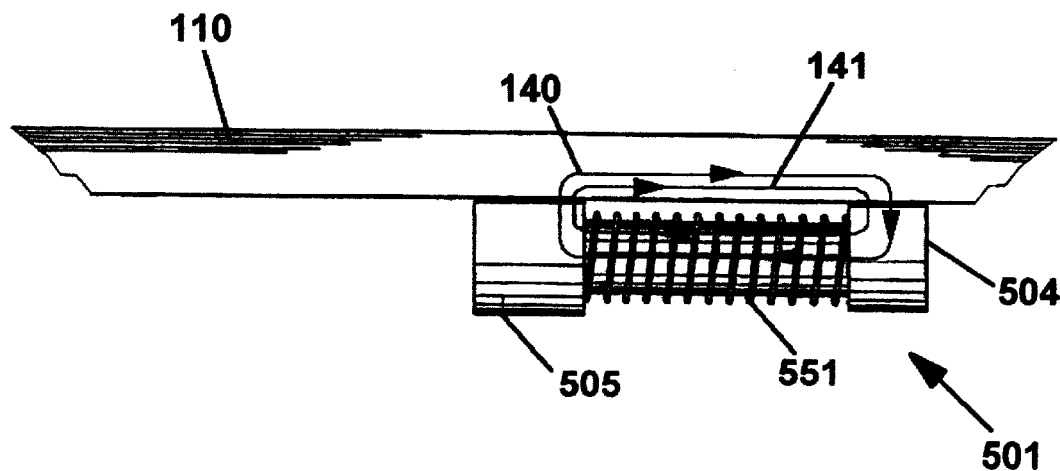
FIG. 4A illustrates an embodiment of the magnetic saturation generator component of the invention utilized to engage or couple to a ferromagnetic well casing with magnetic flux.

FIG. 4A is a single axis magnetic saturation generator (magnetic saturation generator) device 501 that may be utilized for the sensor tool subject of this invention. The one-dimensional magnetic saturation generator 501 has magnetic flux lines 140 and 141, pole orientations north 505 and south 504. It is of course recognized that the pole orientations may be switched without a change in the subject invention. This saturation flux engages the EM barrier material 110. It is also noted that most, if not all of the magnetic flux will shift to the side of the inducer adjacent to the barrier material. This is attributable to the high magnetic permeability of the EM barrier, i.e., ability to absorb magnetic flux.

Figure 4B:
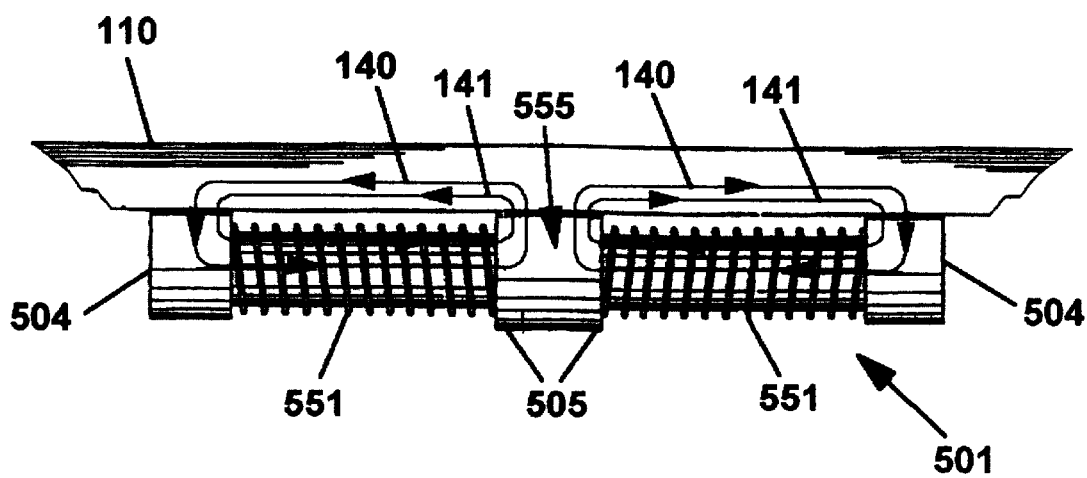
FIG. 4B illustrates an alternate embodiment incorporating a magnetic culminator as part of the magnetic saturation generator.

FIG. 4B is another embodiment of a single axis magnetic saturation generator 501 but having two cores 551 and south poles 504. The two north poles 505 are combined into a magnetic culminator 555. It will be appreciated by persons skilled in the technology that the culminator 555 must be of sufficient magnetic permeability and mass in order that it not be fully saturated by the saturation flux or by a combination of the saturation flux and transmitter flux.

Figure 4C:
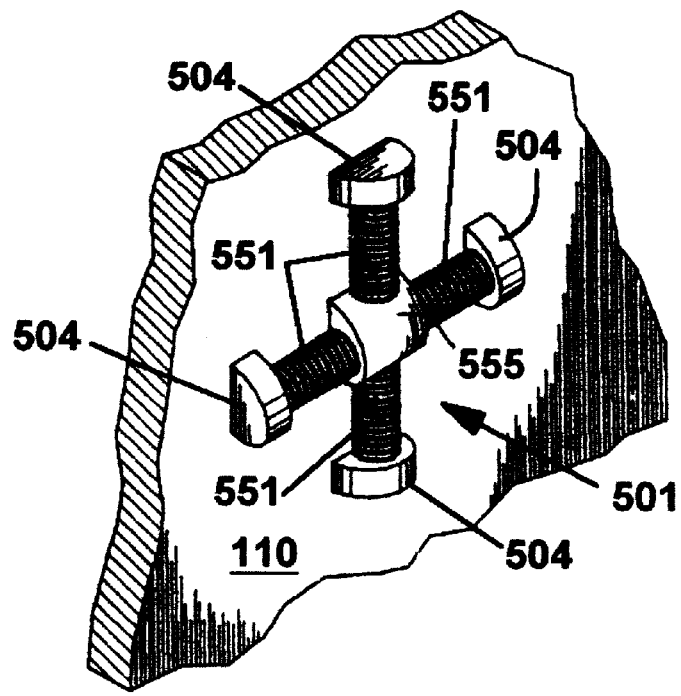
FIGS. 4C and 4D illustrate alternate embodiments of the invention incorporating magnetic culminators.
Figure 4D:
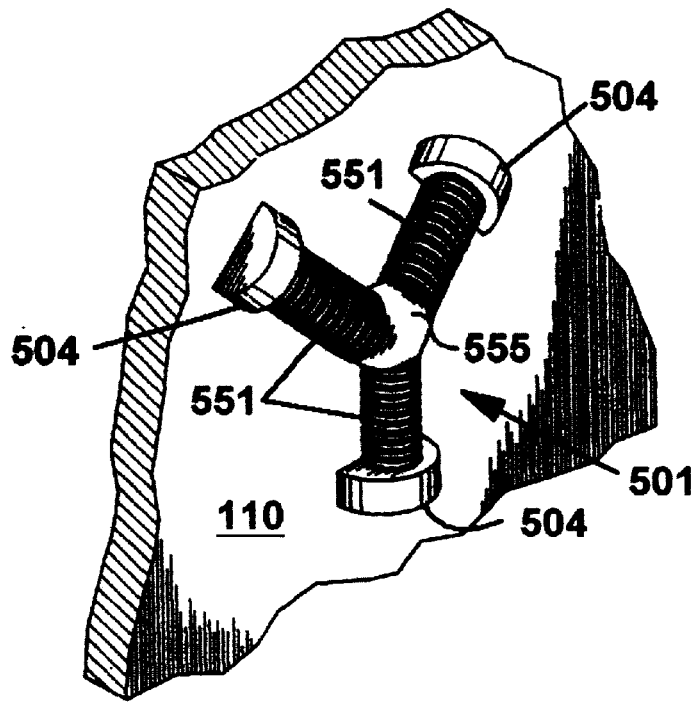

FIG. 4C is a cross-axial magnetic saturation generator device 501 utilizing a magnetic culminator 555. The cross-axial cross-flux magnetic saturation generator is adjacent to the well casing 110. The four like poles 504 are connected to four separate cores 551. The opposing magnetic poles are contained within the mass of the magnetic culminator 555. FIG. 4D is a three-axis magnetic saturation generator device 501 also incorporating a magnetic culminator. The three-axis device is illustrated adjacent to the well casing 110 that comprises an EM barrier.

Figures 5A, 5B:
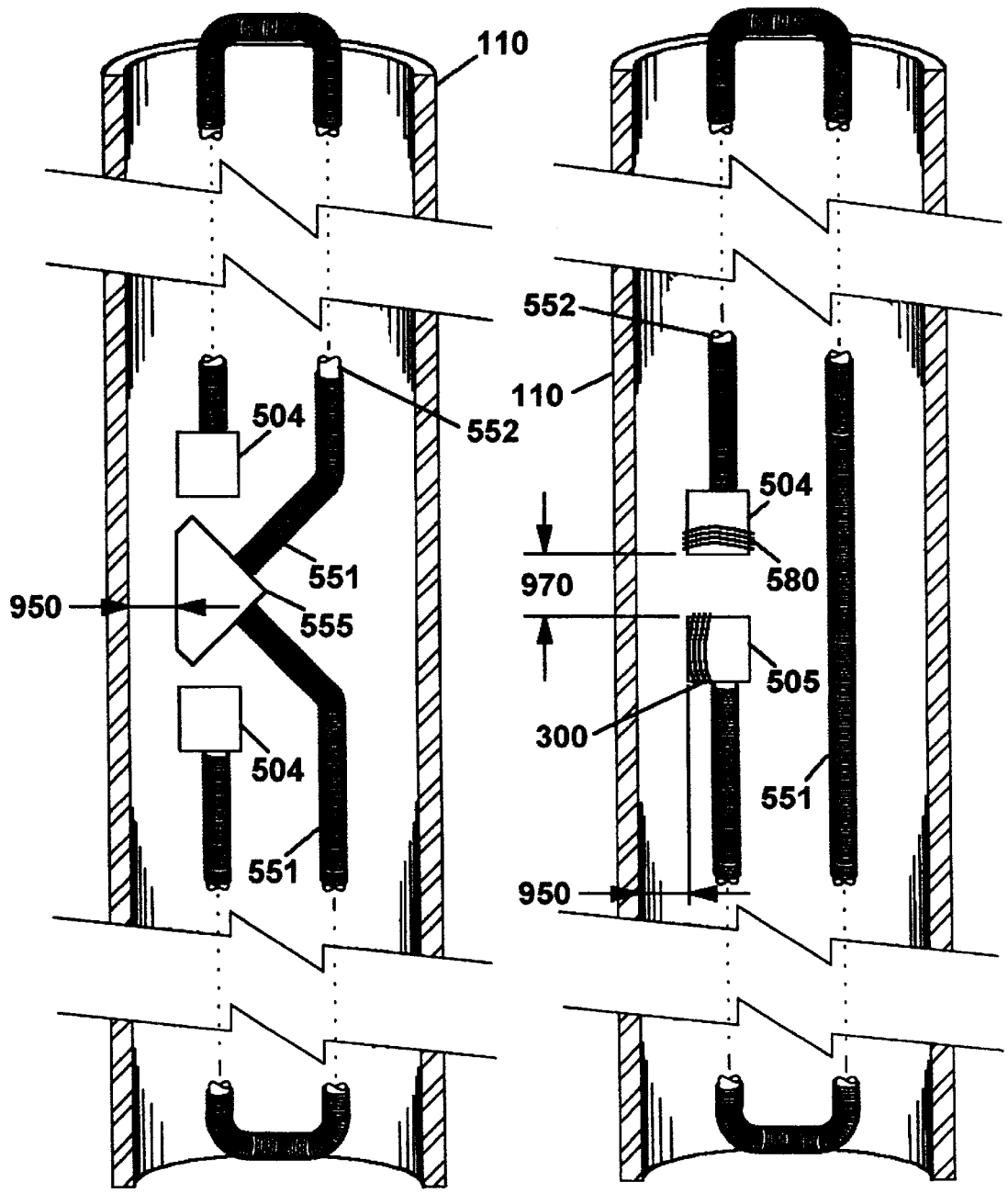
FIGS. 5A and 5B illustrate additional alternate embodiments of the invention utilized to couple or saturate the well casing.

FIG. 5A and FIG. 5B illustrate magnetic saturation generators comprised of elongated coils wrapped upon highly permeable cores. As with the magnetic culminators, the saturation cores must not become saturated by the transparency flux. The illustrated configuration of the saturation circuit is advantageous for use in the present invention since it allows a strong saturation flux to be generated in the relatively narrow space of a well casing. In FIG. 5A, the complete length of the saturation coils 551 contribute to the magnetic flux generated between the magnetic culminator 555 and each south pole 504. Similarly, for the configuration illustrated in FIG. 5B, the complete length of the saturation coil 551 contributes to the quantity of magnetic flux (flux density) existing between the south pole 504 and north pole 505. This is important since the length of the coils can greatly exceed the distance 970 between the magnetic poles. It has been found that electromagnetic coils wrapped on a core for at least a distance of up to 100 diameters of the cores diameter still contribute to the pole strength and the amount of magnetic flux existing between the two magnetic poles.

Figure 5C:
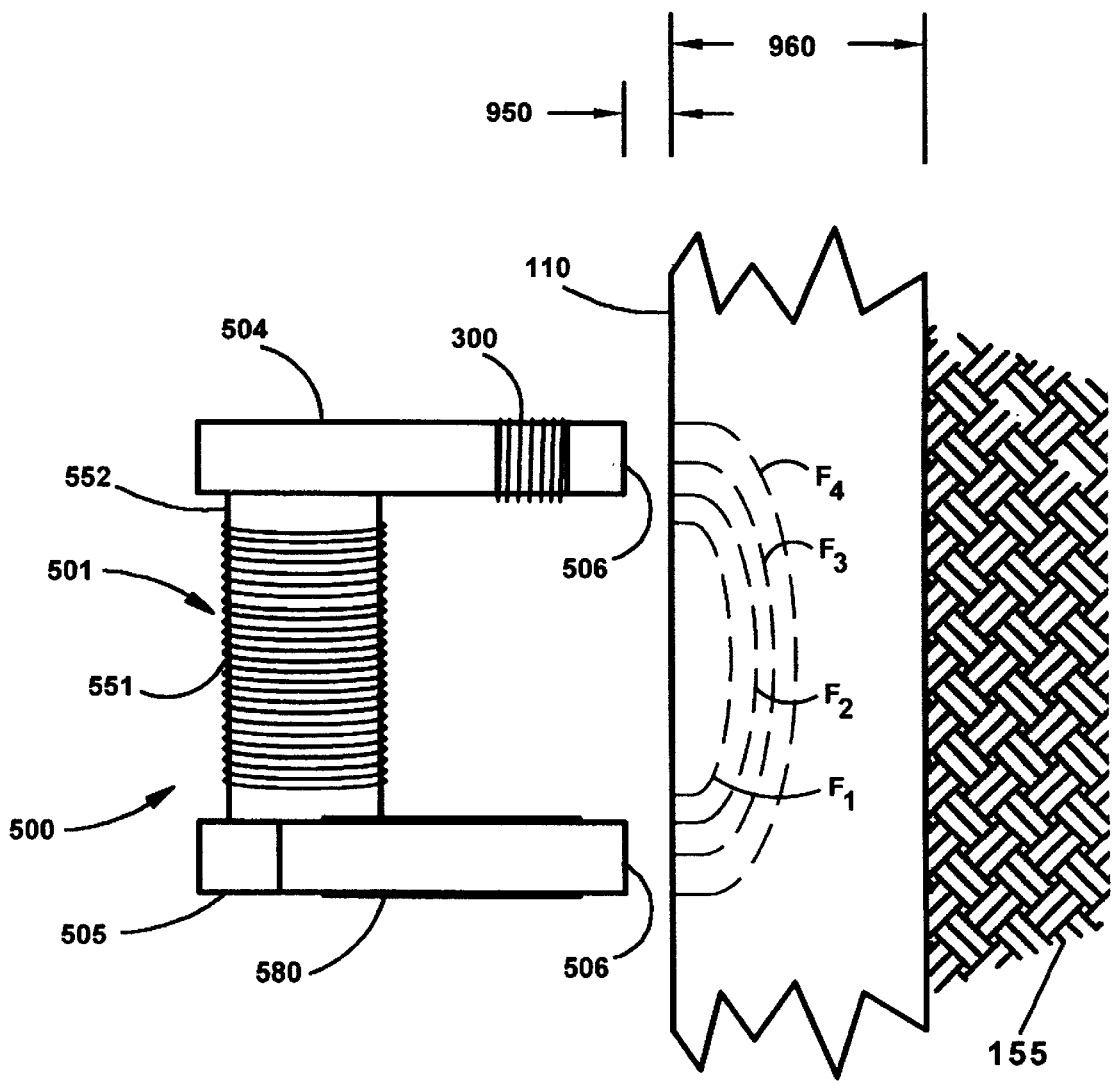
FIGS. 5C and 5D illustrate a single magnetic saturation generator incorporating both a transmitter and receiver configured to conform to the interior dimension of the casing.
Figure 5D:
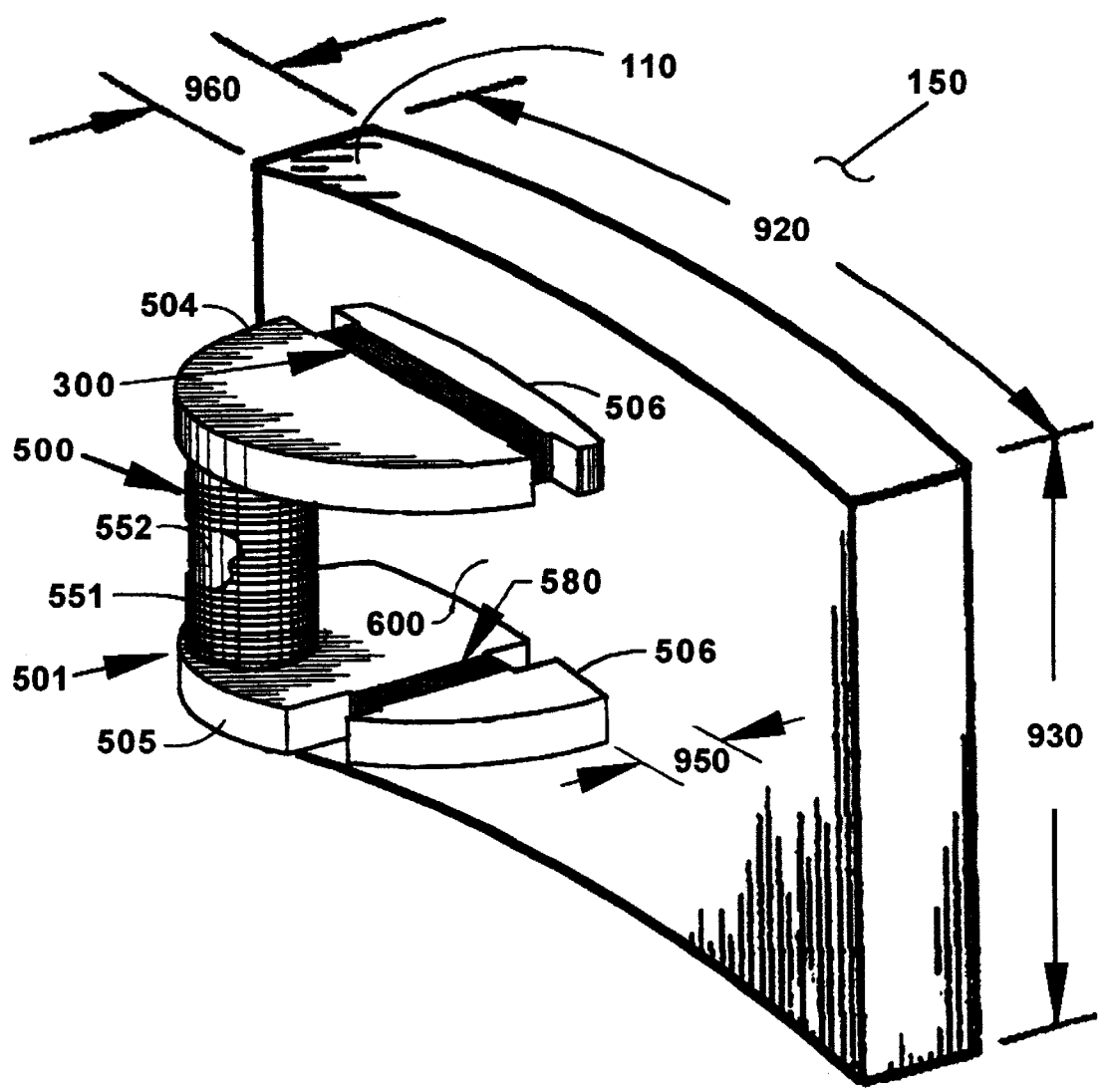

FIGS. 5C and 5D illustrate magnetic saturation generators 501 incorporating both the transmitter 300 and receiver 580. This configuration is termed a monostatic configuration. The illustrated magnetic saturation generator is configured to create a single transparency in the barrier material 110. The saturation coil 551, transmitter 300 and receiver 580 are each nulled 900 to the other. FIG. 5C illustrates the saturation flux lines F1 through F4 engaged with the barrier material. For an application in which the EM barrier is the well bore casing, the ends 506 of each pole 504 and 505 are curved to conform to the interior curvature of the casing 110. The gap 950 between the sensor tool 500 prevents an electric current between the sensor tool and the casing. FIG. 5D provides another illustration of the sensor tool. The surrounding geologic formation is also illustrated 150.

Figure 5E:
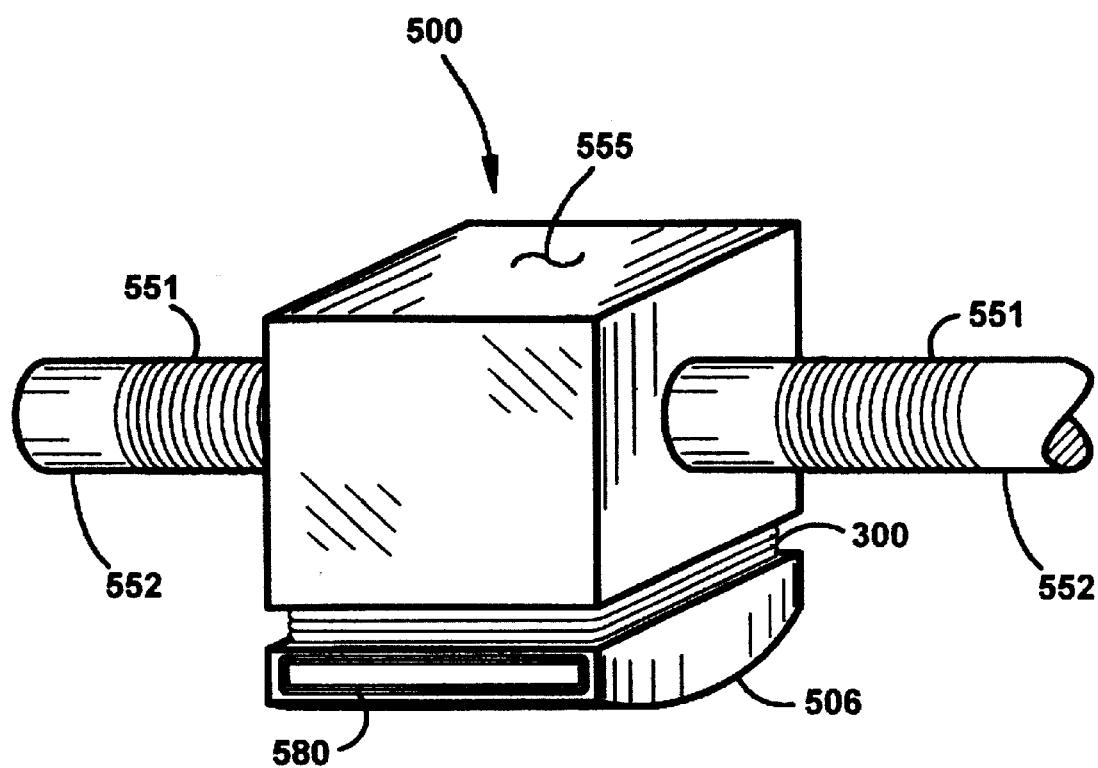
FIG. 5E illustrates a magnetic culminator incorporating a transmitter and receiver and configured to conform to the interior dimension of the casing.

FIG. 5E illustrates a magnetic culminator 555 that incorporates a transmitter 300 and a receiver 580. One face 506 of the magnetic culminator is designed to conform to the concave interior surface of the casing. In the preferred embodiment, the axis of the transmitter coil 300 is orthogonal to the axis of the receiver coil 580 and that both are orthogonal to the axis of the saturation coil 551A and 551B.

Figure 6A:
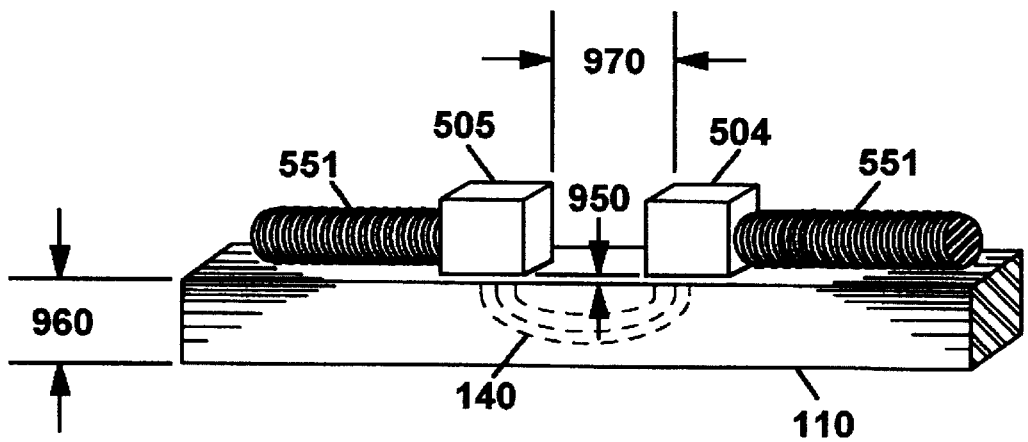
FIG. 6A illustrates magnetic coupling between two unlike magnetic poles through a well casing
Figure 6B:
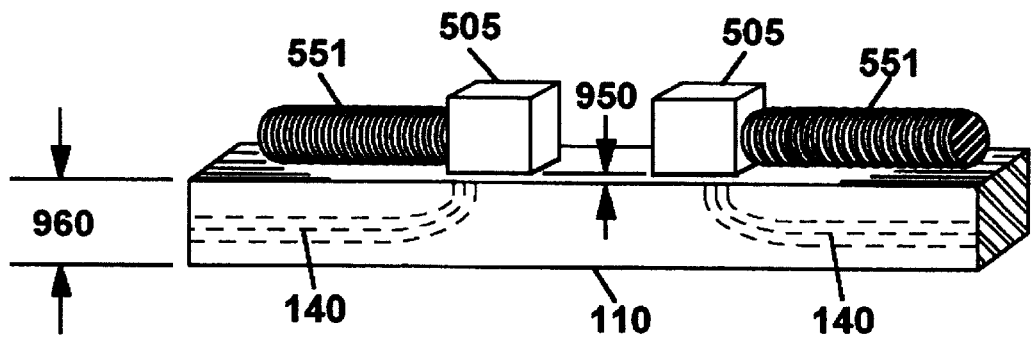
FIG. 6B illustrates the magnetic flux lines within the well casing proximate to two like magnetic poles.
Figure 6C:
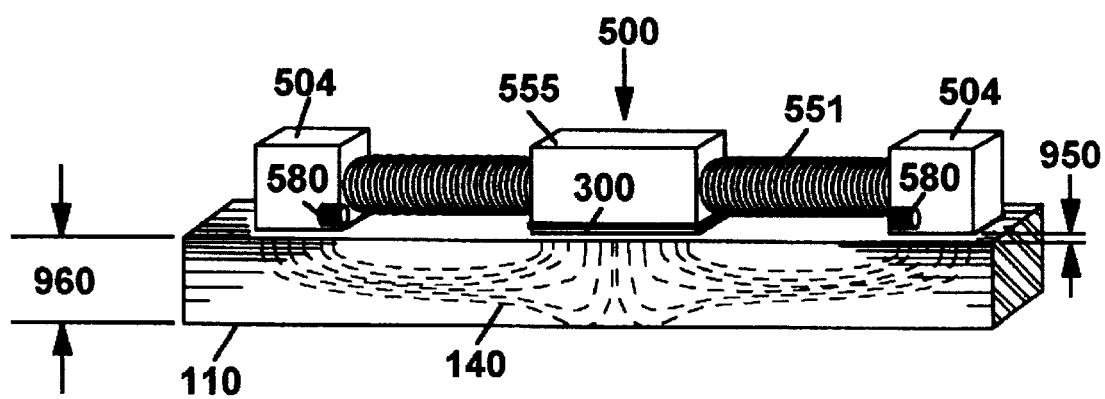
FIG. 6C illustrates the magnetic flux lines penetrating the well casing proximate to a magnetic culminator.

FIGS. 6A, 6B and 6C show the geometry of the saturation flux 140 engaging the casing 110. FIG. 6C illustrates a configuration with the transmitter 300 wound around the magnetic culminator 555. This configuration is more confined allowing the magnetic flux lines to engage or penetrate the greatest distance into the depth 960 of the casing 110. In FIG. 6B, two opposing south poles are brought together or in close proximity between two north poles (not shown). The magnetic flux field lines emitted from the opposing south poles push the flux field out into the well casing 110. However a large unsaturated volume region remains.

FIG. 6C shows the use of the magnetic culminator 555 containing two like poles 505. It has already been demonstrated that multiple like poles may be combined into a single magnetic culminator. Note that the magnetic flux lines bulge, facilitating the saturation of the thickness 960 of the barrier material. This results in the location being well suited for placement of a transmitter 300. Note that the tool is not in contact with the barrier material as shown by the gap 950.

It has also been found that enhanced magnetic coupling, i.e., penetration of an EM barrier 110 by the saturation flux without complete or full saturation, is achieved utilizing this magnetic saturation generator 500 configuration. In this case, coupling allows more energy to be transferred to the barrier material 110 from the magnetic saturation generator 500.

Moreover, it is the goal of the invention to concentrate the magnetic flux energy of the saturation flux into a minimal volume region. For the configuration illustrated in FIG. 6A, the spacing between the two unlike poles 970, however, is limited by the thickness of the barrier material 960. Therefore, if the material is "T" inches thick 960, to saturate all the way through a barrier material, e.g., a ferromagnetic casing, the spacing 970 between the two poles 504 and 505 must be at least "T" inches apart in the simple configuration shown in FIG. 6A. However by "bucking" the poles, the same "T" inches depth of penetration may be achieved but with less than "T" inches separation between like poles. The benefit of minimizing the distances between the poles is that less energy, i.e., amp turns are required for near practical or full saturation of the subtended casing. If very long distances are to be measured outside and away from the casing, then it is advantageous if the transmitter and receiver are positioned in a bistatic array, i.e., each located within or in conjunction with separate magnetic saturation generators. This facilitates nulling and reduces the energy requirements.

As the number, diameter and length of the coil increases, the mass and the permeability of the magnetic culminator must also increase in order to prevent full saturation. It will also be appreciated that neither the magnetic culminator nor any other component of the magnetic flux generator is in electrical contact with the EM barrier material (which, of course, may be the well bore casing).

Figure 7:
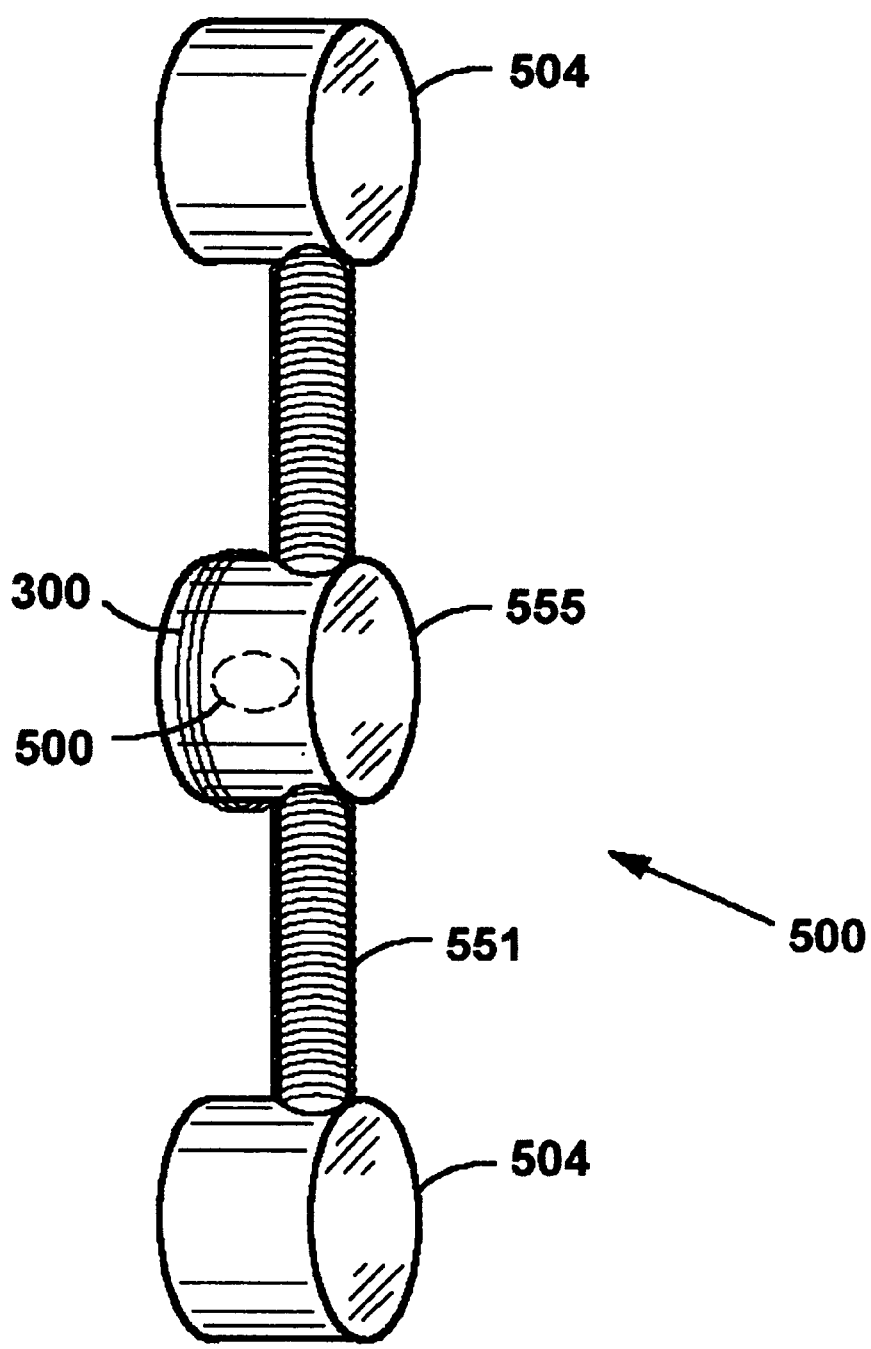
FIG. 7 illustrates an embodiment of the invention comprising a monostatic configuration with the receiver nested proximate to the transmitter.

It will be appreciated that utilization of the bistatic configuration, illustrated in FIG. 3 and FIG. 3A to measure the thickness of carbon steel (ferromagnetic) well bore casing 110, will consist of the measured average of the casing thickness over the distance 910 (or 914 or 915 as applicable). However, it is possible to obtain measurement by nesting the nulled receiver inside the transmitter coil 300. This configuration is shown in FIG. 7. In FIG. 7, the area of wall thickness measurement is a function of the transmitter coil diameter. For the above reasons, FIG. 7 illustrates a preferred embodiment of the invention, allowing compact size, decreased mass and energy consumption, and enhanced accuracy.

FIG. 8 illustrates another bistatic configuration with multiple, simultaneous direction measurement capability.

Figure 9:
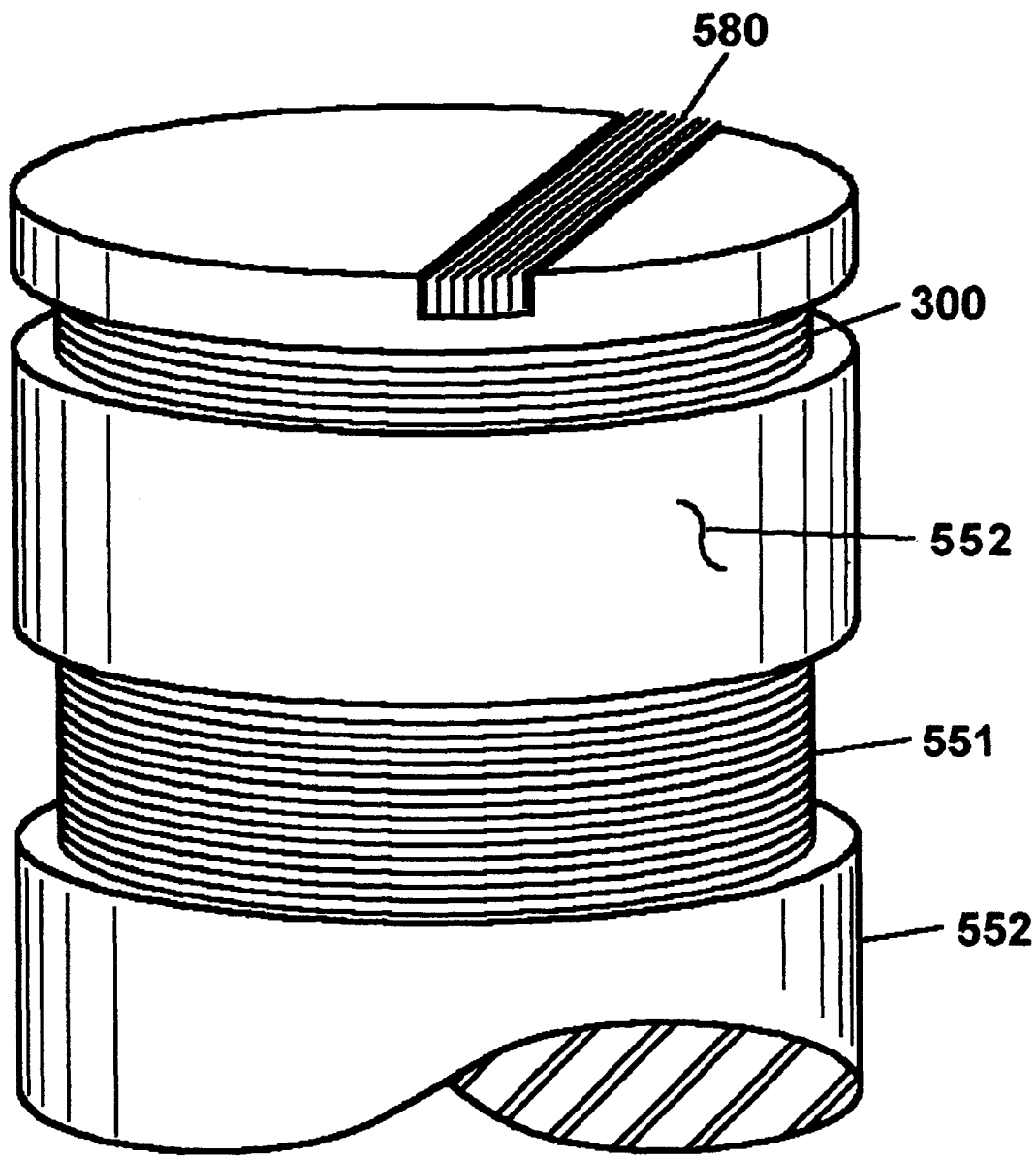
FIG. 9 illustrates an embodiment of the invention for placement of a receiver and transmitter upon a magnetic culminator or saturation core of the invention.

FIG. 9 illustrates an embodiment of the invention wherein the saturation coil 551 and the transmitter coil 300 are separately wrapped around the same flux circuit core 552. The flux circuit core is a simple cylindrical shape with both the saturation coil 551 and the transmitter coil 300 wrapped in parallel around the axis of the flux circuit core 552. Since the saturation coil 551 and transmitter coil 300 have the same diameter, they will have the same magnetic moment (amp turns/meter)

For the reasons stated previously, it will be appreciated that the saturation flux can not be allowed to saturate the flux circuit core 552 Further, the transmitter flux will generate eddy currents in the flux circuit core. Further it will be appreciated by persons skilled in the art that the greatest saturation will occur along the circumference of the flux circuit core in as much as the permeability of the near saturated or partially saturated flux circuit core will be lowest at the circumference, i.e., edge of the cylinder. Since the realative permeability of the barrier material will approach the permeability of air, i.e., "unity", the angle of refraction of the magnetic flux (not shown) induced by the eddy current within the flux circuit core will increase from the perpendicular. It will be further appreciated that this configuration has created or utilized Magnetic Lens™ capacity within the magnetic saturation generator. This configuration also is a preferred embodiment due to its compact size, energy efficiency, and accuracy of measurement and ability to utilize Magnetic Lens™. FIG. 10 illustrates another embodiment of sensor tool 500 used in conjunction with a single magnetic saturation generator to create the necessary Metallic Transparency region to practice the present invention. The sensor tool 500 comprises an outer cylindrical portion 552B and an inner cylindrical portion 552B. The transmitter, receiver and saturation coils are disposed on, in or around the outer cylindrical portion 552B and the inner cylindrical portion 552A.

Figure 10A:
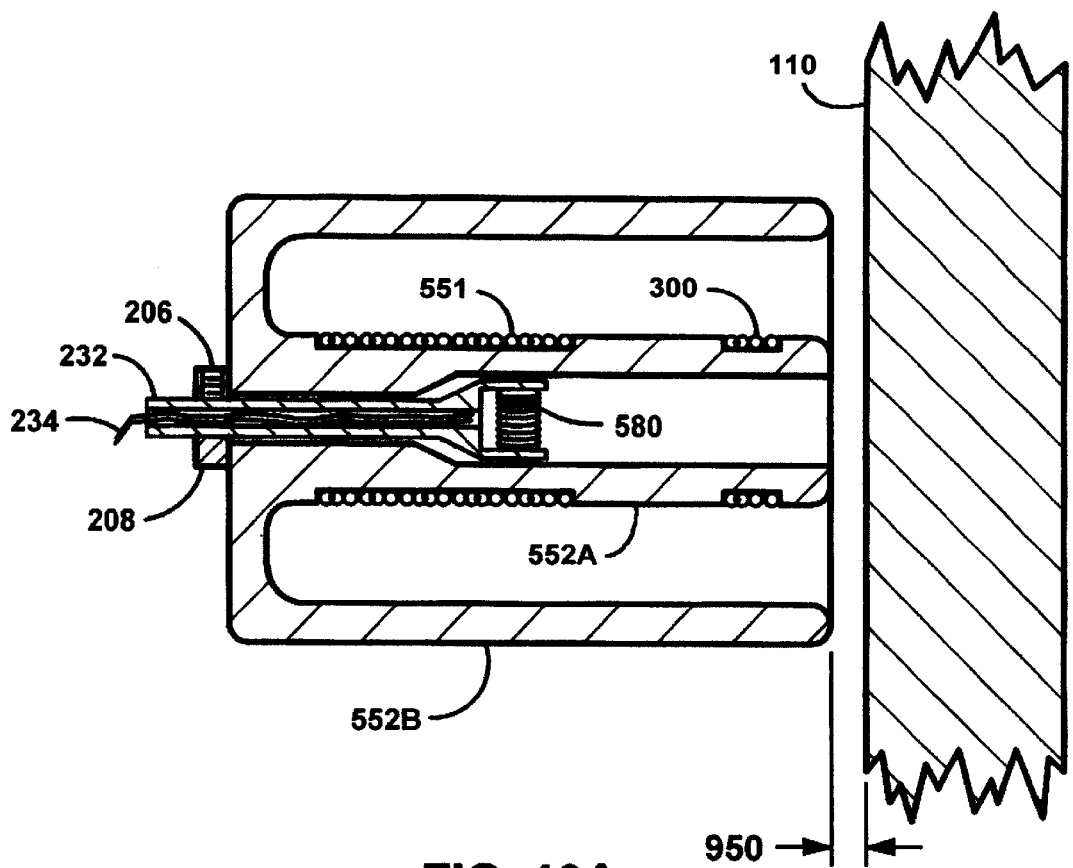
FIGS. 10A and 10B illustrate a cross sectional views depicting alternate embodiments of the saturation coil shown in FIG. 10.
Figure 10:
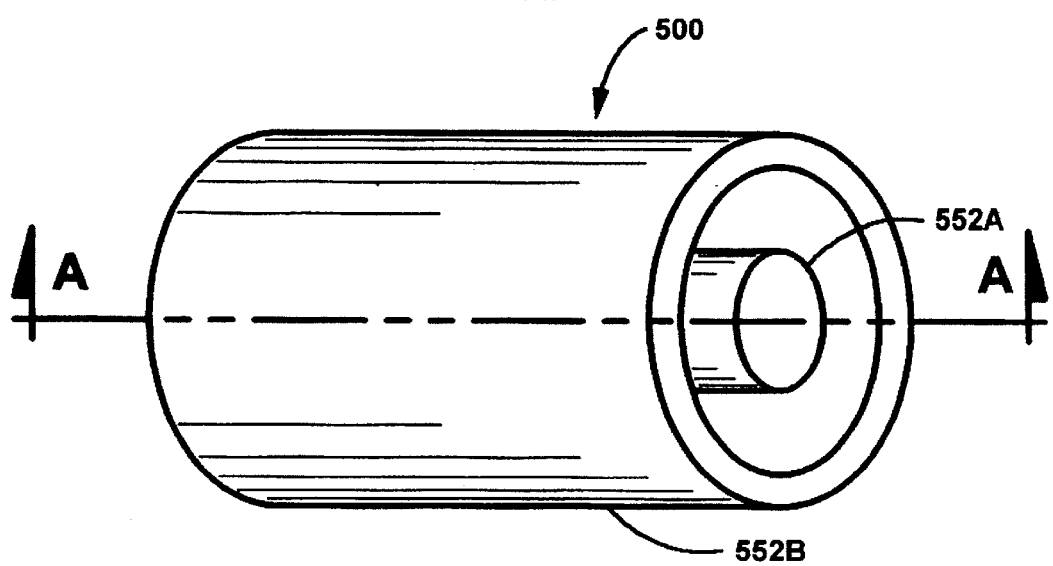
FIG. 10 illustrates yet another embodiment of the invention.

FIG. 10A illustrates an embodiment of a logging tool 500 used to generate a transparency with respect to a material 110 for practicing the present invention as could be adapted in FIG. 10. A transmitter coil 300 is disposed at the remote end of the outside diameter of the inner cylindrical portion 552A of the saturation core. A saturation coil 551 is disposed at the inner end of the outside diameter of the inner cylindrical portion 552A of the saturation core. A receiver coil 580 is disposed within the inside diameter of the inner cylindrical portion 552A of the core. The receiver coil 580 can be located at different positions using a shaft 232 which telescopes within the inside diameter of the inner cylindrical portion 552A of the saturation core. The telescoping shaft 232 can also rotate using a setscrew adjustment 206 and a setscrew housing 208. Also, wiring 234 can be channeled through the shaft 232.

Figure 10B:
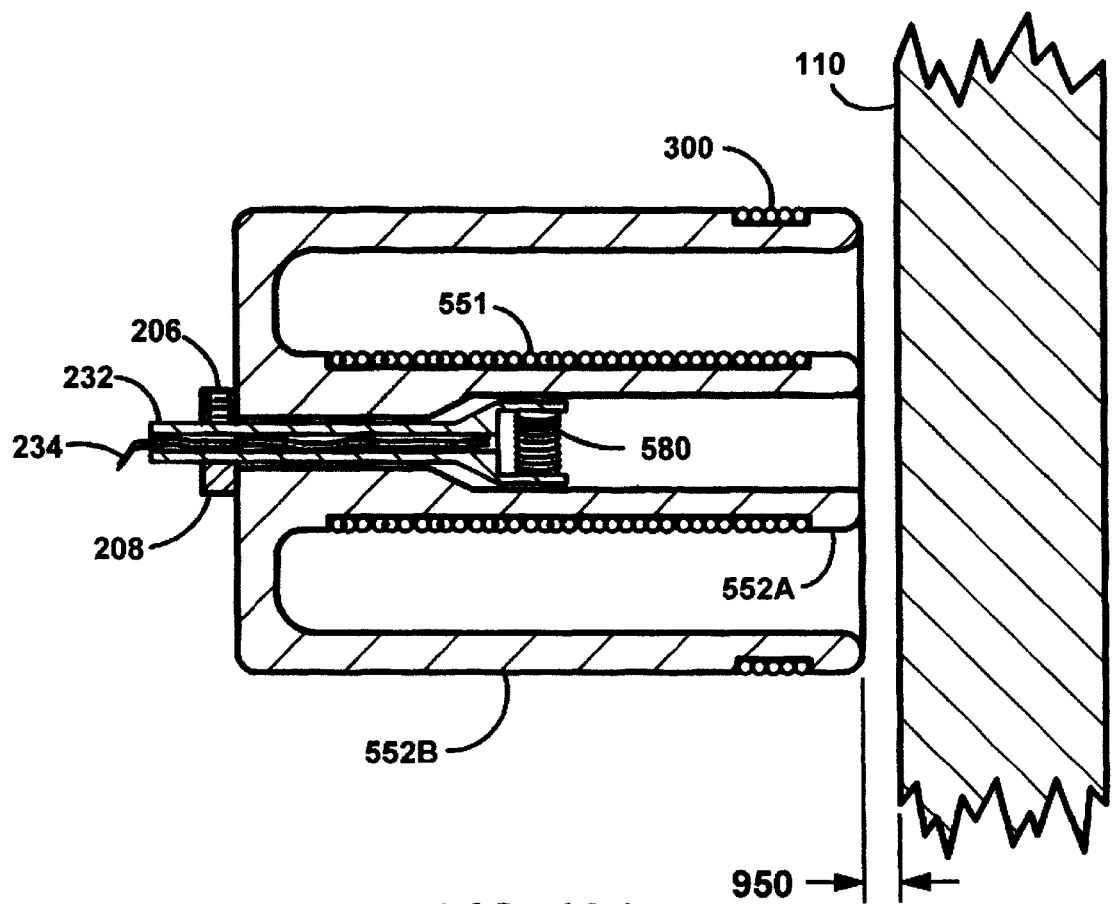

FIG. 10B illustrates another embodiment of a sensor tool 500 used for practicing the present invention as could be adapted in FIG. 10. A transmitter coil 300 is disposed at the remote end of the outside diameter of the outer cylindrical portion 552B of the saturation core. A saturation coil 551 is disposed along the outside diameter of the inner cylindrical portion 552A of the saturation core. A receiver coil 580 is disposed within the inside diameter of the inner cylindrical portion 552A of the saturation core. The receiver coil 580 can be located at different positions using a shaft 232 which telescopes within the inside diameter of the inner cylindrical portion 552A. The telescoping shaft 232 can also rotate using a setscrew adjustment 206 and a setscrew housing 208. Also, wiring 234 can be channeled through the shaft 232.

Figure 11:
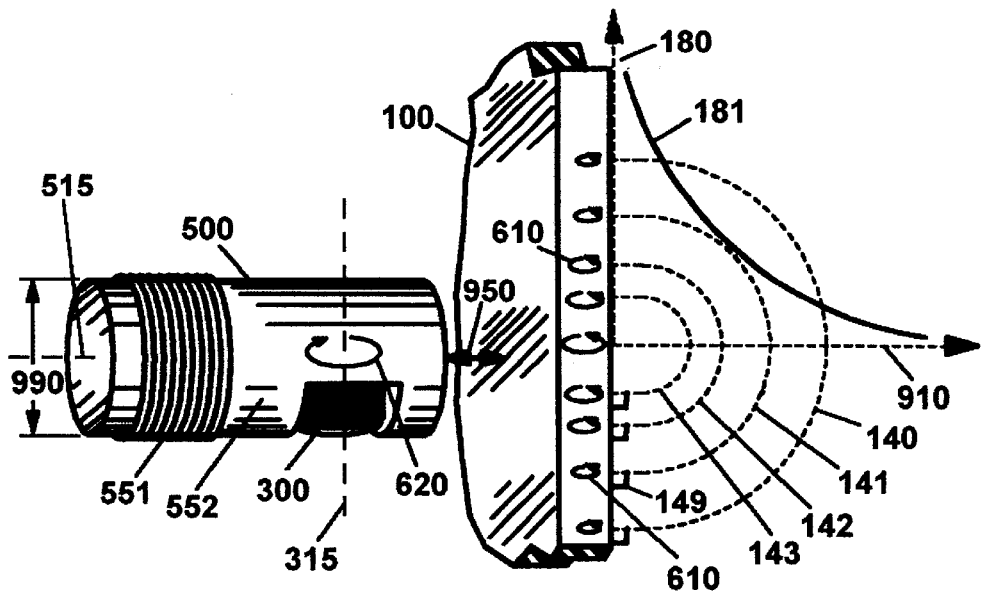
FIGS. 11, 12, 13A, 13B, 14A and 14B illustrate embodiments of the Magnetic Lens focus.

As shown in FIG. 11 a saturation core 552 is axially wrapped with insulated wire, forming a saturation coil 551, to create a powerful low frequency or D.C. magnetic field along the longitudinal 515 axis of the core 552. The saturation core is comprised of a ferromagnetic metal or other highly magnetically permeable material used so that the magnetic flux created by the saturation coil does not disperse. "Low" frequency is defined by relationship to the frequency of the transmitter flux wavelengths needed to make a measurement, e.g., if ten wavelengths are needed for the measurement, then the low frequency must be a least $\frac{1}{10}$ of the frequency of the transmitter flux.

Figure 12:
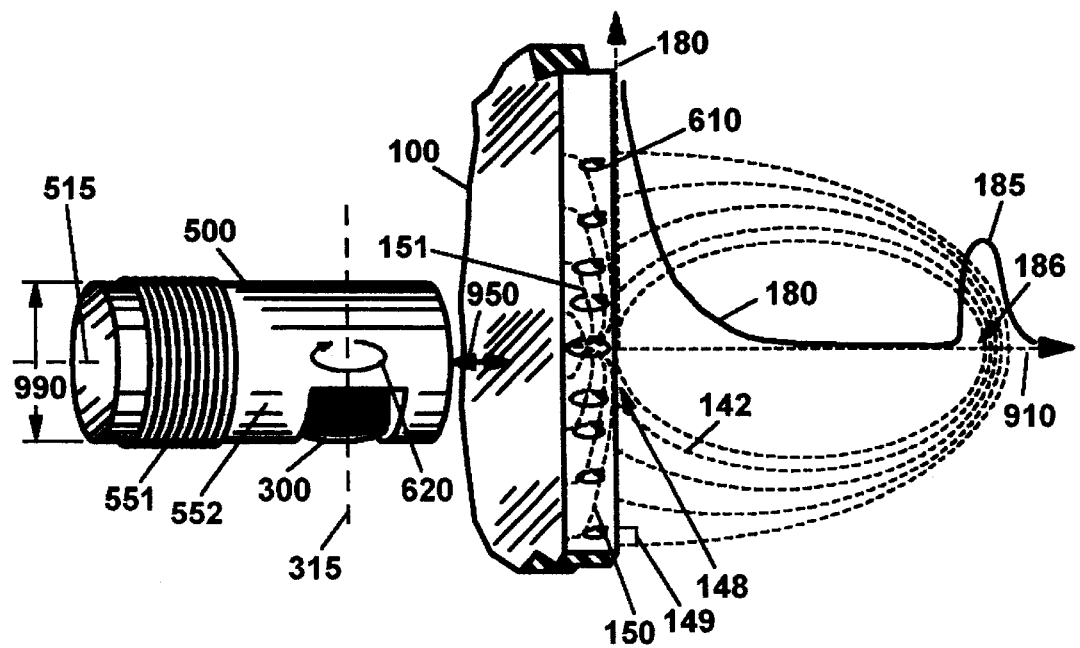

Also in FIG. 12, one embodiment of the invention shows a separate transmitter 300 wrapped such that the eddy currents 620 generated in the core have an axis 315 perpendicular to the longitudinal axis 515 of the core 552. This core is then placed some gap or distance 950 away from the casing 110. This EM barrier can be made completely transparent to the transmitter by full saturation or, alternatively, an antenna or lens utilizing partial transparency. The optimum size of the gap 950 between the core 552 and the casing 110 is proportional to the magnetic moment of the transmitter/core diameter 990 and any lensing derived from the surface of the core 552 by the transmitter flux being focused by the saturation flux.

As previously mentioned, when a gap is present, e.g., insulation causing the space between the saturation core 552 and well casing 110, the wrapping of the transmitter 300 on the core 552 utilizes this gap to create the Magnetic Lens™ effect at the surface of the saturation core, analogous to the lensing that can be created at the well casing surface using near practical saturation. This magnetic lensing counteracts the decreasing transmitter flux, i.e., the decrease in the transmitter flux density as the distance from the transmitter or saturation core increases. The rate of this decrease in transmitter flux density is the inverse cube of the gap distance between the saturation core interface to the well casing. This is illustrated by the relationship of magnetic flux intensity decreasing to zero as the inverse cubed of the distance (D) 910 away from the surface, i.e., Intensity Plot=$1/D^3$. Note that in this example, the transmitter is located on the saturation core. Persons skilled in the art will appreciate that the saturation core concentrates the transmitter flux. It will be appreciated that in the preferred embodiment of the invention, a ferromagnetic material or other electrically conductive and magnetically permeable material ("EM barrier") is used for the magnetic lensing component.

As illustrated in FIG. 11, there is less lensing in the gap 950 and on the casing 110 due to the limited penetration of the transmitter flux into the unsaturated core 552. However, the eddy currents generated within the casing by the low frequency transmitter flux will also induce oscillating magnetic flux. The transmitter 300 induced eddy currents 610 in the casing 110 are shown in FIG. 11. The resulting magnetic flux lines 140, 141, 142 20 and 143 generated from these electrical eddy currents inside the casing are shown in FIG. 11 intersecting the casing surface perpendicularly 149.

FIG. 12 depicts the change caused by the activation of the saturating coil 551. In this embodiment, as shown in FIG. 11 and FIG. 12, the transmitter 300 is a separate coil from the saturation coil 551. It is also assumed that the transparency flux current is either D.C. or has frequency much less than the oscillating transmitter flux. The magnetic flux field lines 150 of this constant or low frequency magnetic saturation flux are shown within the casing 110. This constant or low frequency magnetic flux lowers the relative permeability of the well casing. The region of greatest influence of the magnetic flux of the saturation core 552 is shown nearest the surface of the well casing 110 and decreasing into the casing. As the permeability of the casing is reduced by the increasing magnetic saturation from the transparency flux, the transmitter flux lines begin to change their surface angle of impingement away from the perpendicular. It can be readily appreciated that the impingement angle 148 at the surface will be limited to the flux angle that would exist if the casing were not present. This limit is approached as the permeability of the casing approaches unity, e.g., air or another low permeability spacing material adjacent to the casing. This changed impingement angle is shown in FIG. 12 near the region of the core's greatest influence, having reduced the relative permeability on the casing along the centerline of the core. Further away, radially from the saturation core, the magnetic flux lines again impinge perpendicularly to the well casing surface 149.

Also shown in FIG. 12 is a plot 180 of the resulting flux intensity variation along the centerline 910. This shows an intensity spike 185 due to the concentration of the field at some fixed distance away from the casing surface. This flux field concentration is the same effect as would be obtained from an optical "lens" and is termed "Magnetic LensTM" effect. The distance away from the EM barrier plate at which these flux lines are concentrated is called the "Magnetic Focal Length." The place these flux lines are focused is called the "Magnetic Focal Point"186. This focal point may be moved toward or away from the barrier material 100 by reducing or increasing the magnetic moment of the transmitter and the transparency coil or the geometry of the magnetic fields in the metal plate.

It will be appreciated that there is another embodiment wherein the transmitter flux coil is superimposed electronically on the coupling transparency coil. There are separate advantages to this configuration and the configurations shown in FIGS. 11, 12, etc. When limited by physical and power constraints, it is advantageous to utilize the configuration wherein the saturation coils and transmitter coils are physically separated but magnetically coupled. Both configurations are claimed as part of this invention.

Figure 13A:
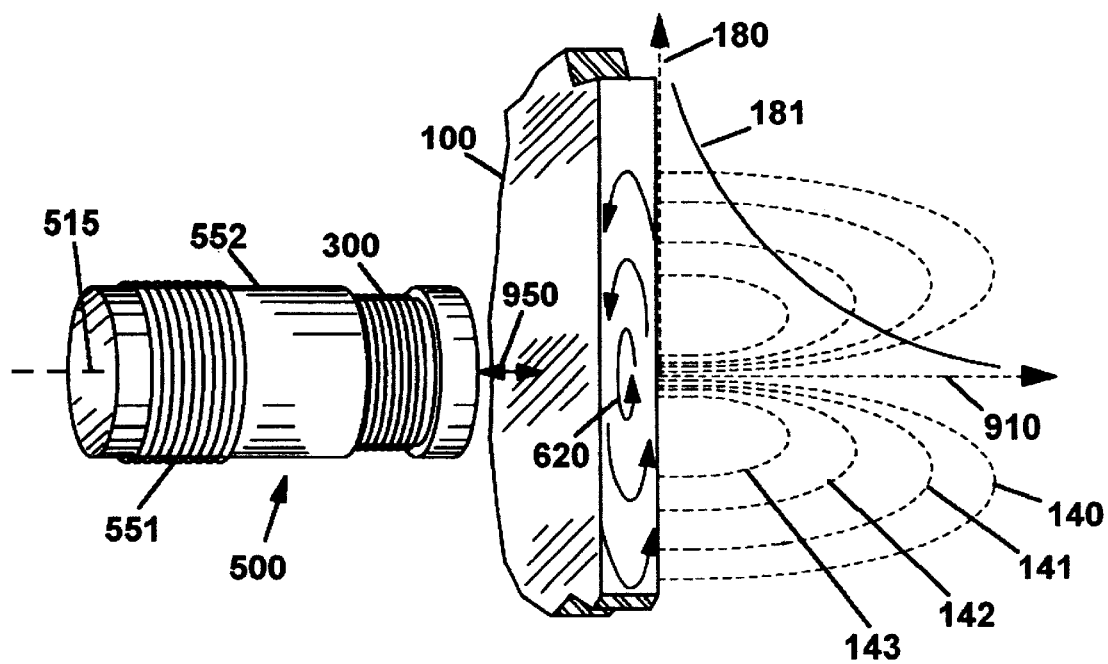
Figure 13B:
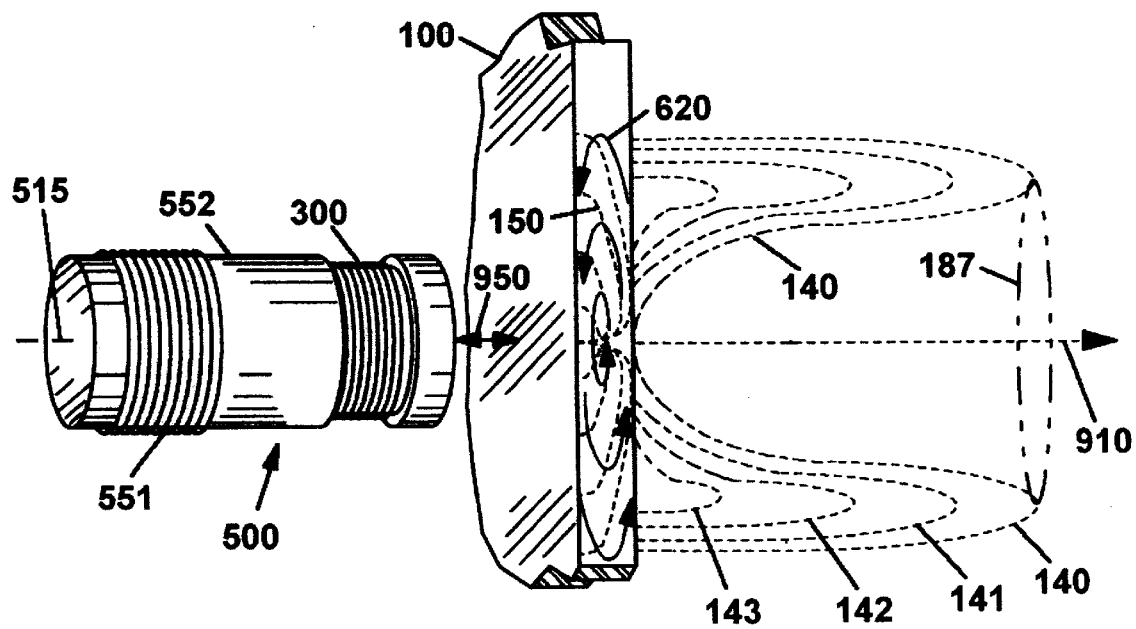

In FIG. 13A, the transmitter coil 300 is rotated to be approximately parallel to the casing 100, ignoring temporarily that the well casing surface is necessarily curved in forming the cylindrical shape. The transmitter induced eddy currents 620 generate the magnetic flux field having geometry illustrated by field lines 140–143. Note the density of the magnetic flux field lines along line 910 as the flux field emerges from the partially saturated casing surface 100. Supplemented on FIG. 13A is the plot 181 of the decrease in magnetic field intensity 180 as the distance from the surface 910 increases. The magnetic flux field intensity 180 decreases to zero along the plotted line 181. This illustrates that the intensity decreases in relation to the distance (D) 910 away from the surface, i.e., Intensity Plot–$1/D^3$. FIG. 13B shows the transmitter induced magnetic flux field 140, 141, 142 and 143 when the magnetic saturation generator 500 is turned on. There is a concentration of the flux lines off the centerline 910 and Magnetic Lensing occurs in a different geometry from FIG. 12. The shape of the transmitter induced magnetic flux field has changed. The focused flux fields create a "Focal Circle" 187 or "Focal Plane" instead of the focal point 186 geometry illustrated in FIG. 12.

Figure 19:
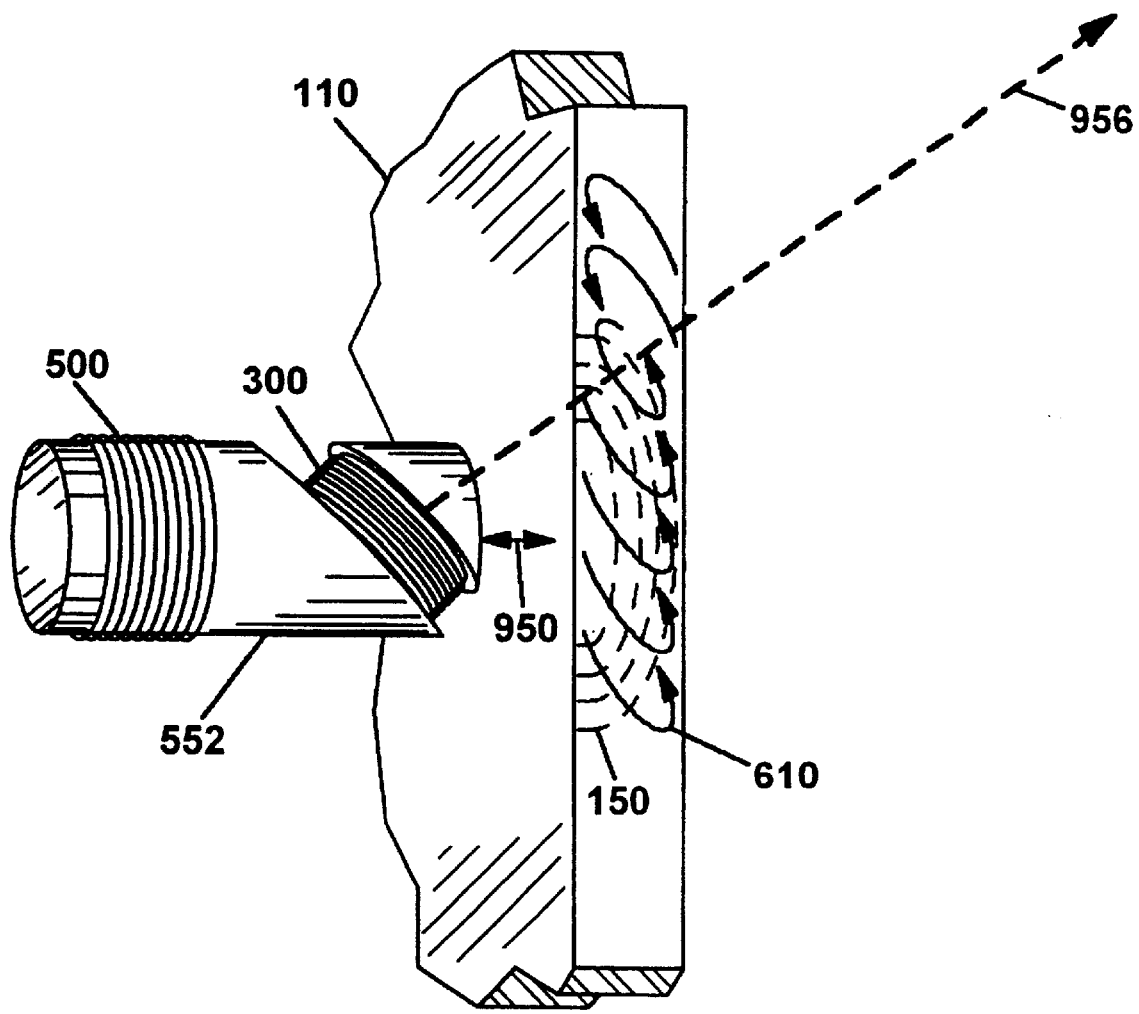

There are advantages to winding the transmitter coils 300 in this manner with respect to the surface of the well casing 110. The main advantage is that all elements of the transmitter coils can be made equidistant from the surface of the casing 110, therefore inducing an eddy current uniformly parallel or perpendicular to the surface of the well casing and inducing a symmetrical magnetic flux field. If non-uniform eddy currents were desired, then it would be possible to rotate the axis of the transmitter coil 300 to be some angle between perpendicular (as in FIGS. 11 and 12) or parallel (as in FIGS. 13A and 13B) to the metal plate. (This geometry is illustrated in FIG. 19.)

It will be appreciated that there is an eddy current generated in the core 552 and opposing the transmitter flux. As the transmitter coil 300 is moved axially along the core 552 and away from the end of the cylindrical core, this opposing eddy current consumes more of the energy of the transmitter. Note that this decrease of transmitter energy is experienced in spite of the gap 950 between the core 552 and the casing 110 remaining relatively constant.

Using this Magnetic Lensing™ technique allows the transmitter power to be minimized yet allows resistivity measurements at distances within the geologic formation not possible without the consumption of much greater power and increased size of the magnetic saturation generator subject of this invention.

Figure 14A:
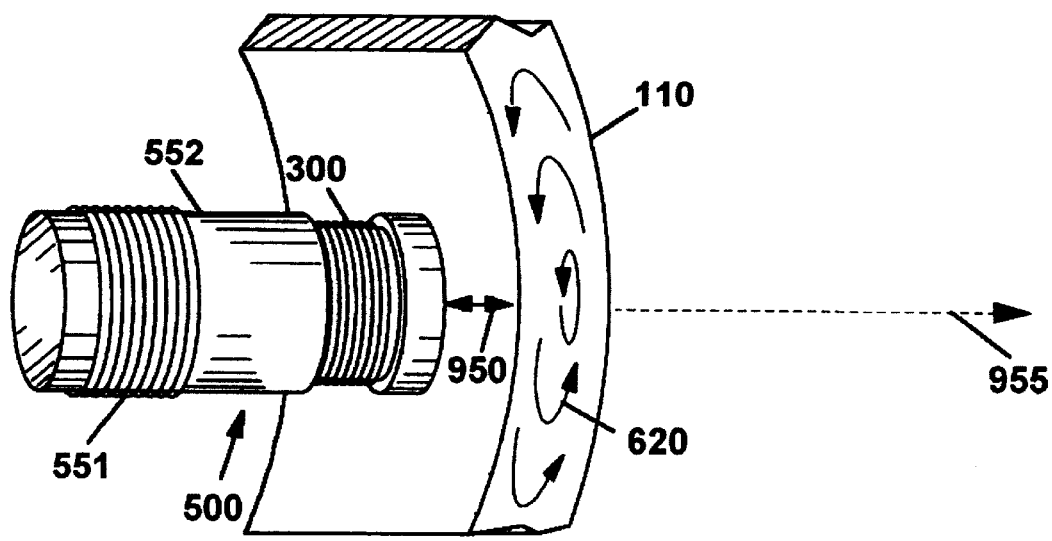
Figure 14B:
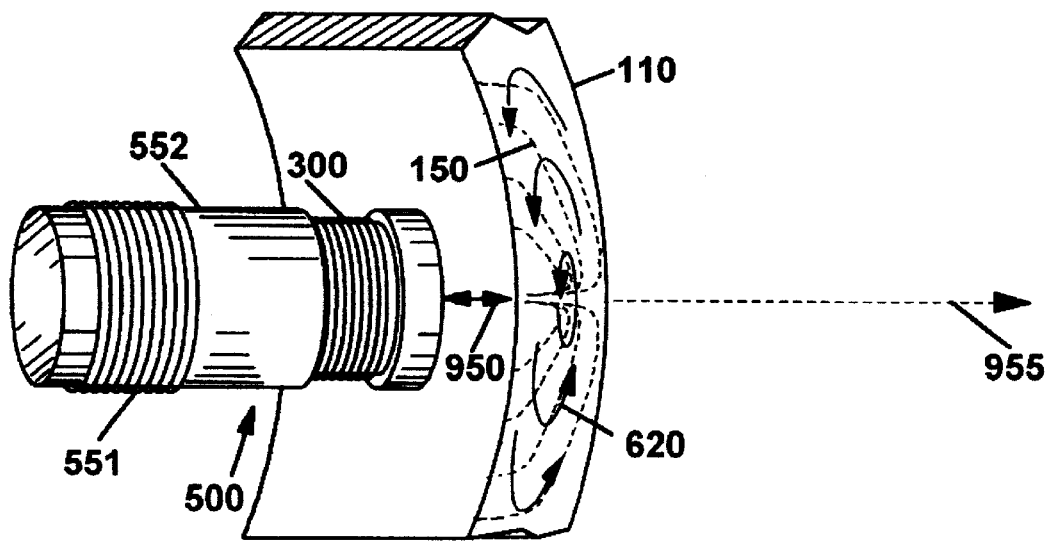

FIG. 14A and FIG. 14B illustrate another embodiment of the invention with the curved well casing surface 110. It will be appreciated that, for configurations of the tool optimizing a compact structure, achieving increased energy efficiency and using nested receivers and transmitters, the effect of the curved surface of the casing will be minimized and the lensing effect illustrated in FIGS. 12 and 13B will be increasing as applicable. It will also be appreciated that known techniques for creating flexible ferromagnetic shapes of parabolic or similar geometry may be used to allow adjustment of the magnetic focal distance.

Figure 15:
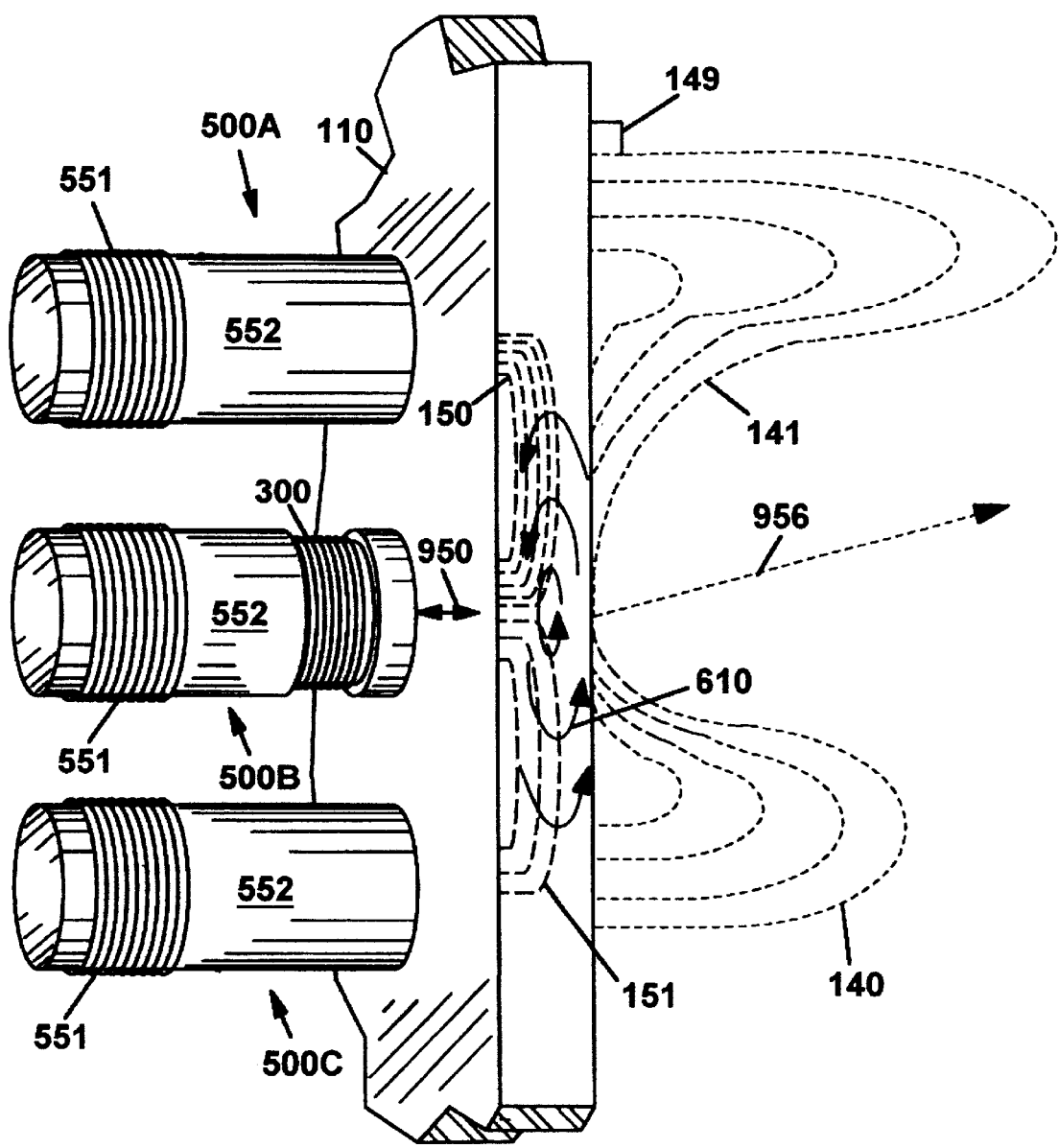
FIGS. 15 through 19 illustrate further embodiments of the Magnetic Lens™ focus utilized in the invention.
Figure 16:
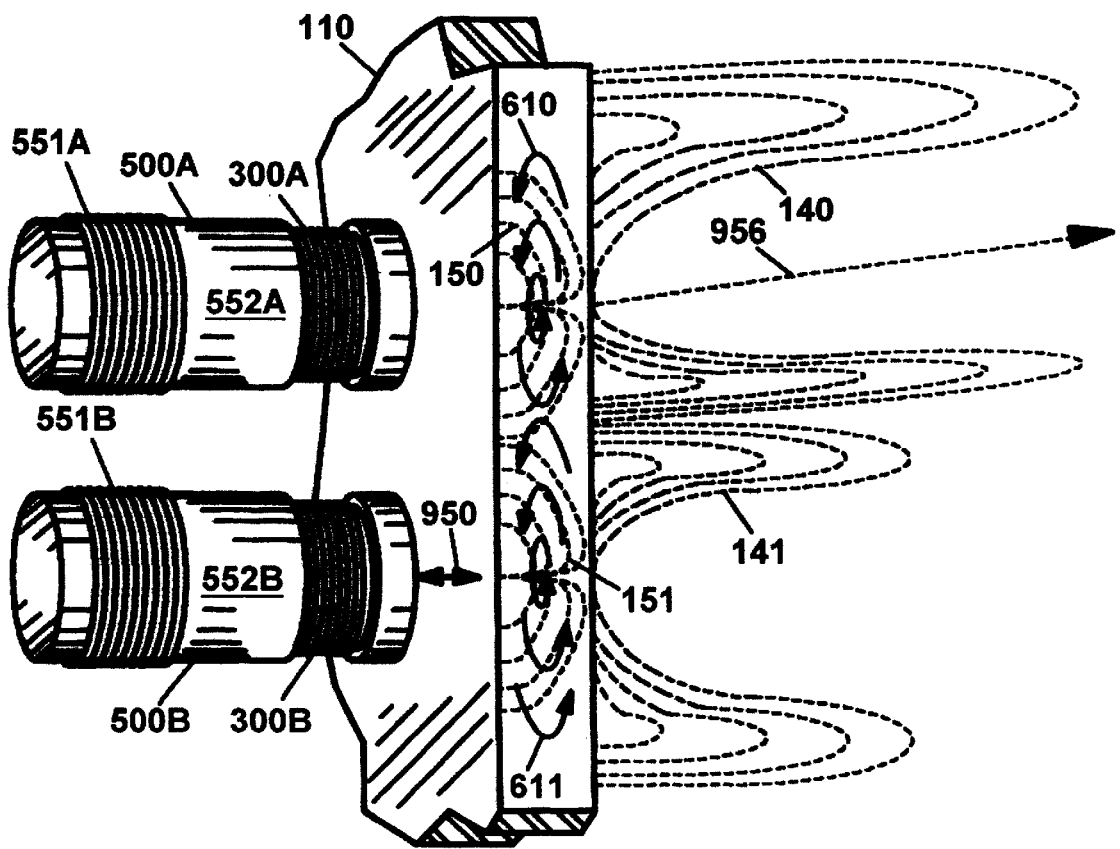

FIG. 15 shows beam directivity and steering capabilities by an interplay of a plurality of magnetic saturation generators, e.g., 500A, 500B and 500C and one transmitter 300. In FIG. 15, the magnetic saturation generator 500A and 500B are creating the maximum permeability reduction within the well casing 110 proximate to transmitter 300 and magnetic saturation generator 500A. This creates the maximum bending of the flux lines 140–143 induced by transmitter 300 towards magnetic saturation generator 500A. There is a maximum beam steering available by this single transmitter technique. FIG. 16 shows two transmitters, 300A and 300B with bucked transparency magnets 551A and 551B. The bucking is shown by the opposing direction of the induced eddy currents 610 and 611. The transmitters are both wound on separate flux circuit cores 552A and 552B with their coils substantially parallel to the casing 110. To deflect the transmitting current 150 and 151 from 300A to the top, transmitter 300B should be increased in strength (at the same frequency) and saturation flux power of 500B must be increased over saturation flux power of 500A.

Figure 17:
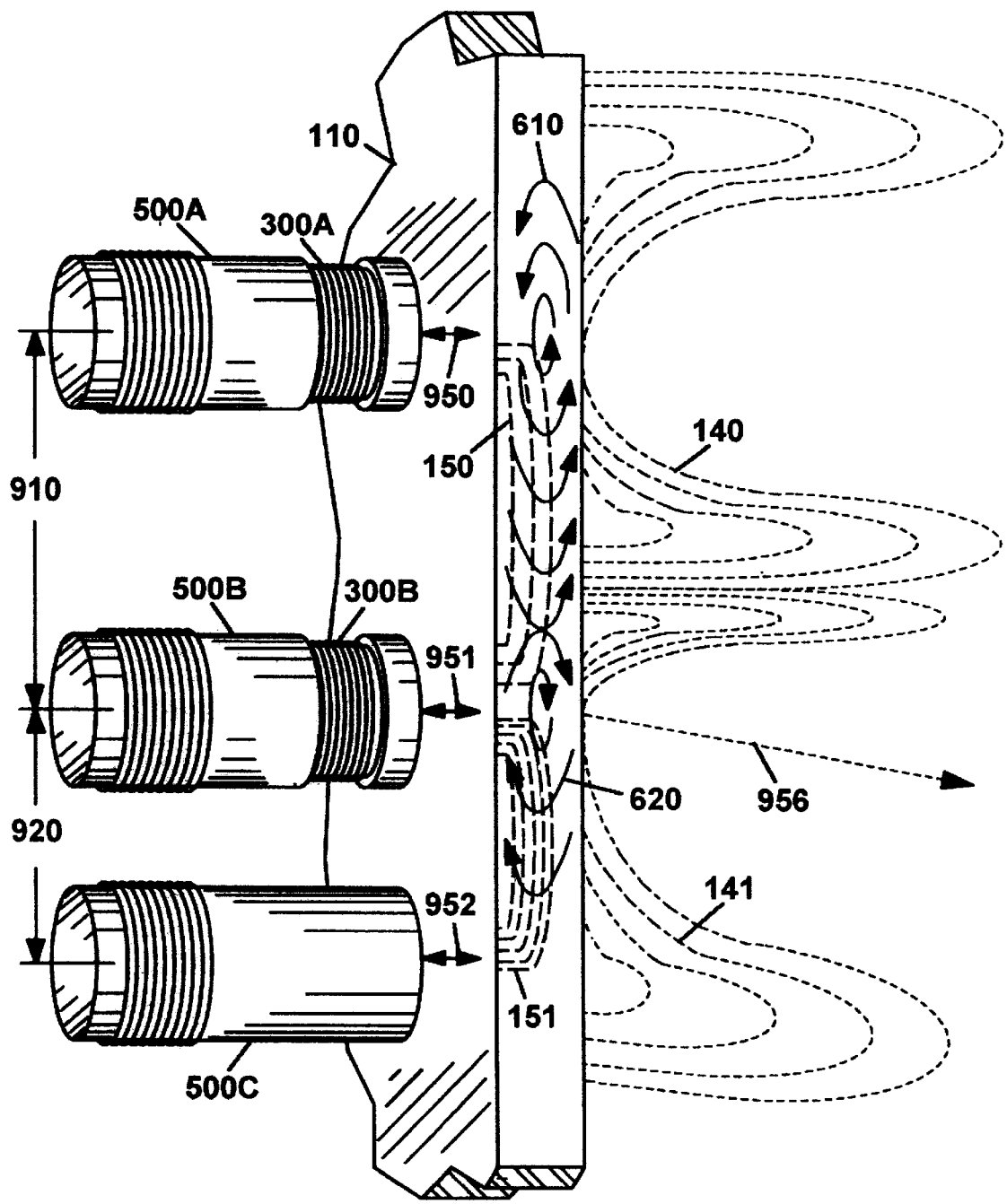
Figure 18:
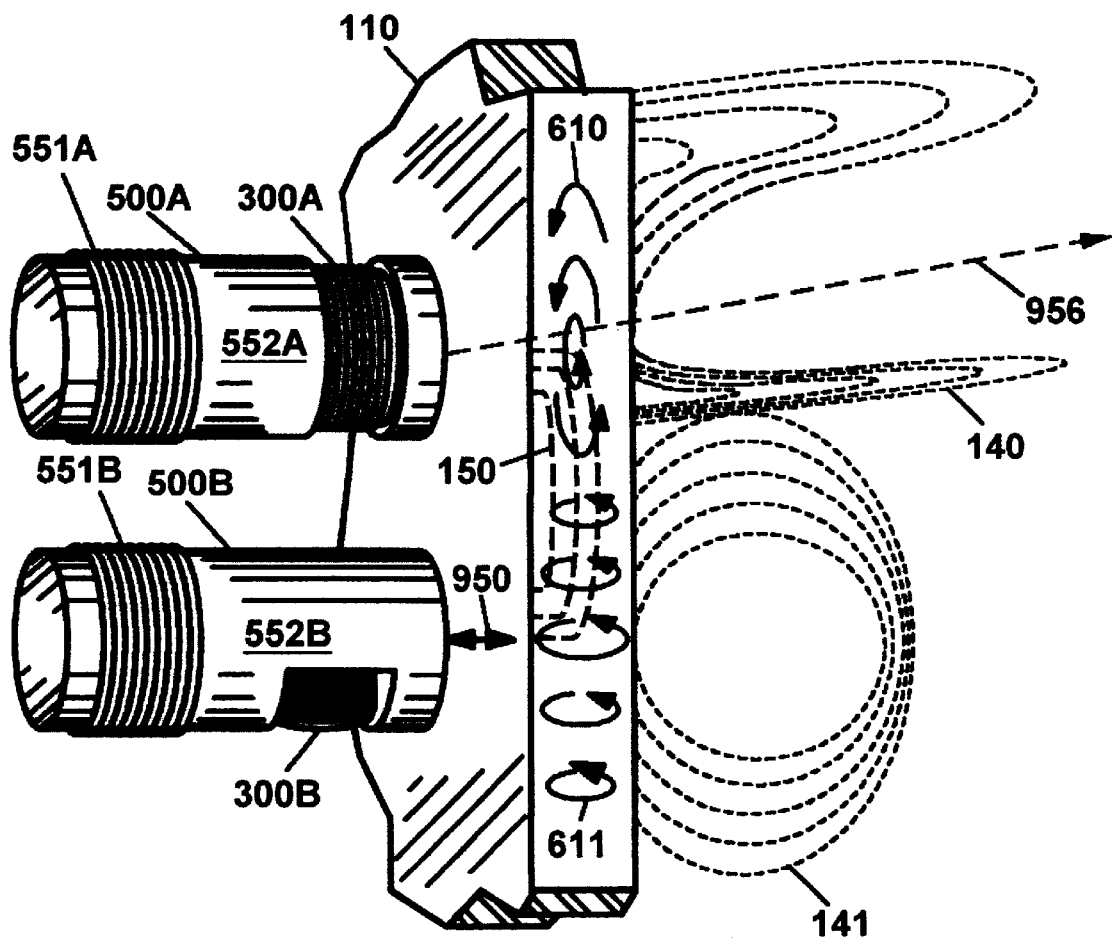

In FIG. 17, another transparency magnet 500C is added to increase the current to the distance $D_{2,3}$. 910. This will bend the flux field 140—143 downward while transmitter 300A is made much more powerful (as shown by the respective number of induced eddy currents 610 and 620) than transmitter 300B to push the flux field down. In FIG. 18, another embodiment of the invention relating to beam movement is shown. This embodiment utilizes the transmitters 300A and 300B having equal diameters but oriented at 900 to the other. The resulting eddy currents 610 and 611 are also oriented 900 to the other. Again, it is possible to use combinations of Transmitters and magnetic saturation generator's 500A and 500B having unequal saturation strengths to—bend the flux field.

FIG. 19 shows the transmitter 300 at an oblique angle to the well casing 110. It is also oblique to the transparency coil 500 and transparency core 552. The well casing is not fully saturated and the oscillating magnetic flux field of the transmitter 300 induces eddy currents 610. These eddy currents are also at an oblique angle to the surface of the casing 110. Further, the eddy currents 610 induce a corresponding magnetic flux Field radiating out of the well casing 110. It should be noted that the field lines do not extend out of the casing toward the magnetic saturation generator but rather field lines stay in close proximity of the casing surface.

Using the Conductivity/Resistivity Measuring System of the present invention, it is possible to greatly improve existing methods of measuring electrical conductivity of the geologic formation by using a spectrum of frequencies rather than one frequency. In addition, the metallic permeability must be measured to accurately depict the effects of the well casing upon the measurement of conductivity. Using a range of frequencies allows a single device to function where the casing thickness may vary from zero (no metal) to multiple inches thick. Using the same frequency over such a wide range causes a large loss of resolution and accuracy. Therefore, for a given range of material thickness, a particular group of frequencies will provide improved resolution and better accuracy.

To eliminate the effects of a varying metallic permeability, it is necessary to create a local Metallic Transparency region with the permeability as close to unity as possible while the transmitter frequency is being varied. Then, while the transmitter frequency is held constant, changing the amount (amplitude) of the saturation flux will vary the relative permeability of the casing or other barrier material.

One embodiment of the present invention as broadly described herein is a method for creating a spectral EM frequency metallic thickness measurement system using metallic transparencies. In order to calculate the thickness of a casing or other barrier material with unknown permeability and conductivity, empirical testing is used to first approximate the conductivity and permeability. Conductivity and permeability can be approximated in any order using techniques herein discussed.

As the frequency increases, the conductive losses increase until the skin depth becomes much less than the thickness of the barrier material. As used herein, "skin depth" is proportional to the inverse of the square root of the product of permeability, conductivity and frequency.

Figure 20:
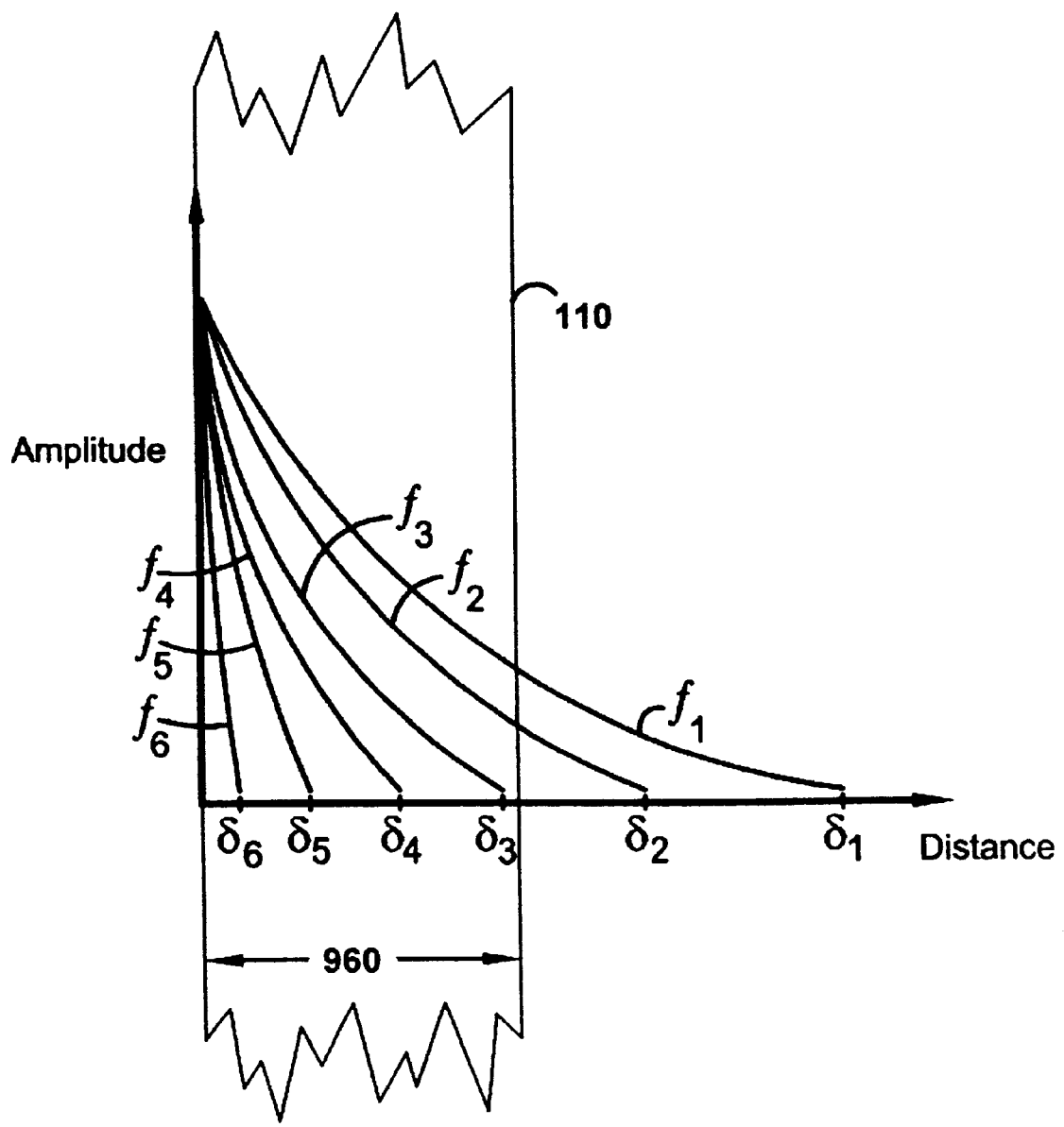
FIG. 20 illustrates the relationship between the frequency of oscillating magnetic flux and depth of penetration into an EM barrier.

FIG. 20 illustrates the relationship between flux frequency and penetration depth for a cross-section of a piece of metal with a conductivity, a permeability and several imposed frequencies $f_x$, for the present invention.

For a wave of constant amplitude and varying frequency, and a metal with the same permeability and conductivity, it is known by skin depth theory that a lower frequency penetrates deeper than a higher frequency. Therefore, one can find an optimum frequency range that can characterize the metal conductivity. For constant length L and varying frequencies, the penetration depth δ is:

$$\delta = \left(\frac{1}{e}\right)L$$

and $$\delta = \frac{1}{\sqrt{\sigma \mu_r \mu_o f}}$$

where
δ=penetration depth,
f=frequency,
σ=conductivity
$\mu r$=relative permeability, and
$\mu o$=absolute permeability.

In FIG. 20, the relationship of frequencies is
$f_6 > f_5 > f_4 > f_3 > f_2 > f_1$.

The first step to calculate the thickness of the casing is to generate a magnetic flux adjacent to or near the casing to be measured. The magnetic flux must be of sufficient magnitude to saturate the casing. The saturation flux may be generated by a permanent magnet, an electromagnet powered by dc current or ac current. The ac powered EM waves will preferably be of a relatively low frequency. Upon achieving saturation of a portion of the casing, a second magnetic flux is generated with specific constant amplitude and engaged with the saturated casing. The resulting magnetic flux from the casing is monitored using a receiver. The receiver is located adjacent to or near the casing to be measured. The receiver may be either co-located with the transmitter or at a distance away, e.g., as in a bistatic configuration. The transmitter frequency is increased incrementally while the amplitude is held constant and the received flux is monitored.

As required by skin depth theory, for a given wave of constant amplitude and varying frequency, the lower frequencies penetrate deeper into a piece of casing than the higher frequencies. The higher the frequency, the greater loss of flux, i.e., increased attenuation. See FIG. 20. Therefore, an oscillating magnetic flux of a specified frequency can be generated and engaged with the well casing. The received flux is monitored. The frequency of the transmitted flux is increased in a stepped fashion while continuing to monitor the received flux. The amplitude of the transmitted flux remains constant. As the frequency of the transmitted flux is incrementally increased, for example by stepping, the received flux will attenuate. With the amplitude held constant, the maximum frequency of the transmitter flux capable of penetrating the casing is therefor determined when the receiver is no longer able to detect a flux. The last frequency to generate a received flux is the "maximum penetration frequency." The Maximum Penetration Frequency is used in the present invention to determine material thickness.

Figure 21A:
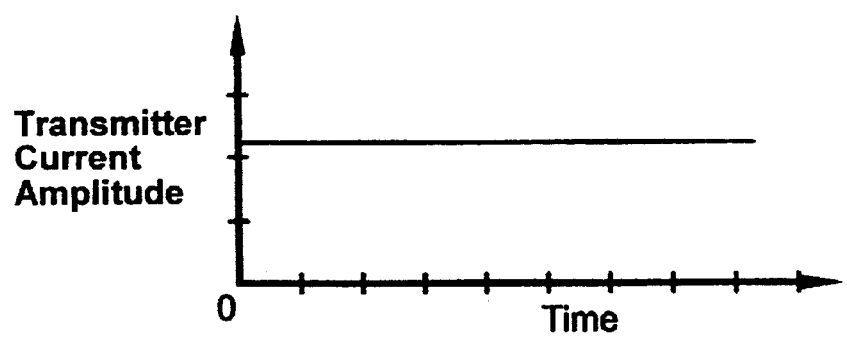
FIGS. 21A, 21B, and 21C illustrate the relationship between the transmitter flux amplitude (FIG. 21A), the saturation flux amplitude (FIG. 21B), and the receiver flux amplitude (FIG. 21C).
Figure 21B:
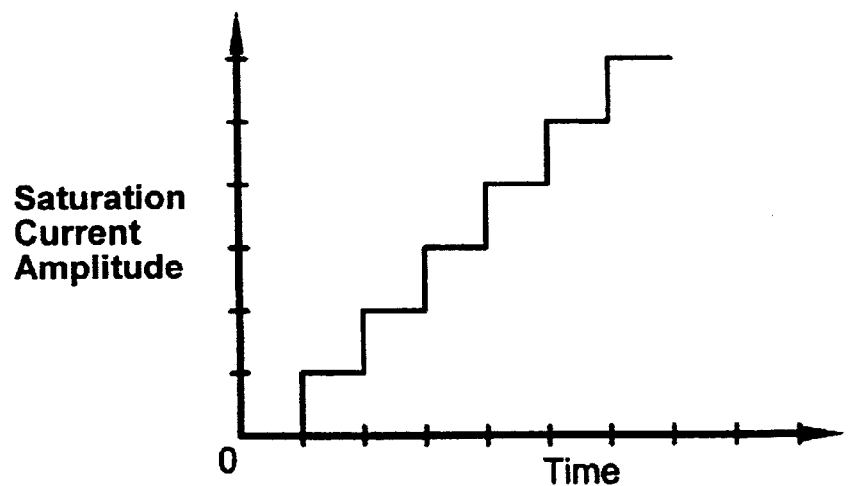
Figure 21C:
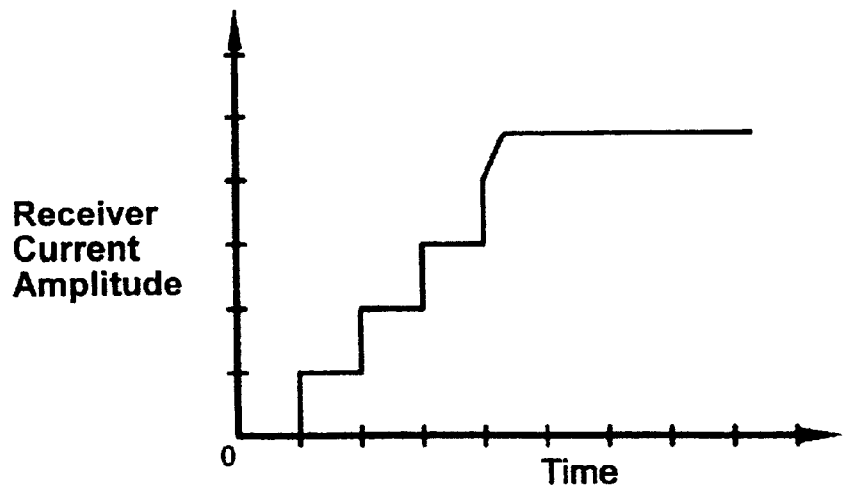

The second step in calculating the thickness of a material with unknown permeability and conductivity is the approximation of permeability. Using the same transmitter, receiver, and saturation procedures described in the first step, a saturation flux is generated near or close to the well casing to be measured. The saturation flux has a known yet variable current. A transmitter flux of known and constant frequency and amplitude is generated at or near the well casing within a zone to be effected by the saturation flux. A receiver monitors the receiver flux from the transmitted flux returning for generating a resulting electromagnetic response. While monitoring the received response and holding the transmitter flux frequency and amplitude constant, the saturation flux is increased incrementally. Thus, the receiver flux will generally mirror the steps of the saturation flux but at different amplitudes than the transmitter flux. (See FIGS. 21B and 21C.) As the saturation flux increases, the well casing becomes more and more transparent to the transmitter flux (maintained at constant amplitude and frequency), thus, causing the amplitude of the receiver flux to increase proportional to the stepped increases in the saturation flux. The stepped incremental saturation is continued while the transmitter flux is held at the constant amplitude and frequency and the resulting increments in the receiver flux are monitored. This is continued until no further changes are registered by the receiver in response to increases in the saturation flux. The point at which the received flux registers no change may be called "total saturation." See FIG. 21C. Once total saturation is achieved, increases in the current or amplitude of the saturation flux have no effect upon the received flux. Thus, the transmitter flux is coupled with the casing. As the casing becomes more saturated, (and its permeability approaches 1) the casing becomes increasingly transparent, resulting in more of the transmitter flux penetrating though the casing. The current history and the associated received flux, as illustrated in FIGS. 21A, 21B and 21C, provide for full or near practical saturation of a localized area. Further, the current history and the received flux information can be used to mathematically determine the permeability and thickness. Once approximation is obtained on either permeability or conductivity, the other variable can be determined and the material thickness can then be calculated.

The technique of the present invention for calculating the thickness of a material with unknown permeability and conductivity can be used to further classify various materials (and the thickness of such materials) such that a general lookup table can be created. The general lookup table can contain known results from numerous test samples allowing for quick lookup and display of thickness based on known samples meeting the test criteria. The test criteria can be for a range of thickness for specified materials having the same permeability and conductivity.

It order to obtain an accurate measurement of permeability and/or conductivity, electronic and geometric nulling are required. Geometric nulling positions the transmitter, receiver and saturation coils in the optimum locations for the particular system designed. Various designs are provided yielding excellent results. Also, an electronic nulling circuit can simultaneously null all of the frequencies at once. Pursuant to practicing the present invention as described herein, one skilled in the art will know and appreciate how to arrange the transmitter, receiver and saturation coils in optimum locations for the particular system being used, and will know and appreciate how to simultaneously null all of the frequencies at once to provide electronic nulling. FIG. 5D illustrates one embodiment of a magnetic saturation generator 501 used to generate the saturation flux required to practice the present invention. The saturation flux generator 501 is utilized to completely saturate the intended well casing 110-volume region 600.

Figure 22:
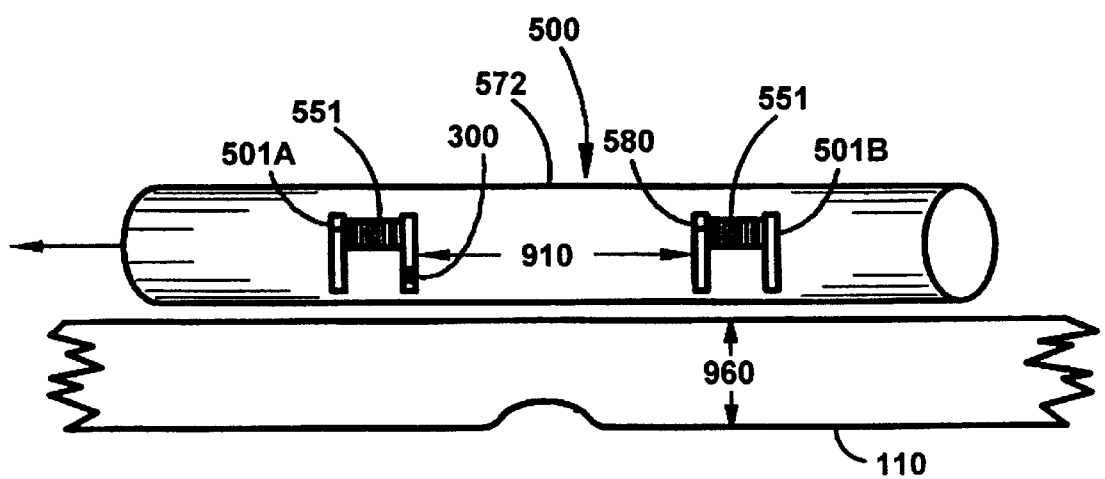
FIG. 22 illustrates one embodiment of a bistatic magnetic saturation generator of the present invention.

In FIG. 22, the bistatic tool 500 consists of two separate magnetic saturation generators 593 and 595 contained within a housing 109. The magnetic saturation generator 593 incorporates a receiver with a receiver coil 581 wound orthogonal to the saturation coil 551. The magnetic saturation generator 595 incorporates a transmitter 300 with the transmitter coil 301 wound parallel to the saturation coil. The distance between the receiver coil 581 and the transmitter coil 301 is the distance "D" 910. The sensor tool 500 is in operative association with a well casing 110 having a defect 110A. It can be appreciated by those skilled in the art that in the bistatic configuration illustrated in FIG. 22, the distance D must be sufficiently small relative to the geometric size of the defect 110A in order that the logging tool may detect the defect. Accordingly, the accuracy of the casing thickness calculation is limited by the mass to be evaluated and the displacement distance "D" 910.

The limitation of the displacement distance can be essentially eliminated by a utilization of a single magnetic saturation generator as illustrated in FIGS. 5E and 7 in operative association with a magnetic culminator 555. The transmitter 300 and the receiver 580 are both on the same culminator 555. The displacement distance D between the transmitter 300 and the receiver 580 is essentially zero because of the close configuration of the transmitter and receiver. In the illustrated configurations the receiver and transmitter are geometrically nulled. The configuration illustrated by FIG. 7 has the additional advantage of adaptation to the adjustable nested configuration of FIG. 10B wherein the saturation core is replaced with a magnetic culminator. The intensity of the frequencies received will show the metal thickness. For example, if all the higher frequencies are attenuated, the metal is thick. If all the high frequencies are detected with little attenuation of the low frequencies, the metal is thin. For a given power, the displacement distance D between the transmitter 300 and the receiver 580 determines the resolution of the thickness measurement. The resolution effects the size of the defect measurable.

Also, FIGS. 5A through 5E illustrate alternate embodiments of the Metallic Transparency region generator 501 for use with the present invention. The Metallic Transparency region generator illustrated in FIG. 5A comprises flux circuit core 552 upon which the saturation coil 551 is wound, two like magnetic poles 504 between which is a magnetic culminator 555. The core 552, upon which the saturation coils 551 of the electromagnet are wrapped, is located between each pole 504 and the culminator 555. Preferably, the magnetic saturation generator is contained within a housing (not shown) and connected to the power source and instrumentation by conventional means, (also not shown). It will be noted and appreciated by persons skilled in the technology that the magnetic saturation generator 501 is not in contact with the well casing 110.

The complete magnetic saturation generator 501 incorporates the flux circuit core 501 for providing a Metallic Transparency region that is illustrated having a width W 920, a height H 930 and a thickness L 960. The transparency may be termed the Target Area. It is appreciated that the transmitter coils 300, the receiver coils 580 and the transparency coils 551 of the magnetic saturation generator 500 are nulled to each other.

FIG 5C illustrates one embodiment of the sensor tool 500 of the present invention. The sensor tool 500 comprises the saturation coil 551, the transmitter coil 300, receiver coil 580 and the well casing 110. The magnetic saturation generator 501 is disposed from the well casing 110 by a gap G 950. The well casing 110 has a thickness L 960. The sensor tool 500 operates by energizing the saturation coil 551 for saturating the well casing 110, transmitting a transmitter flux from the transmitter coil 300, and receiving a response via the receiver coil 580. The relative penetration is caused by the change in the saturation flux. Thus, as the saturation flux increases from $i_1$, to $i_2$, to $i_3$, to $i_4$ then the penetration depth increases from $\delta_1$, to $\delta_2$, to $\delta_3$, to $\delta_4$, respectively. FIG. 5G illustrates the incremental increase in penetration by the field lines $F_1$, $F_2$, $F_3$ and $F_4$. Also, consideration of the cross-sectional area of each component of the sensor tool 500 is required to assure that no component goes into total saturation for a specific power requirement necessary to drive the magnetic flux across the gap G 950.

FIG. 22 illustrates one embodiment of a bistatic magnetic saturation generator 501 of the present invention. Using the bistatic magnetic saturation generator 501 shown in FIG. 22, the permeability is driven to unity. Oscillating transmitter flux of differing frequencies are transmitted by the transmitter 300 and related induced magnetic flux fluxes are monitored with the receiver 580. A Metallic Transparency region is created by the saturation flux of the magnetic saturation generator in a portion of the well casing 110. An oscillating transmitter flux is generated using the transmitter 300 at a preset frequency and constant amplitude. Assuming the first frequency is within the detectable frequency range, the frequency is increased incrementally until the received flux is lost. The last frequency detected prior to losing the received flux determines the Maximum Penetration Frequency detectable in a certain piece of well casing 110 of constant thickness, permeability, and conductivity. Using the data and information received in empirical testing for permeability, the material properties and thickness can be very precisely calculated.

Figure 23:
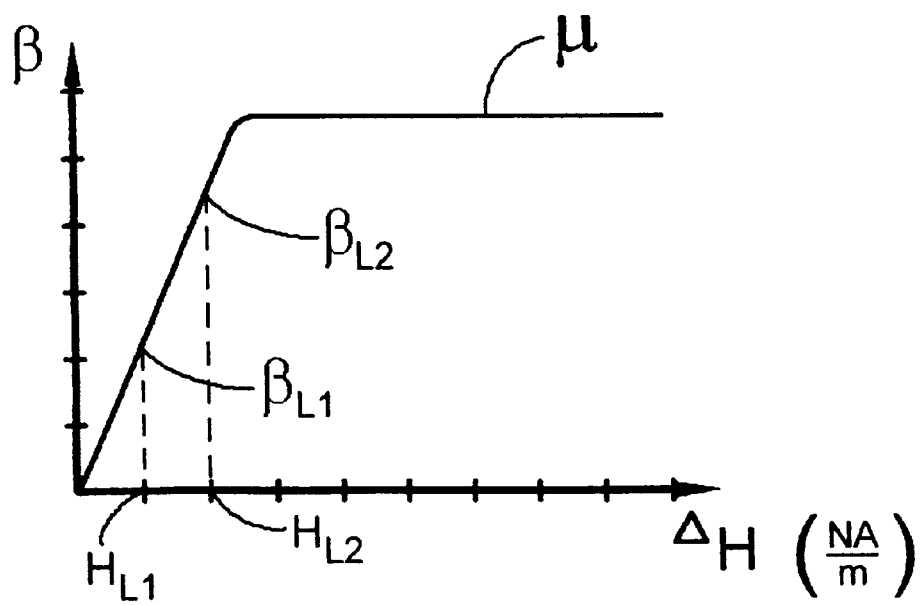
FIG. 23 illustrates the relationship between the flux density (and the change in magnetic field intensity H (ΔH) in amp-turns/meter.

FIG. 23 illustrates the relationship between the flux field $\beta$ and the change in H ($\Delta$H) in amp-turns/meter. The permeability $\mu$ is plotted. For the relationship between the flux field $\beta$ and $\Delta$H, the function defining the permeability $\mu$ remains the same. Although the function defining the permeability $\mu$ remains the same, the value of $\Delta$H for thinner materials moves up the curve faster. Thus, incremental changes in H create a faster advancement up the permeability curve toward saturation. For example, a given $H_{L1}$ corresponds to the value of $\beta_{L1}$ and a corresponding $H_{L2}$ corresponds to the value of $\beta_{L2}$. Thus, the value for L2 moves faster up the permeability p curve than the value for L1.

Figure 24:
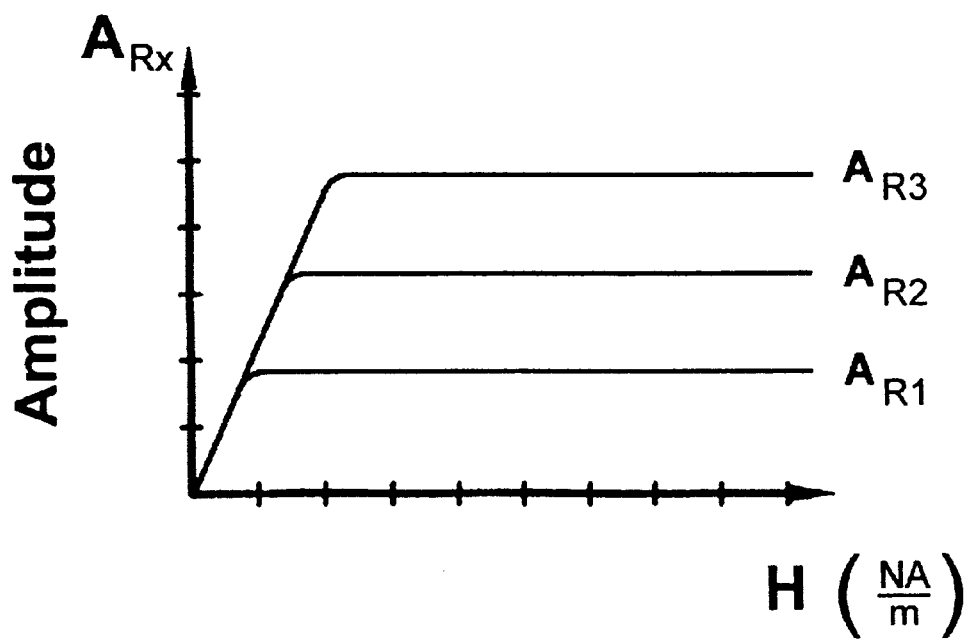
FIG. 24 illustrates the relationship between the receiver amplitude $A_{RX}$ and H in amp-turns/meter.

FIG. 24 illustrates the relationship between the amplitude $A_{RX}$ of the receiver flux and H in amp-turns/meter. As in FIG. 23, the slope of the curve in FIG. 24 is related to the permeability $\mu$. However, the receiver amplitude $A_{RX}$ reaches a different maximum value depending on the thickness of the casing. For thinner casing, as with other materials, the receiver amplitude $A_{RX}$ reaches its maximum value at a lower amplitude $A_{RX}$. For thicker materials, the receiver amplitude $A_{RX}$ reaches its maximum value at a higher amplitude $A_{RX}$. FIG. 24 illustrates a thinner material having a maximum at $A_{R1}$, a thicker material having a maximum at $A_{R3}$, and an intermediate thickness material having a maximum at $A_{R2}$.

Figure 25:
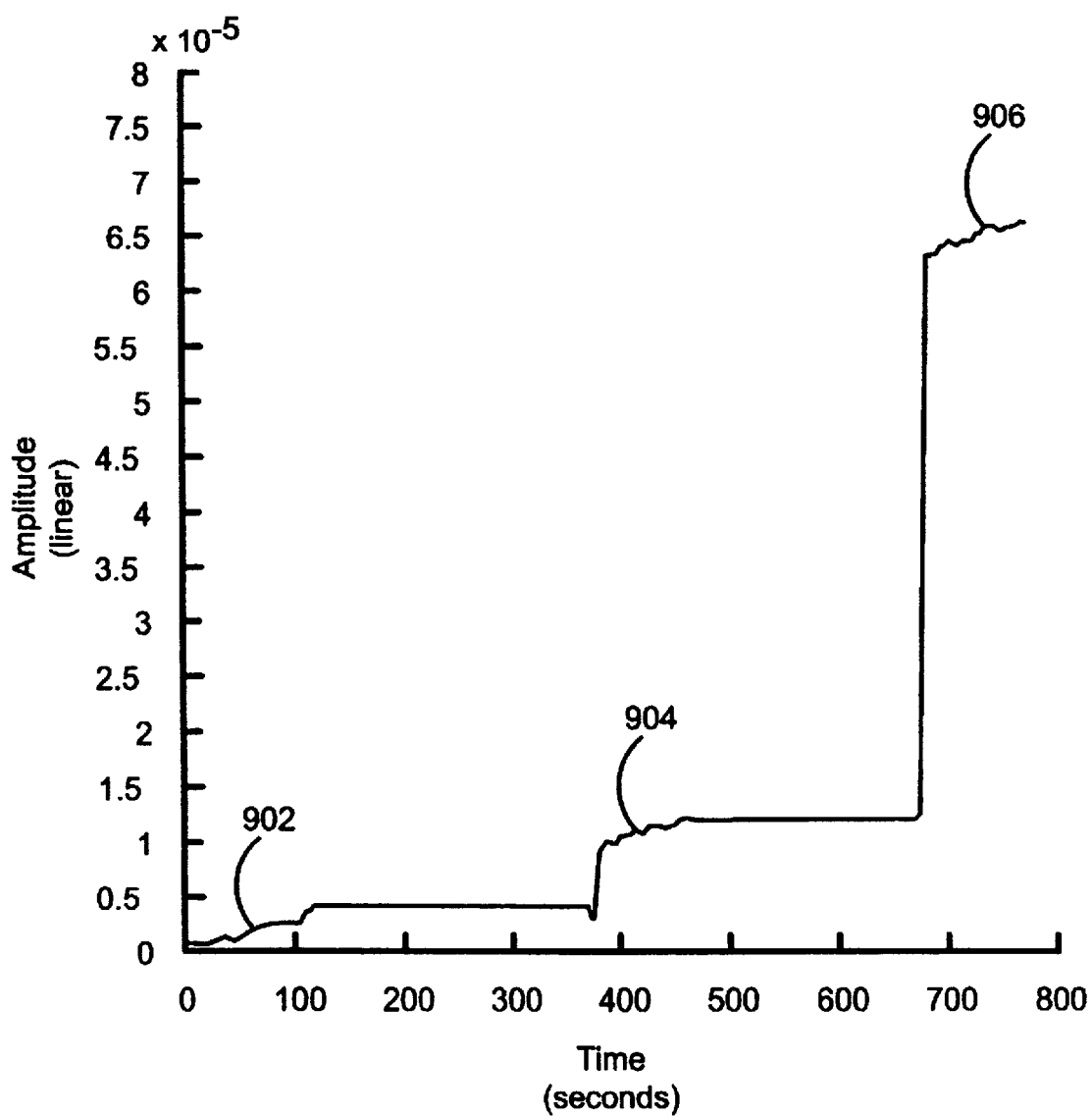
FIG. 25 is a graph of amplitude versus time for a bistatic configured magnetic saturation generator of the present invention coupling with differing barrier materials.
Figure 26:
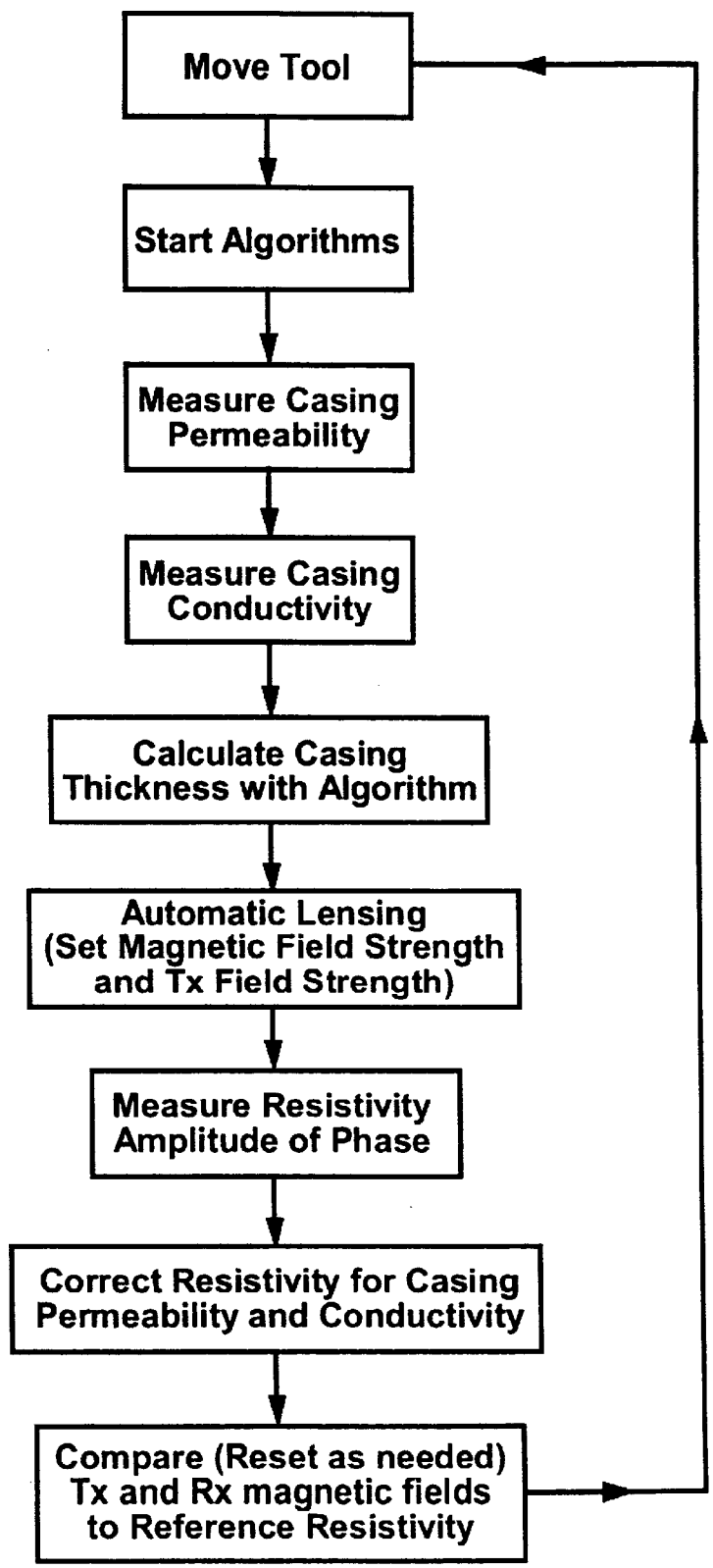
FIG. 26 illustrates an embodiment of the method of practicing the invention showing the sequential steps of the method.
Figure 27:
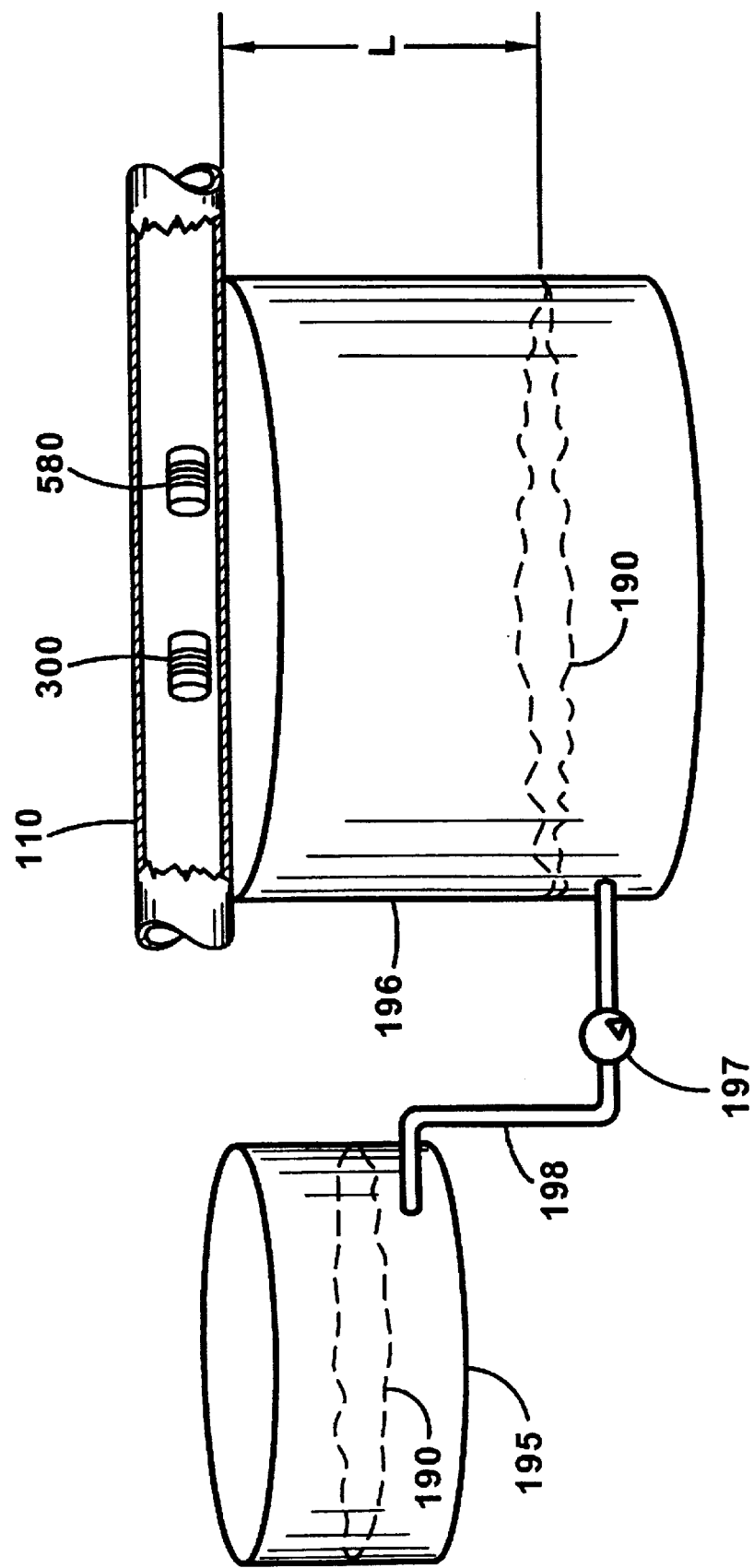
FIG. 27 illustrates an experimental apparatus utilized to demonstrate the invention's ability to measure changes in resistivity outside a well casing.
Figure 28:
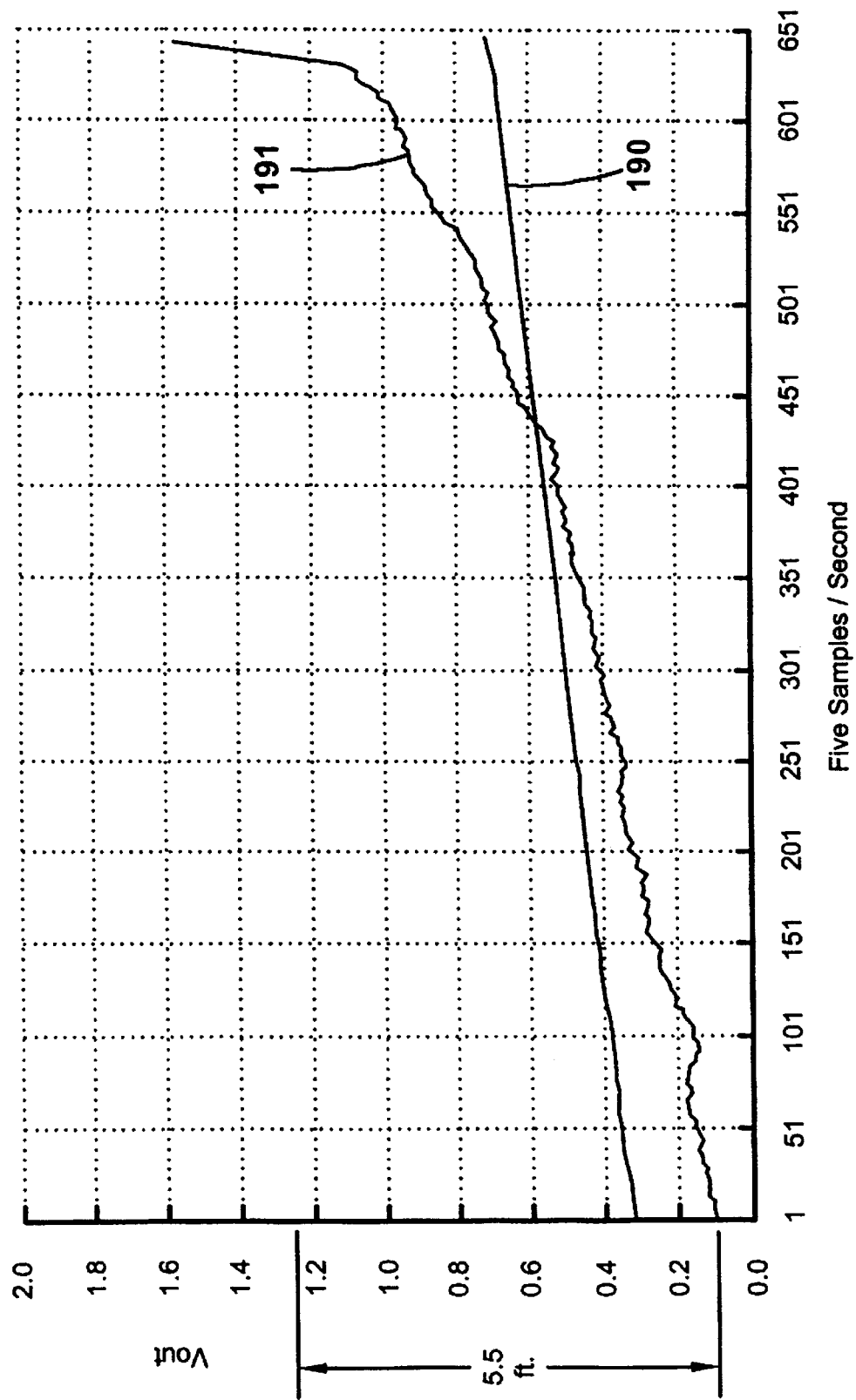
FIG. 28 illustrates the experimentally measured changes in resistivity outside the casing, as measured from within the well casing.
Figure 29:
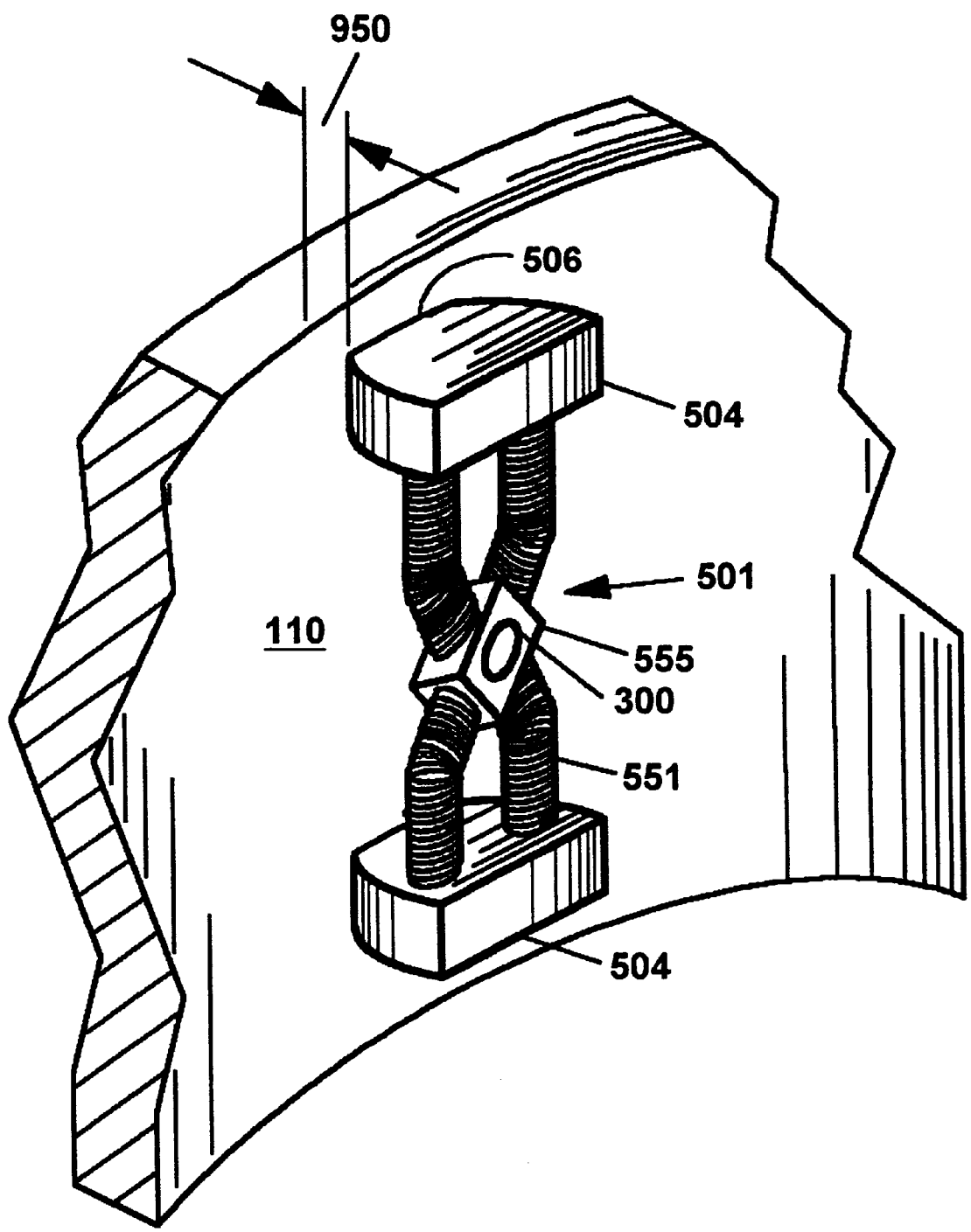
FIGS. 29, 30 and 31 illustrate other embodiments of the present invention.
Figure 30:
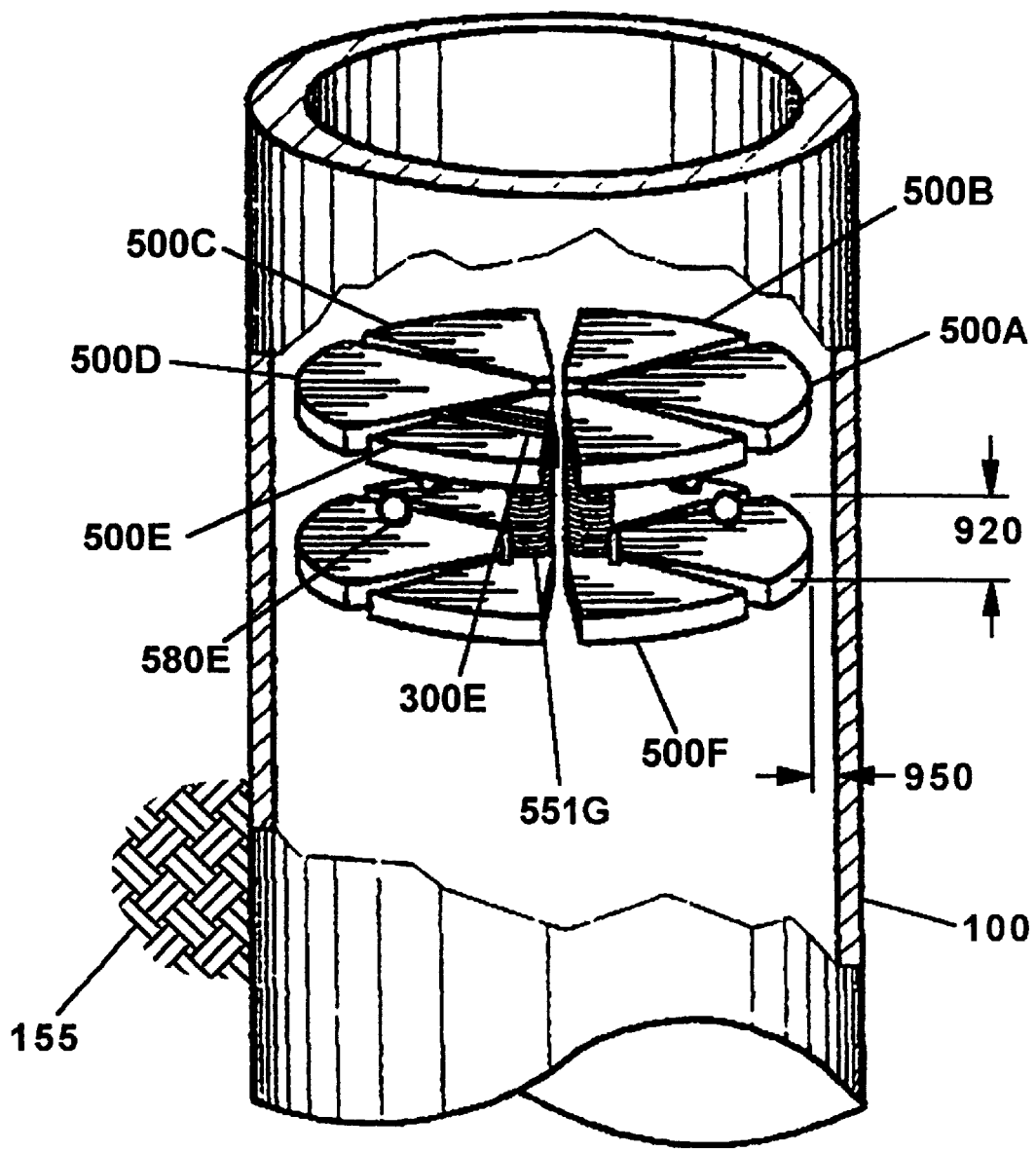
Figure 31:
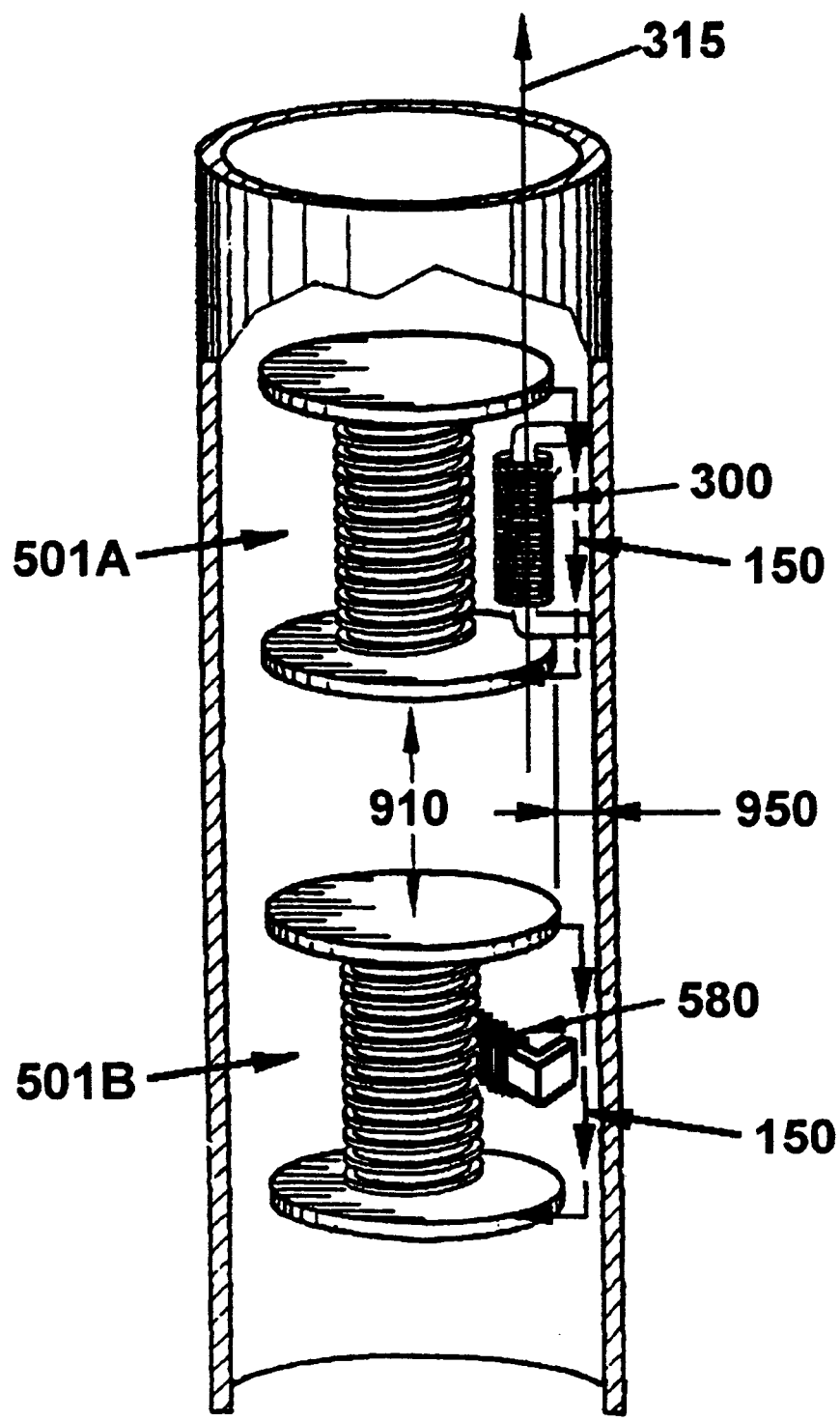
Figure 32:
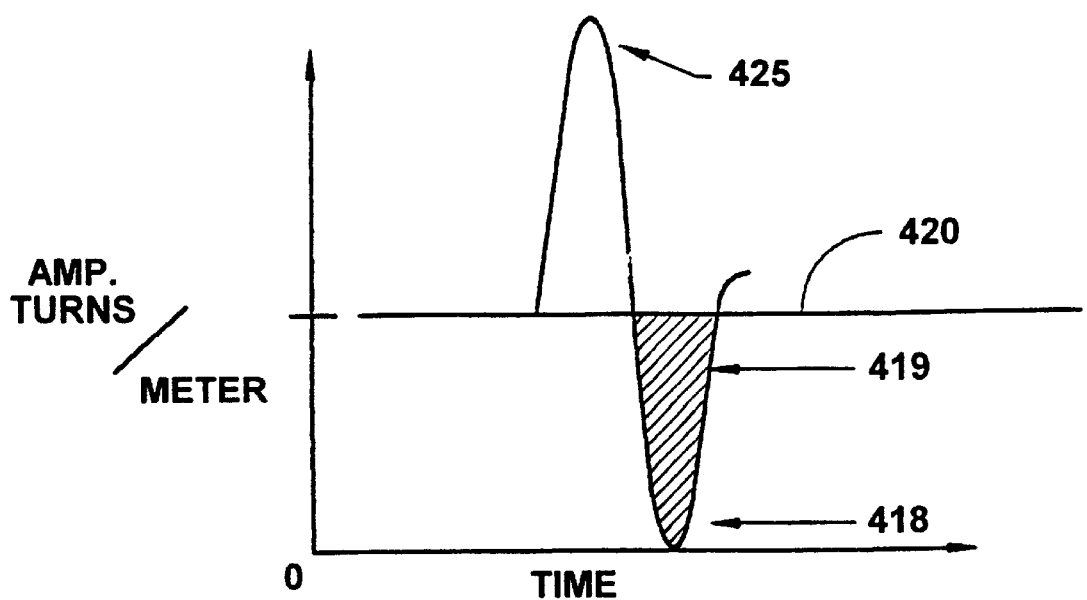
FIG. 32 illustrates use of the oscillating transmitter flux damping the saturation flux.

FIG. 25 is a graph of amplitude versus time for a bistatic configured magnetic saturation generator of the present invention. The frequency is held constant (fixed) and the barrier material, also of constant thickness, and is varied. The bistatic magnetic saturation generator was nulled using copper 902. Thereafter, the copper was replaced with brass causing the amplitude to vary from the original nulled position 904 to a new position 906. Since brass and copper have related properties, the dislocation 904 from the copper nulled position 902 is small. However, when the brass is replaced with aluminum the amplitude 906 varies significantly from the original nulled position 902. Aluminum and copper have significantly different physical characteristics.

Figure 33:
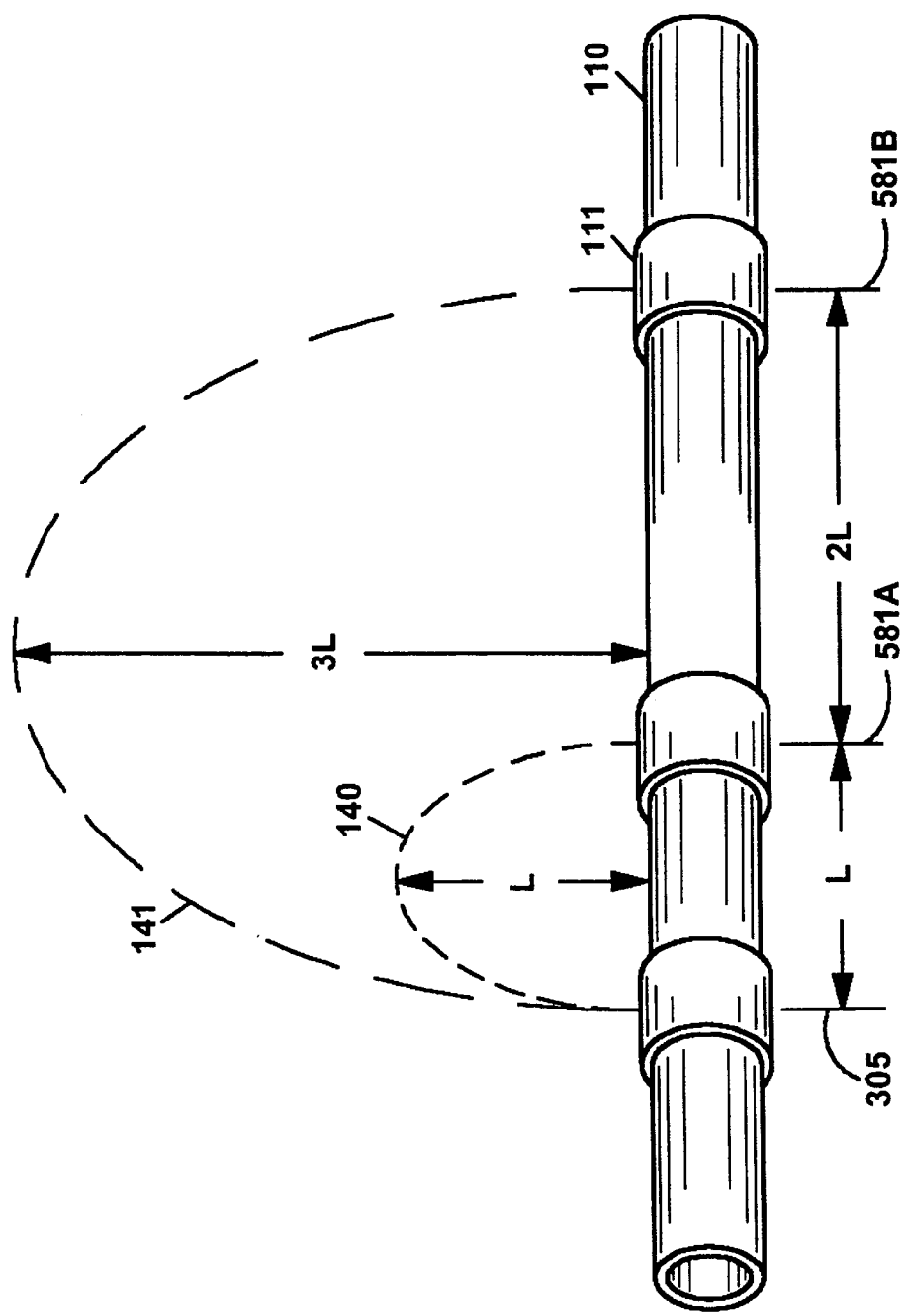
FIG. 33 discloses the relationship between the transmitter and receiver separation and the distance from which signals will be detected.

FIG. 33 shows a relationship between the distance "d" between the device and the depth of the magnetic flux field used in detection. It can also be stated that a preferred signal strength can be achieved at a distance "d" when d is equal to ½ of the distance "L" between the Transmitter 305 and Receiver 581A location, each separately located in a collar structure 111 exterior to the casing 110. In that relationship, the magnetic flux strength can be expressed as 1/(½L)2. This relationship shows that at a close distance to the device, i.e., approximately D=½L, the magnetic flux fields do not dissipate as rapidly. At a significantly closer range, the relationship to the magnetic flux density can be shown as 1/L.

Figure 34A:
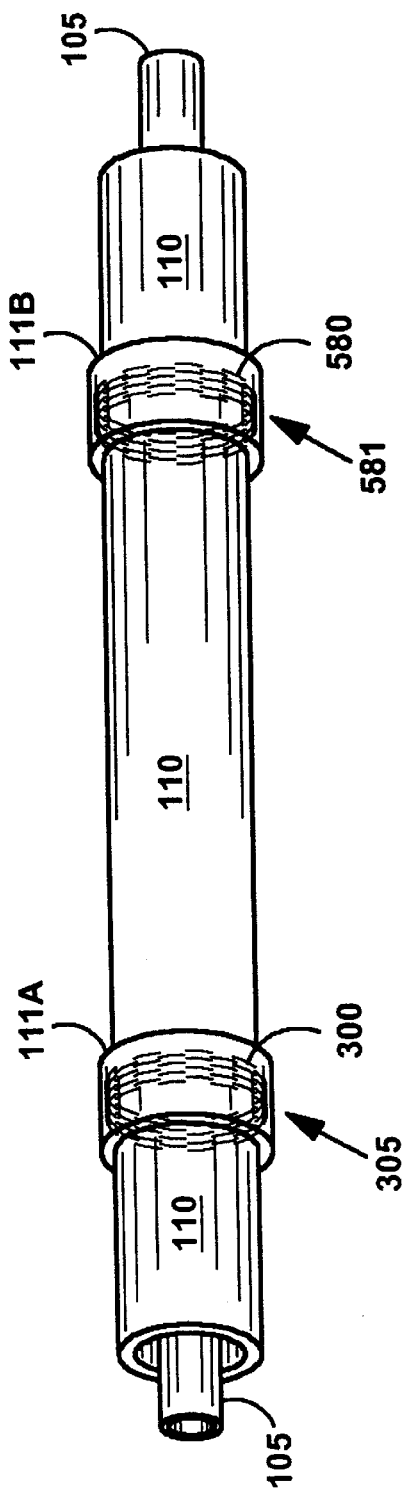
FIGS. 34A, 34B and 34C disclose other embodiments of the invention.
Figure 34B:
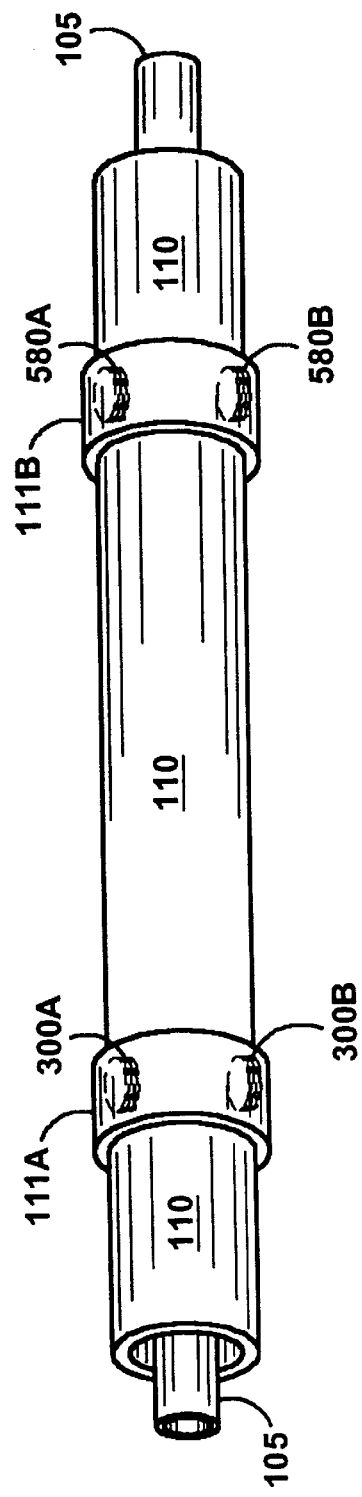
Figure 34C:
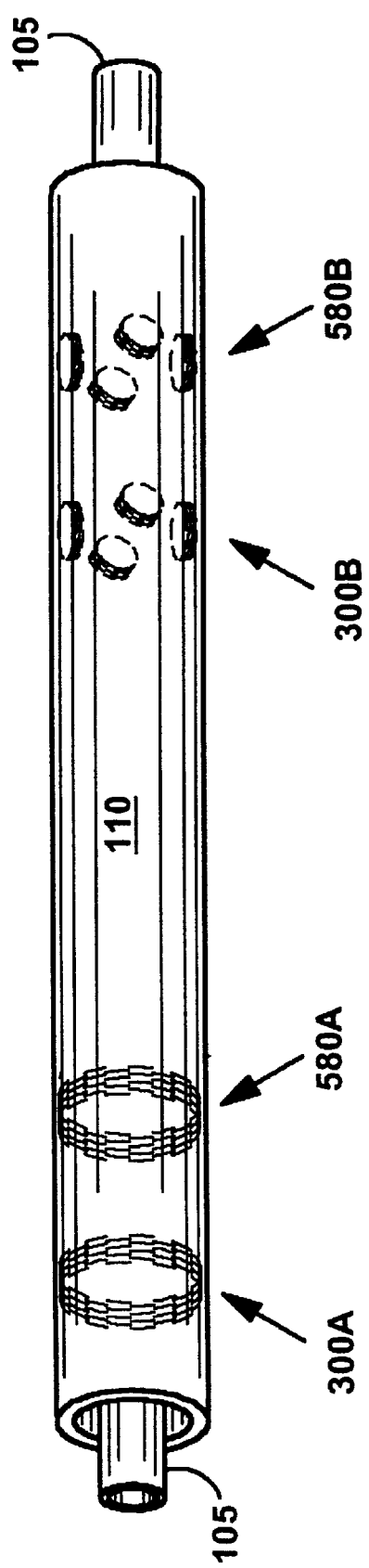

FIGS. 34A, 34B and 34C present some different embodiments of the invention. FIG. 34A depicts the transmitter (Tx) and receiver (Rx) situated as a loop, which would transmit and receive an omni directional signal through the stainless steel collars 111A and 111B. These collars join two segments of casing together.

FIG. 34B depicts the Tx/Rx coils as being small and orientated in the casing collars 111A and 111B such that the axis of the coils is normal to the casing wall. Nulling is achieved, at least in part, by the absorption of the Transmitter sensing signal by the ferromagnetic casing located between the stainless steel collars. These coil transmitters and receivers can be used in pairs in particular directions.

In FIG. 34C, the entire piece of casing is made from a metal with magnetic permeability properties of stainless steel. In this example, any combination of monostatic or bistatic transmitter/receiver sets are available. It will be appreciated that nulling will be important in such a configuration FIG. 34C shows a loop transmitter 300A and loop receiver 580A along with various coil transmitters 300B and coil receivers 580B. As illustrated in FIG. 34C, the transmitter/receiver sets may be installed around ferromagnetic production tubing 105 and inside a non magnetically permeable casing material 110.

In FIGS. 34A, 34B, 34C the sensors look out from the well casing or a metallic vessel. These transmitter sensors may be pulsed in applications for oil reservoir monitoring. The magnetic lens device allows profiling the reservoir at different distances from the casing with a variety of techniques. These are as follows:

1) Varying the transmitter power.
2) Vary the geometric distance between a simple transmitter coil and the receiver coil.
3) Vary the frequency.
4) Vary the focal length of the magnetic lens.
5) Use directed magnetic beam of nested straight line segments in which focal lengths can be changed.

Figure 35A:
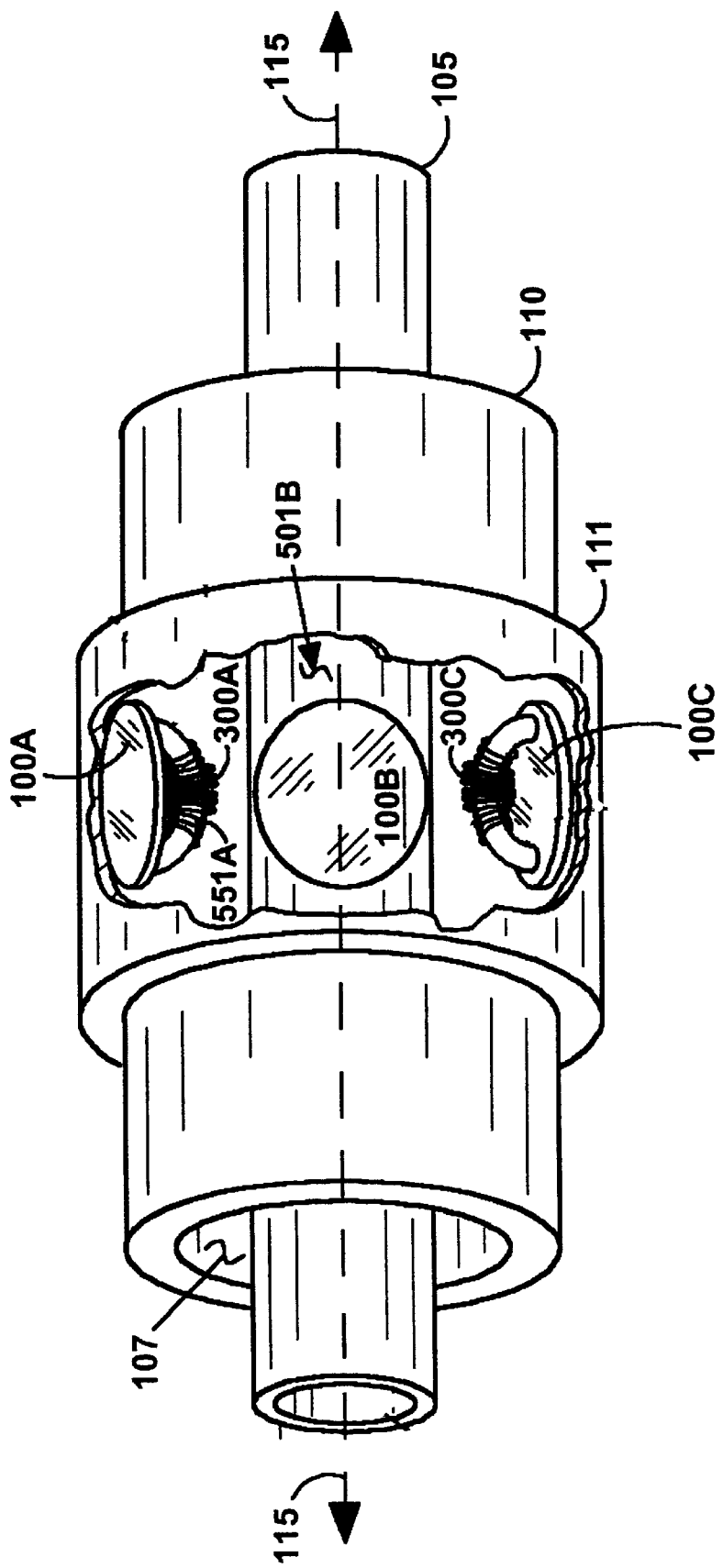
FIGS. 35A and 35B disclose embodiments of the subject invention used in conjunction with the Magnetic Lens™ effect.

In FIG. 35A, another embodiment is shown. A Magnetic Lens device used in conjunction with the coil transmitters. This Magnetic Lens device increases the magnetic flux concentration, thereby extending the range of the resistivity sensing through the permeable material. This allows the range to extend beyond the distance separating the transmitter Tx, 300A and 300C and receiver Rx (not shown). Once again, the multiple transmitter/receiver systems mounted in a collar 111 around the circumference provides directionality when a single system is operated without influence from the receiver.

Figure 35B:
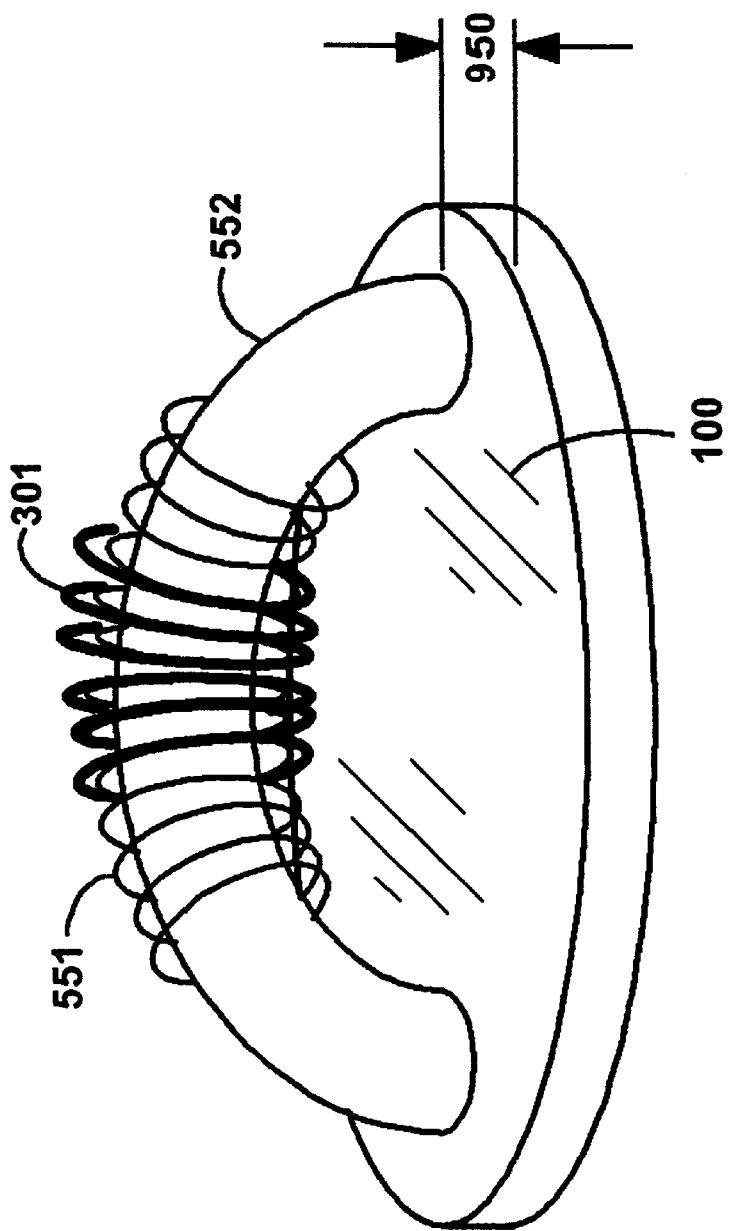

FIG. 35B identifies a detail of an embodiment depicted in FIG. 35A. A ferromagnetic plate 100 is positioned a distance away, Gap 950, from a flux circuit core 552. A saturation coil 551 is wound over the flux circuit core 552. Also, a transmitter coil 301 is wound around and over the saturation core 552. One end of the flux circuit core 552 becomes the north pole and the other end becomes the south pole once one or more coils are excited. It will be recognized by those skilled in the art that coil 301 could be used as a receiver coil 580.

Figure 35C:
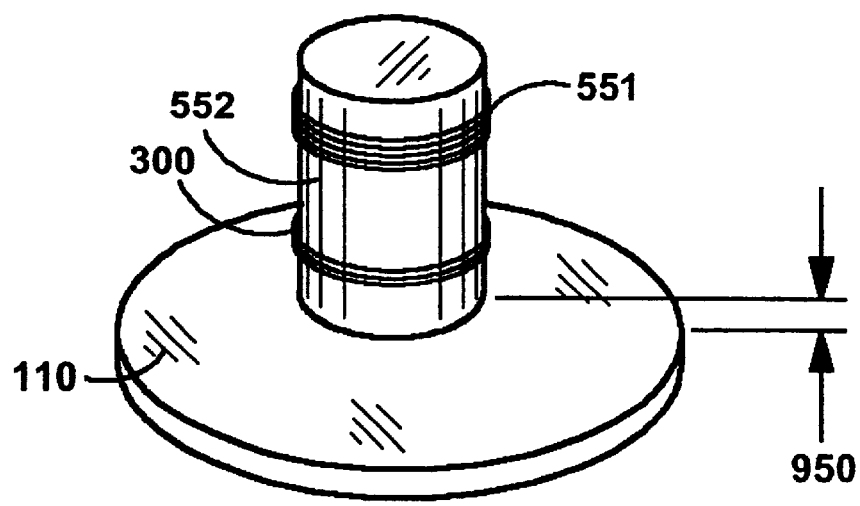
FIGS. 35C and 35D disclose additional embodiments of the subject invention.

FIG. 35C shows further embodiment of the invention where the transmitter 300 and saturation coil 551 are both wound around the same flux circuit core 552. Again, the flux circuit core is a distance, 950 away from a ferromagnetic place 110.

Figure 35D:
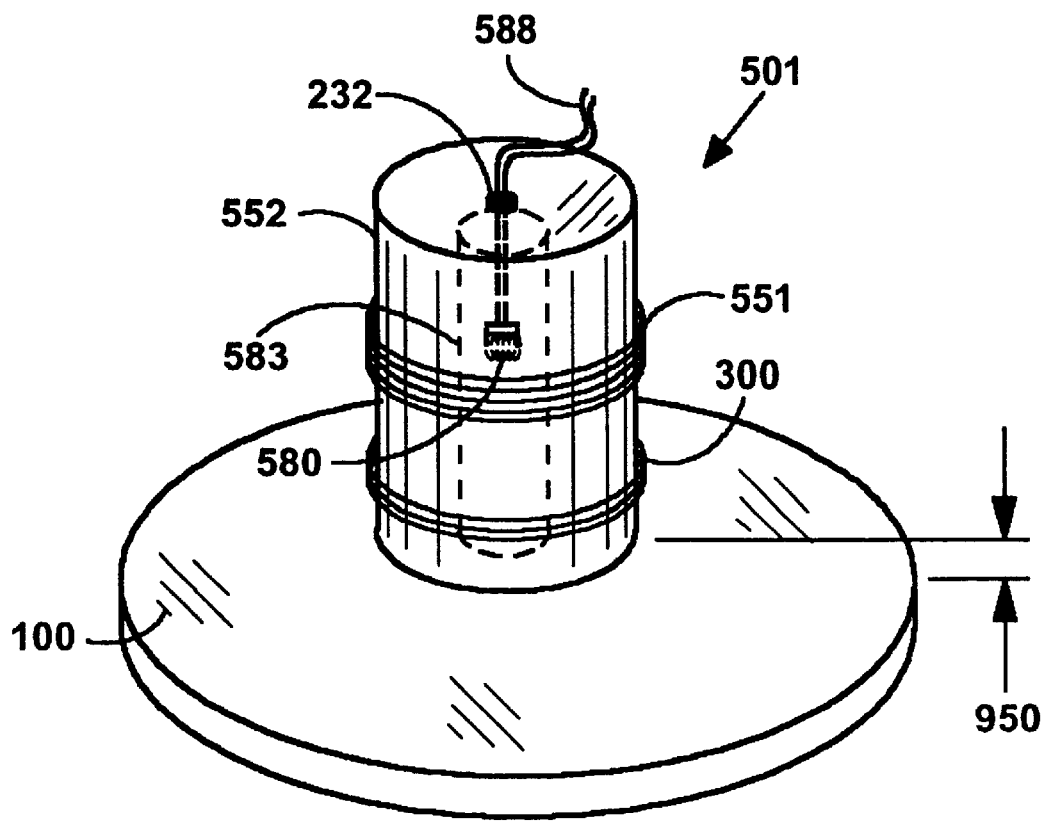

FIG. 35D shows yet a further embodiment of the invention where a receiver 580 is mounted inside a hollow opening 583 within the flux circuit core 552. The receiver signal is carried by wiring 588 and held by a support 232. Support 232 not only fastens the wiring 588 and secures the receiver 580 it allows for adjustment and calibration by allowing various depths of penetration of receiver 580 into hollow opening 583. Again, the flux circuit core is a distance 950, away from the ferromagnetic plate 100.

Figure 36:
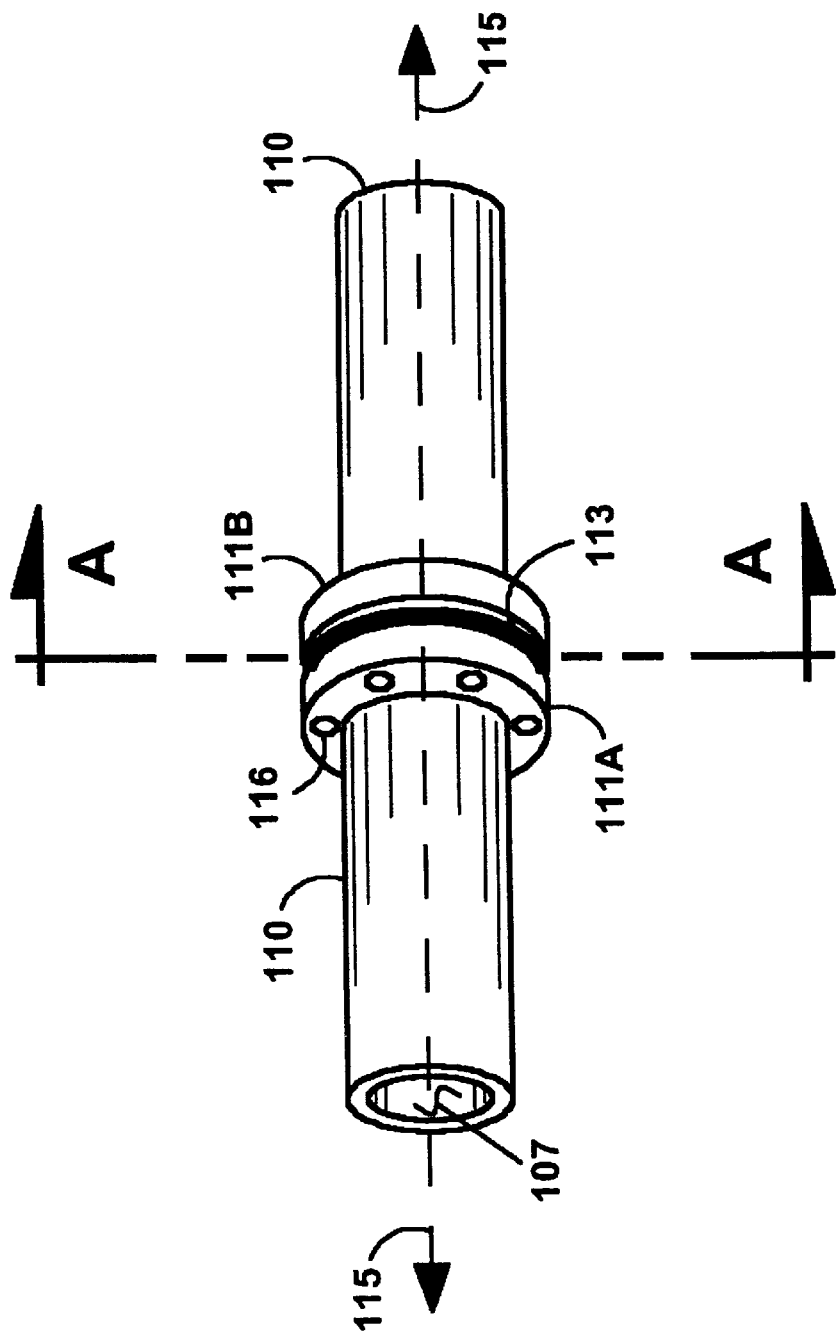
FIGS. 36 and 36A disclose yet additional embodiments of the invention.
Figure 36A:
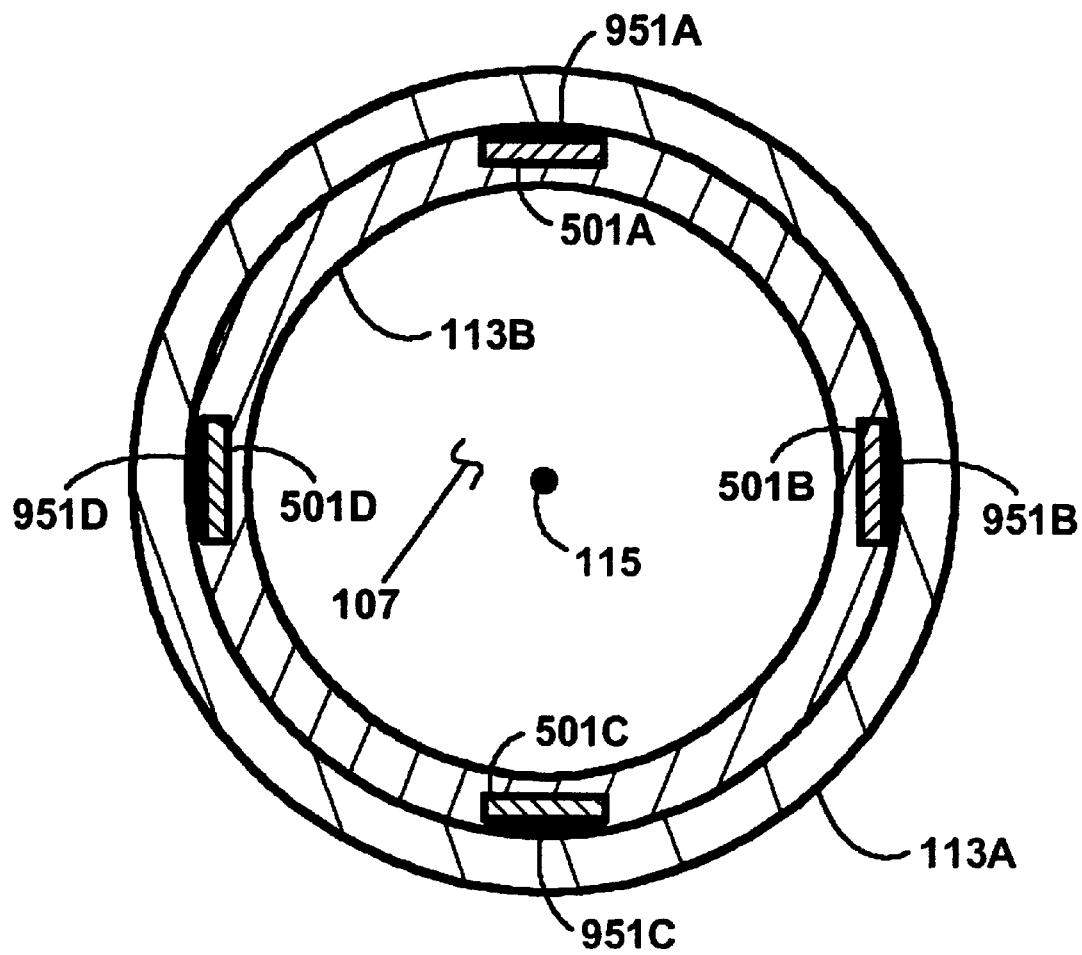

FIG. 36 depicts a stainless steel insert 113 between two flanges 111A and 111B made of carbon steel. Magnetic receiver and transmitter, sensors may be placed inside the insert 113 for sensing the characteristics of the fluid or as a non-intrusive flow meter using cross correlation techniques. The transmitter or receiver may either be axially wound or designed as "plugs". These plugs have the capability of performing flow profiles. FIG. 36A illustrates various plug sensors 501A, 501B 501C and 5010 mounted around the circumference of a non-magnetically permeable pipe 113A. The sensors are held in place by a non-magnetically permeable internal flow shield 113B. Transmitters 300A, 300B, 300C, and 300D along with receivers 580A, 580B, 580C and 580D are trapped between insulation pieces 951A, 951B, 951C and 951D and the internal flow shield 113B. The transmitter 300, once energized, transmits a magnet flux into the flow stream 107. The induced magnetic flux energizes electro magnetically sensitive materials, such as water or impurities 115 within the flow stream 107. The receivers 580A, 580B, 580C, and 580D detect the responses of the energized electro magnetically sensitive materials to the magnetic flux. It will also be appreciated that this configuration may be used to transmit and receive signals into and from the surrounding geologic formation where 113A is a stainless steel outer collar and 113B may be standard ferromagnetic casing or an EM barrier material providing electronic shielding for nulling the transmitter signal from the received signal.

Figure 37:
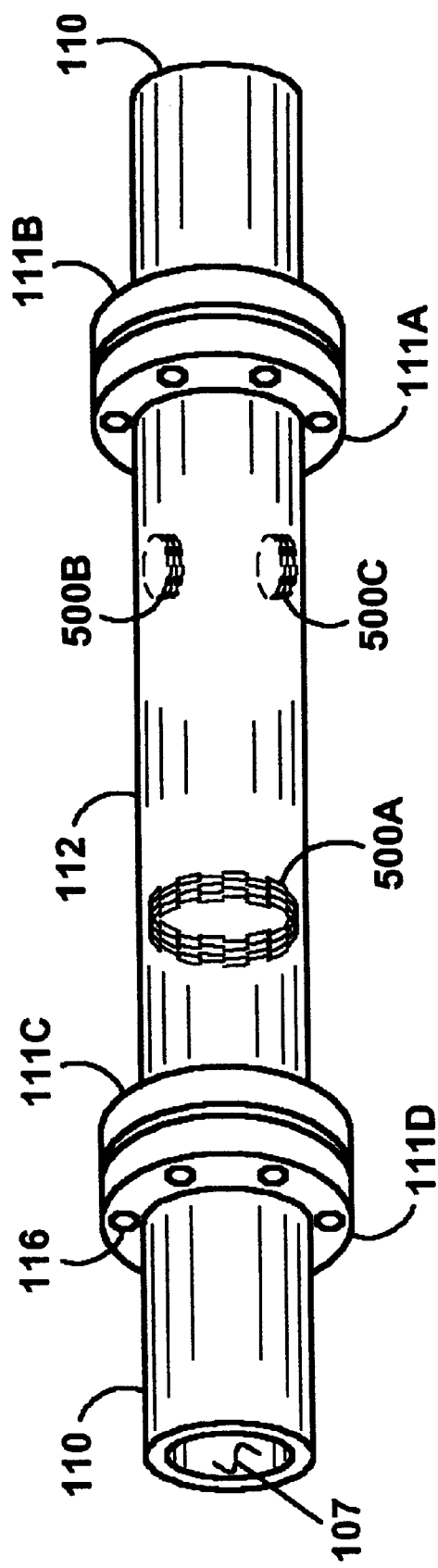
FIG. 37 discloses another embodiment of the invention.

FIG. 37 shows a stainless steel section with transmitter Tx, and receiver Rx wound axially or as coils for a flow meter or sensing inside pipe.

For the sensor tools subject of this invention, it will be appreciated that the ac frequency can be controlled and adjusted. It will be appreciated that use of low frequency ac generated magnetic flux will reduce impedance mismatch.

Further modifications and alternative embodiments of this invention will be apparent to those skilled in the art in view of this specification. Accordingly, this specification is to be construed as illustrative only and is for the purpose of teaching those skilled in the art the manner of carrying out the invention. It is to be understood that the forms of the invention herein shown and describe are to be taken as the presently preferred embodiments. Various changes may be made in the shape, size and arrangement of parts. For example, equivalent elements may be substituted for those illustrated and described herein and certain features of the invention may be utilized independently of the use of other features, all as would be apparent to one skilled in the art after having the benefit of this description of the invention.

What I claim is:

1. The method of focusing or lensing an oscillating magnetic flux to measure the electrical resistivity of media within a geologic formation surrounding a cased well bore comprising the steps of:
    (1) generating at least one magnetic flux proximate to a non-magnetically permeable section of a casing;
    (2) oscillating the magnetic flux at least at one frequency suitable to pass through the segment of the well casing for entering a surrounding geological formation such that the flux engages with electrically conductive media contained within the surrounding formation to create eddy currents within the media;
    (3) inducing a separate oscillating magnetic flux created by the eddy currents in the electrically conductive media within the formation such that a field of the induced magnetic flux extends back to the well casing;
    (4) receiving, from within the casing, the induced magnetic flux of the geologic formation;
    (5) converting the induced flux into electrical signals that are filtered and processed;
    (6) determining the electrical resistivity of the media located in the geologic formation proximate to the well casing based on the electrical signals; and
    (7) determining the characteristics of the media located in the geologic formation proximate to the well casing by evaluating the electrical resistivity.

2. A method of measuring the resistivity within an underground geologic formation through a well casing comprising the steps of:
    a. generating an oscillating magnetic flux;
    b. transmitting the magnetic flux through a portion of the well casing comprised of a non-magnetically permeable material;
    c. engaging the magnetic flux with electrically conductive media within the formation to induce eddy currents;
    d. receiving resulting magnetic flux induced by the eddy currents within the media through a non-magnetically permeable portion of the well casing; and
    e. measuring the received magnetic flux to evaluate the resistivity of the media.

3. The method of claim 2 wherein the resulting magnetic flux induced by the eddy currents is received through at least one separate portion of the well casing.

4. The method of claim 2 wherein oscillating magnetic flux of a plurality of frequencies is transmitted.

5. The method of claim 2 wherein the oscillating magnetic flux is first transmitted through near practical saturated magnetically permeable material.

6. The method of claim 2 further comprising nulling the transmitter device from the flux receiving means.

7. The method of claim 2 further comprising moving the transmitting device in relation to the non-magnetically permeable well casing material.

8. An apparatus for transmitting and receiving oscillating magnetic flux through a well casing comprising:
   a. a power supply;
   b. a portion of well casing constructed of non-magnetically permeable material;
   c. at least one oscillating magnetic flux transmitter device located proximate to a portion of non-magnetically permeable casing;
   d. at least one receiver device nulled to the transmitting device and located proximate to a non-magnetically permeable portion of the well casing; and
   e. means to process received magnetic flux into electronic signals.

9. The apparatus of claim 8 further comprising a magnetically permeable component constructed of stainless steel.

10. The apparatus of claim 8 wherein at least one transmitter or receiver is located within a non-magnetically permeable portion of a casing connector collar.

11. The apparatus of claim 8 comprising a plurality of transmitters substantially oriented in at least one plane orthogonal to the axis of the casing.

12. The apparatus of claim 8 wherein the transmitter is oriented in substantially 360 degrees around the circumference of the casing.

13. The apparatus of claim 8 comprising a transmitter component that can be moved along the axial direction within the annulus of a well casing.

14. The apparatus of claim 9 wherein a magnetically permeable component is, near practical saturated.

15. The apparatus of claim 14 wherein the magnetically permeable component is a culminator.

16. The apparatus of claim15 wherein a receiver means is proximate to the culminator.

17. An apparatus for transmitting and receiving oscillating magnetic flux through a well casing comprising:
   a. a power supply;
   b. at least one oscillating magnetic flux transmitter device and a magnetic flux receiver located proximate to a non-magnetically permeable portion of a well casing;
   c. means to process received magnetic flux into electrical signals; and
   d: means to transmit the electrical signals to a monitoring device.

* * * * *